(12) United States Patent
Alexis et al.

(10) Patent No.: US 11,739,254 B2
(45) Date of Patent: *Aug. 29, 2023

(54) METHODS FOR USE IN OIL AND GAS OPERATIONS

(71) Applicants: Chevron U.S.A. Inc., San Ramon, CA (US); Chevron Oronite Company LLC, San Ramon, CA (US)

(72) Inventors: Dennis A. Alexis, Richmond, TX (US); Gayani Pinnawala Arachchilage, Katy, TX (US); Varadarajan Dwarakanath, Houston, TX (US); Do Hoon Kim, Katy, TX (US); Taimur Malik, Houston, TX (US); Gregory A. Winslow, Houston, TX (US); Aaron Wilhelm, Fulsher, TX (US)

(73) Assignees: CHEVRON U.S.A. INC., San Ramon, CA (US); CHEVRON ORONITE COMPANY LLC, San Ramon, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/321,993

(22) Filed: May 17, 2021

(65) Prior Publication Data
US 2022/0098470 A1 Mar. 31, 2022

Related U.S. Application Data

(63) Continuation of application No. 16/262,216, filed on Jan. 30, 2019, now Pat. No. 11,008,502.
(Continued)

(51) Int. Cl.
*E21B 43/26* (2006.01)
*C09K 8/584* (2006.01)
(Continued)

(52) U.S. Cl.
CPC .............. *C09K 8/584* (2013.01); *C08L 33/26* (2013.01); *C09K 8/52* (2013.01); *C09K 8/588* (2013.01);
(Continued)

(58) Field of Classification Search
CPC .......... C09K 8/584; C09K 8/52; C09K 8/588; C09K 8/68; C09K 2208/28; C08L 33/26;
(Continued)

(56) References Cited

U.S. PATENT DOCUMENTS 5,488,148 A 1/1996 Weerasooriya et al.
6,514,929 B1 2/2003 Kandasamy et al.
(Continued)

FOREIGN PATENT DOCUMENTS

WO 2016018431 2/2016
WO 2016069937 5/2016
(Continued)

OTHER PUBLICATIONS

Barnes, et al., "Application of Internal Olefin Sulfonates and Other Surfactants to EOR. Part 1: Structure—Performance Relationships for Selection at Different Reservoir Conditions", SPE Improved Oil Recovery Symposium, Tulsa, Oklahoma, USA, 2010.
(Continued)

*Primary Examiner* — Silvana C Runyan
(74) *Attorney, Agent, or Firm* — Meunier Carlin & Curfman LLC

(57) ABSTRACT

Disclosed are compositions and methods for use in oil and gas operations.

16 Claims, 16 Drawing Sheets

Related U.S. Application Data

(60) Provisional application No. 62/624,092, filed on Jan. 30, 2018.

(51) Int. Cl.

| | |
|---|---|
| *C09K 8/588* | (2006.01) |
| *C09K 8/68* | (2006.01) |
| *F17D 1/16* | (2006.01) |
| *C09K 8/88* | (2006.01) |
| *C09K 8/52* | (2006.01) |
| *C08L 33/26* | (2006.01) |
| *C09K 8/60* | (2006.01) |
| *C08K 5/09* | (2006.01) |
| *C08K 5/37* | (2006.01) |

(52) U.S. Cl.
CPC ............ *C09K 8/602* (2013.01); *C09K 8/68* (2013.01); *C09K 8/88* (2013.01); *E21B 43/26* (2013.01); *F17D 1/16* (2013.01); *C08K 5/09* (2013.01); *C08K 5/37* (2013.01); *C09K 2208/28* (2013.01)

(58) Field of Classification Search
CPC ... F17D 1/16; C08K 5/09; E21B 43/16; E21B 43/26; E21B 43/267
See application file for complete search history.

(56) References Cited

U.S. PATENT DOCUMENTS

| | | | |
|---|---|---|---|
| 7,770,641 B2 | 8/2010 | Dwarakanath et al. | |
| 8,163,678 B2 | 4/2012 | Campbell et al. | |
| 8,211,837 B2 | 7/2012 | Weerasooriya et al. | |
| 8,283,491 B2 | 10/2012 | Campbell et al. | |
| 8,383,560 B2 | 2/2013 | Pich et al. | |
| 8,573,299 B2 | 11/2013 | Dwarakanath et al. | |
| 8,993,798 B2 | 3/2015 | Campbell et al. | |
| 9,422,469 B2 | 8/2016 | Dwarakanath et al. | |
| 9,605,198 B2 | 3/2017 | Sheng et al. | |
| 9,617,464 B2 | 4/2017 | Dwarakanath et al. | |
| 9,752,071 B2 | 9/2017 | Dwarakanath et al. | |
| 9,822,297 B2 | 11/2017 | Brinkman et al. | |
| 9,840,898 B2 | 12/2017 | Kasevich et al. | |
| 9,890,627 B2 | 2/2018 | Kasevich et al. | |
| 9,896,617 B2 | 2/2018 | Dwarakanath et al. | |
| 9,902,894 B2 | 2/2018 | Dwarakanath et al. | |
| 9,902,895 B2 | 2/2018 | Dwarakanath et al. | |
| 9,909,053 B2 | 3/2018 | Dwarakanath et al. | |
| 9,914,872 B2 | 3/2018 | Wehunt et al. | |
| 9,976,072 B2 | 5/2018 | Sheng et al. | |
| 10,011,757 B2 | 7/2018 | Dwarakanath et al. | |
| 10,160,904 B2 * | 12/2018 | McDaniel ............... | E21B 43/16 |
| 2004/0136262 A1 | 7/2004 | Wilson et al. | |
| 2006/0160908 A1 | 7/2006 | Rautschek | |
| 2008/0312108 A1 | 12/2008 | Berger et al. | |
| 2009/0044945 A1 | 2/2009 | Willberg et al. | |
| 2009/0111717 A1 | 4/2009 | Campbell et al. | |
| 2009/0112014 A1 | 4/2009 | Campbell et al. | |
| 2009/0151941 A1 | 6/2009 | Dwarakanath et al. | |
| 2014/0038858 A1 * | 2/2014 | Southwick ............... | C09K 8/58 507/221 |
| 2014/0090838 A1 | 4/2014 | Campbell et al. | |
| 2014/0110305 A1 | 4/2014 | Barnes et al. | |
| 2014/0323364 A1 * | 10/2014 | Sherwood ............... | E21B 43/01 507/219 |
| 2015/0083420 A1 | 3/2015 | Gupta et al. | |
| 2016/0122622 A1 | 5/2016 | Dwarakanath et al. | |
| 2016/0122623 A1 | 5/2016 | Dwarakanath et al. | |
| 2016/0122624 A1 | 5/2016 | Dwarakanath et al. | |
| 2016/0122626 A1 | 5/2016 | Dwarakanath et al. | |
| 2016/0160115 A1 * | 6/2016 | Gamage ............... | C09K 8/594 166/305.1 |
| 2017/0037298 A1 | 2/2017 | Li et al. | |
| 2017/0158947 A1 | 6/2017 | Kim et al. | |
| 2017/0158948 A1 | 6/2017 | Kim et al. | |
| 2017/0198202 A1 | 7/2017 | Sheng et al. | |
| 2018/0031462 A1 | 2/2018 | Dwarakanath et al. | |
| 2018/0155505 A1 | 6/2018 | Kim et al. | |
| 2018/0202273 A1 | 7/2018 | Kasevich et al. | |
| 2019/0002754 A1 | 1/2019 | Yang et al. | |
| 2019/0153299 A1 | 5/2019 | Sheng et al. | |
| 2019/0233715 A1 | 8/2019 | Alexis et al. | |

FOREIGN PATENT DOCUMENTS

| | | |
|---|---|---|
| WO | 2016183295 | 11/2016 |
| WO | 2016183335 | 11/2016 |
| WO | 2017100327 | 6/2017 |
| WO | 2017100329 | 6/2017 |
| WO | 2017100331 | 6/2017 |
| WO | 2019152467 | 8/2019 |
| WO | 2019152470 | 8/2019 |

OTHER PUBLICATIONS

Bou-Mikael, et al., "Minas Surfactant Field Trial Tests Two Newly Designed Surfactants with High EOR Potential", SPE-64288, SPE Asia Pacific Oil and Gas Conference and Exhibition, Brisbane, Australia, Oct. 16-18, 2000.
Dwarakanath, et al., "Permeability Reduction Due to use of Liquid Polymers and Development of Remediation Options", SPE 179657, SPE IOR symposium at Tulsa, 2016.
Morel, et al., "Polymer Injection in Deep Offshore Field: The Dalia Angola Case", SPE-116672, SPE Annual Technical Conference and Exhibition, Denver, Colorado, Sep. 21-24, 2008.
Poulsen, et al., "Results of the UK Captain Field Interwell EOR Pilot", SPE-190175-MS, SPE Improved Oil Recovery Conference, Tulsa, Oklahoma, Apr. 14-18, 2018.
Prasad, et al., "Pilot to Full-field Polymer Application in One of the Largest Onshore Field in India", SPE-169146-MS, SPE Improved Oil Recovery Symposium, Tulsa, Oklahoma, Apr. 12-16, 2014.
Puskas, et al., "Surfactant-Polymer EOR from Laboratory to the Pilot", SPE-190369-MS, SPE EOR Conference at Oil and Gas West Asia, Muscat, Oman, Mar. 26-28, 2018.
U.S. Appl. No. 16/262,211 Office Action dated Aug. 20, 2020.
U.S. Appl. No. 16/262,211 Office Action dated May 19, 2021.
U.S. Appl. No. 16/262,211 Notice of Allowance dated Oct. 6, 2022.
Combined Search and Examination Report under Sections 17 and 18(3), GB1901251.7, dated Jul. 22, 2019.
UK Patent Application No. GB 1901251.7, Office Action dated Sep. 8, 2020.
Combined Search and Examination Report under Sections 17 and 18(3), GB1901249.1, dated Jul. 22, 2019.
UK Patent Application No. GB 1901249, Office Action dated Sep. 8, 2020.
PCT/US2019/015771, International Search Report & Written Opinion, dated May 7, 2019.
PCT/US2019/015775, International Search Report & Written Opinion, dated May 7, 2019.
PCT/US2019/015771, International Preliminary Report on Patentability dated Aug. 13, 2020.
PCT/US2019/015775, International Preliminary Report on Patentability dated Aug. 13, 2020.

* cited by examiner

METHODS FOR USE IN OIL AND GAS OPERATIONS

CROSS REFERENCE TO RELATED APPLICATIONS

This application claims the benefit of priority to U.S. Provisional Application No. 62/624,092, filed. Jan. 30, 2018, which is incorporated by reference herein in its entirety.

BACKGROUND

Reservoir systems, such as petroleum reservoirs, typically contain fluids such as water and a mixture of hydrocarbons such as oil and gas. To remove ("produce") the hydrocarbons from the reservoir, different mechanisms can be utilized such as primary, secondary or tertiary recovery processes.

In a primary recovery process, hydrocarbons are displaced from a reservoir as a result of the high natural differential pressure between the reservoir and the bottomhole pressure within a wellbore. The reservoir's energy and natural forces drive the hydrocarbons contained in the reservoir into the production well and up to the surface. Artificial lift systems, such as sucker rod pumps, electrical submersible pumps or gas-lift systems, are often implemented in the primary production stage to reduce the bottomhole pressure within the well. Such systems increase the differential pressure between the reservoir and the wellbore intake; thus, increasing hydrocarbon production. However, even with use of such artificial lift systems only a small fraction of the original-oil-in-place (OOIP) is typically recovered using primary recovery processes as the reservoir pressure, and the differential pressure between the reservoir and the wellbore intake declines overtime due to production. For example, typically only about 10-20% of the OOIP can be produced before primary recovery reaches its limit, either when the reservoir pressure is so low that the production rates are not economical or when the proportions of gas or water in the production stream are too high.

In order to increase the production life of the reservoir, secondary or tertiary recovery processes can be used. Secondary recovery processes include water or gas well injection, while tertiary methods are based on injecting additional chemical compounds into the well, such as surfactants and polymers. Typically in these processes, fluids are injected into the reservoir to maintain reservoir pressure and drive the hydrocarbons to producing wells. An additional 10-50% of OOIP can be produced in addition to the oil produced during primary recovery.

While secondary and tertiary methods of oil recovery can further enhance oil production from a reservoir, care must be taken in choosing the right processes and chemicals for each reservoir, as some methods may cause formation damage or plugging. Damage can occur in the formation even with the careful choice of chemicals during enhanced oil recovery processes. The near wellbore area is especially prone to damage as it is subjected to higher concentrations of enhanced oil recovery chemicals, Additionally, water and steam flooding can cause fines migration which may eventually plug pores, while surfactant flooding can cause a buildup of polymers within the pores of the reservoir. Other near wellbore damage can include changes in wettability due to oil wet solids, such as through the buildup in the formation of asphaltenes and paraffin.

SUMMARY

Provided herein are concentrated surfactant compositions. The surfactant compositions can be a liquid at ambient (room) temperature. The surfactant compositions can comprise a surfactant package in an amount of from 0.2% to 98% by weight, based on the total weight of the surfactant composition; a co-solvent in an amount of from greater than 0% to 95% by weight, based on the total weight of the surfactant composition, and a liquid polymer (LP) composition in an amount of from 0.1% to 60% by weight, based on the total weight of the surfactant composition. The surfactant composition can have a total water content of from 0.5% to 20% by weight, based on the total weight of the surfactant composition.

In one example, the surfactant composition can comprise from 10% to 40% by weight, based on the total weight of the surfactant composition, of a surfactant package, wherein the surfactant package comprises one or more surfactants chosen from an alkoxy sulfate surfactant TDA-8PO-Sulfate), a C10-C30 isomerized olefin sulfonate (e.g., a C20-28 isomerized olefin sulfonate, a C16-18 isomerized olefin sulfonate, or any combination thereof), a sulfosuccinate (e.g., a dialkyl sulfosuccinate, such as sodium dihexyl sulfosuccinate), an aryl sulfonate surfactant, or any combination thereof; from 20% to 70% by weight, based on the total weight of the surfactant composition, of a co-solvent (e.g., ethylene glycol monobutyl ether, tri-ethylene glycol monobutyl ether, or any combination thereof); and from 2% to 50% by weight, based on the total weight of the surfactant composition, of an LP composition.

The concentrated surfactant compositions described herein can be directly diluted with an aqueous fluid (e.g., brine) to produce an aqueous surfactant-polymer solution having the desired concentration of components (e.g., the desired polymer concentration, the desired surfactant concentration, the desired co-solvent concentration, or any combination thereof for a particular oil and gas operation) in a single step. Accordingly, also provided are methods for preparing aqueous surfactant-polymer solutions that comprise combining a surfactant composition with an aqueous fluid in a single stage mixing process to provide the aqueous surfactant-polymer solution, wherein the single stage mixing process comprises applying a specific mixing energy of at least 0.10 kJ/kg to the surfactant composition and the aqueous fluid; wherein the aqueous polymer solution comprises a polymer concentration of from 50 to 15,000 ppm; and wherein the aqueous polymer solution has a filter ratio of 1.5 or less at 15 psi using a 1.2 μm filter.

Also provided are methods for preparing the concentrated liquid surfactant compositions described herein. Methods for preparing the concentrated liquid surfactant compositions can comprise combining an LP composition, a surfactant package, and a co-solvent to form the surfactant composition. The surfactant package can comprise from 0.2% to 98% by weight of the surfactant composition. The co-solvent can comprise from greater than 0% to 95% by weight of the surfactant composition. The LP composition can comprise from 0.1% to 60% by weight of the surfactant composition. The surfactant composition can have a total water content of from 0.5% to 20% by weight, based on the total weight of the surfactant composition.

In some embodiments, combining the LP composition, the surfactant package, and the co-solvent can comprise mixing from 0.1 parts to 60 parts of the LP composition with from 0.2 parts to 98 parts of the surfactant composition and from greater than 0 parts to 95 parts of the co-solvent. In some embodiments, combining the LP composition, the surfactant package, and the co-solvent can comprise adding the LP composition to a mixture comprising the surfactant package and the co-solvent.

Also provided are methods of using these aqueous surfactant-polymer solutions in a variety of oil and gas operations, including enhanced oil recovery operations and/or wellbore remediation.

DETAILED DESCRIPTION

Figure 1A:
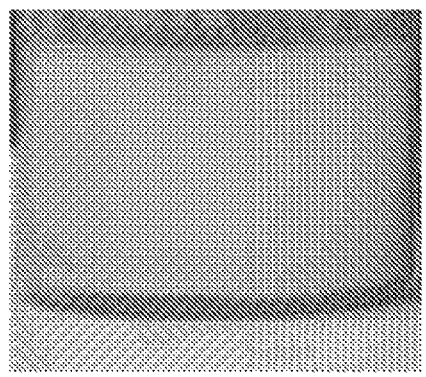
FIG. 1A is a photograph illustrating the appearance of concentrated surfactant composition 1 prior to dilution.

The term "enhanced oil recovery" refers to techniques for increasing the amount of unrefined petroleum (e.g., crude oil) that may be extracted from an oil reservoir (e.g., an oil field). Using EOR, 40-60% of the reservoir's original oil can typically be extracted compared with only 20-40% using primary and secondary recovery (e.g., by water injection or natural gas injection). Enhanced oil recovery may also be referred to as improved oil recovery or tertiary oil recovery (as opposed to primary and secondary oil recovery). Examples of EOR operations include, for example, miscible gas injection (which includes, for example, carbon dioxide flooding), chemical injection (sometimes referred to as chemical enhanced oil recovery (CEOR), and which includes, for example, polymer flooding, alkaline flooding, surfactant flooding, conformance control operations, as well as combinations thereof such as alkaline-polymer flooding or alkaline-surfactant-polymer flooding), microbial injection, and thermal recovery (which includes, for example, cyclic steam, steam flooding, and fire flooding). In some embodiments, the EOR operation can include a polymer (P) flooding operation, an alkaline-polymer (AP) flooding operation, a surfactant-polymer (SP) flooding operation, an alkaline-surfactant-polymer (ASP) flooding operation, a conformance control operation, or any combination thereof. The terms "operation" and "application" may be used interchangeability herein, as in EOR operations or EOR applications.

For purposes of this disclosure, including the claims, the filter ratio (FR) can be determined using a 1.2 micron filter at 15 psi (plus or minus 10% of 15 psi) at ambient temperature (e.g., 25° C.). The 1.2 micron filter can have a diameter of 47 mm or 90 mm, and the filter ratio can be calculated as the ratio of the time for 180 to 200 ml of the inverted polymer solution to filter divided by the time for GO to 80 ml of the inverted polymer solution to filter.

$$FR = \frac{t200 \text{ ml} - t180 \text{ ml}}{t80 \text{ ml} - t60 \text{ ml}}$$

For purposes of this disclosure, including the claims, the inverted polymer solution is required to exhibit a FR of 1.5 or less.

The formation of aqueous surfactant-polymer solutions from a surfactant composition (e.g., by inversion of a surfactant composition comprising a LP composition such as an inverse emulsion polymer) can be challenging. For use in many applications, rapid and complete inversion of the inverse emulsion polymer composition is required. For example, for many, applications, rapid and continuous inversion and dissolution (e.g., complete inversion and dissolution in five minutes or less) is required. For certain applications, including many oil and gas applications, it can be desirable to completely form an aqueous surfactant-polymer solution (e.g., to invert and dissolve the surfactant composition comprising the emulsion or LP to a final concentration of from 500 to 5000 ppm) in an in-line system in a short period of time (e.g., less than five minutes).

For certain applications, including many enhanced oil recovery (EOR) applications, it can be desirable that the aqueous surfactant-polymer solution flows through a hydrocarbon-bearing formation without plugging the formation. Plugging the formation can slow or inhibit oil production. This is an especially large concern in the case of hydrocarbon-bearing formations that have a relatively low permeability prior to tertiary oil recovery.

One test commonly used to determine performance of an aqueous surfactant-polymer solution in such conditions involves measuring the time taken for given volumes/concentrations of solution to flow through a filter, commonly called a filtration quotient or Filter Ratio ("FR"). For example, U.S. Pat. No. 8,383,560 describes a filter ratio test method which measures the time taken by given volumes of a solution containing 1000 ppm of active polymer to flow through a filter. The solution is contained in a cell pressurized to 2 bars and the filter has a diameter of 47 mm and a pore size of 5 microns. The times required to obtain 100 ml (t100 ml), 200 ml (t200 ml), and 300 ml (t300 ml) of filtrate were measured. These values were used to calculate the FR, expressed by the formula below:

$$FR = \frac{t300 \text{ ml} - t200 \text{ ml}}{t200 \text{ ml} - t100 \text{ ml}}$$

The FR generally represents the capacity of the polymer solution to plug the filter for two equivalent consecutive volumes. Generally, a lower FR indicates better performance. U.S. Pat. No. 8,383,560, which is incorporated herein by reference, explains that a desirable FR using this method is less than 1.5.

However, polymer compositions that provide desirable results using this test method, have not necessarily provided acceptable performance in the field. In particular, many polymers that have an FR (using a 5 micron filter) lower than 1.5 exhibit poor injectivity—i.e., when injected into a formation, they tend to plug the formation, slowing or inhibiting oil production. A modified filter ratio test method using a smaller pore size (i.e., the same filter ratio test method except that the filter above is replaced with a filter having a diameter of 47 mm and a pore size of 1.2 microns) and lower pressure (15 psi) provides a better screening method.

The methods described herein can produce aqueous surfactant-polymer solutions exhibiting a FR using the 1.2 micron filter of 1.5 or less via efficient single stage mixing processes. In field testing, these compositions can exhibit improved injectivity over commercially-available polymer compositions including other compositions having an FR (using a 5 micron filter) of less than 1.5. In some embodiments, injection of the aqueous surfactant-polymer solutions described herein in surrogate rock core having permeability of 1 Darcy or greater at a constant flowrate for at least 15 pore volumes yields a stable pressure drop across the surrogate rock core. Procedures for such measurements are described, for example, in SPE 179657 entitled "Permeability Reduction Due to use of Liquid Polymers and Development of Remediation. Options" by Dwarakanath et al. (SPE ICER symposium in Tulsa, Okla., 2016), and SPE 191391 entitled "Development of the Mixing Energy Concept to Hydrate Novel Liquid Polymers for Field Injection" by Kim et al. (SPE Annual Technical Conference in Dallas, Tex., 2018), each of which is incorporated herein by reference in its entirety. As such, the aqueous surfactant-polymer solutions prepared by the methods described herein are suitable for use in a variety of oil and gas applications, including EOR.

In some embodiments, the compositions described herein can be analyzed using the apparatus and methods described in U.S. Patent Application Publication No. 2018/0031462 to Dwarakanath et al., which is incorporated herein by reference in its entirety.

Surfactant Compositions

Provided herein are liquid surfactant compositions. The liquid surfactant compositions can comprise a surfactant package, a co-solvent, and a liquid polymer (LP) composition. The surfactant package can be present in the surfactant composition in an amount of from 0.2% to 98% by weight, based on the total weight of the surfactant composition. The co-solvent can be present in the surfactant composition an amount of from greater than 0% to 95% by weight, based on the total weight of the surfactant composition. The LP composition can be present in the surfactant composition in an amount of from 0.1% to 60% by weight, based on the total weight of the surfactant composition. The surfactant composition can have a total water content (including the water present in all components of the surfactant composition, of from 0.5% to 20% by weight, based on the total weight of the surfactant composition).

The concentrated surfactant composition can be directly diluted with an aqueous fluid (e.g., brine) to produce an aqueous surfactant-polymer solution having the desired concentration of components (e.g., the desired polymer concentration, the desired surfactant concentration, the desired co-solvent concentration, or any combination thereof for a particular oil and gas operation) in a single step. This can eliminate the need for multiple streams of individual components, thereby improving process robustness. If desired, the aqueous surfactant-polymer solution can be continuously injected to remove near wellbore trapped oil or injected as a slug to mobilize residual oil in a tertiary recovery process. Such a process allows for rapid deployment of surfactant polymer flooding processes, especially in offshore environments.

The surfactant compositions described herein can be quickly inverted, hydrated, and mixed in water under strong shear stress. Once diluted, the resulting aqueous surfactant-polymer solutions can exhibit superior filterability after a short hydration time. The surfactant compositions can exhibit a comparable viscosity yield with conventional liquid polymers. The resulting aqueous surfactant-polymer solutions also exhibit excellent performance in oil recovery applications.

In some cases, the surfactant compositions can have a greater concentration of surfactants and co-solvents than polymer. For example, the composition can have a total surfactant concentration equal to the sum of the weight percent concentration of all the surfactants present in the surfactant composition and a total polymer concentration equal to the sum of the weight percent concentration of all of the polymers present in the surfactant composition. In some embodiments, the weight ratio of the total surfactant concentration to the total polymer concentration can be at least 1:1 (e.g., at least 2:1, at least 3:1, at least 4:1, at least 5:1, at least 6:1, or at least 7:1). In some embodiments, the weight ratio of the total surfactant concentration to the total polymer concentration can be 8:1 or less (e.g., 7:1 or less, 6:1 or less, 5:1 or less, 4:1 or less, 3:1 or less, or 2:1 or less).

The weight ratio of the total surfactant concentration to the total polymer concentration can range from any of the minimum values described above to any of the maximum values described above. For example, in some embodiments, the weight ratio of the total surfactant concentration to the total polymer concentration in the surfactant composition can be from greater that 1:1 to 8:1 (e.g., from 2:1 to 8:1, or from 3:1 to 6:1).

The composition can also have a total co-solvent concentration equal to the sum of the weight percent concentration of all the co-solvents present in the surfactant composition and a total polymer concentration equal to the sum of the weight percent concentration of all of the polymers present in the surfactant composition. In some embodiments, the weight ratio of the total co-solvent concentration to the total polymer concentration can be at least 1:1 (e.g., at least 2:1, at least 3:1, at least 4:1, at least 5:1, at least 6:1, or at least 7:1). In some embodiments, the weight ratio of the total co-solvent concentration to the total polymer concentration can be 8:1 or less (e.g., 7:1 or less, 6:1 or less, 5:1 or less, 4:1 or less, 3:1 or less, or 2:1 or less).

The weight ratio of the total co-solvent concentration to the total polymer concentration can range from any of the minimum values described above to any of the maximum values described above. For example, in some embodiments, the weight ratio of the total co-solvent so concentration to the total polymer concentration in the surfactant composition can be from greater that 1:1 to 8:1 (e.g., from 2:1 to 8:1, or from 3:1 to 6:1).

In some embodiments, the composition can have a total additive concentration equal to the sum of the weight percent concentration of all the surfactants and all the co-solvents present in the surfactant composition, and a total polymer concentration equal to the sum of the weight percent concentration of all the polymers present in the surfactant composition. In some embodiments, the weight ratio of the total additive concentration to the total polymer concentration can be at least 1:1 (e.g., at least 2:1, at least 3:1, at least 4:1, at least 5:1, at least 6:1, or at least 7:1). In some embodiments, the weight ratio of the total additive concentration to the total polymer concentration can be 8:1 or less (e.g., 7:1 or less, 6:1 or less, 5:1 or less, 4:1 or less, 3:1 or less, or 2:1 or less).

The weight ratio of the total additive concentration to the total polymer concentration can range from any of the minimum values described above to any of the maximum values described above. For example, in some embodiments, the weight ratio of the total additive concentration to the total polymer concentration in the surfactant composition can be from 1:1 to 8:1 (e.g., from 2:1 to 8:1, or from 3:1 to 6:1).

Surfactant Package

As discussed above, the surfactant compositions described herein can include a surfactant package comprising one or more surfactants.

In some embodiments, the surfactant package can be present in the surfactant composition in an amount of at least 0.2% by weight (e.g., at least 0.3% by weight, at least 0.4% by weight, at least 0.5% by weight, at least 0.6% by weight, at least 0.7% by weight, at least 0.8% by weight, at least 0.9% by weight, at least 1% by weight, at least 2% by weight, at least 3% by weight, at least 4% by weight, at least 5% by weight, at least 10% by weight, at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, at least 85% by weight, at least 90% by weight, or at least 95% by weight), based on the total weight of the surfactant composition. In some embodiments, the surfactant package can be present in the surfactant composition in an amount of 98% by weight or less (e.g., 95% by weight or less, 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, 15% by weight or less, 10% by weight or less, 5% by weight or less, 4% by weight or less, 3% by weight or less, 2% by weight or less, 1% by weight or less, 0.9% by weight or less, 0.8% by weight or less, 0.7% by weight or less, 0.6% by weight or less, 0.5% by weight or less, 0.4% by weight or less, or 0.3% by weight or less), based on the total weight of the surfactant composition.

The surfactant package can be present in the surfactant composition in an amount ranging from any of the minimum values described above to any of the maximum values described above. For example, in some embodiments, the surfactant package can be present in the surfactant composition in an amount of from 0.2% to 98% by weight (e.g., from 0.5% to 98% by weight, from 0.5% to 95% by weight, from 5% to 98% by weight, from 10% to 95% by weight, from 10% to 75% by weight, from 10% to 60% by weight, from 10% to 50% by weight, or from 10% to 40% by weight), based on the total weight of the surfactant composition.

In some embodiments, the surfactant package can comprise one or more anionic surfactants. In some embodiments, the surfactant package can consist essentially of one or more anionic surfactants. In some embodiments, the surfactant package can consist of one or more anionic surfactants. In some embodiments, the surfactant package can comprise one or more anionic surfactants, one or more non-ionic surfactants, or any combination thereof. In some embodiments, the surfactant package can consist essentially of one or more anionic surfactants, one or more non-ionic surfactants, or any combination thereof. In some embodiments, the surfactant package can consist of one or more anionic surfactants, one or more non-ionic surfactants, or any combination thereof.

The surfactants can be any surfactants suitable for use in oil and gas operations. For example, in some cases, the surfactant package can comprise an anionic surfactant. The anionic surfactant can be, for example, an anionic surfactant which comprises between 6 and 52 carbon atoms, for example, between 6 and 15, 16 and 30, 31 and 45, 46 and 52, 6 and 25, 26 and 52, 6 and 15, 16 and 25, 26 and 35, and 36 and 45 carbon atoms. The hydrophobic (lipophilic) carbon tail may be a straight chain, branched chain, and/or may comprise cyclic structures. The hydrophobic carbon tail may comprise single bonds, double bonds, triple bounds, or combinations thereof. The hydrophilic side of the anionic surfactant can comprise a sulfate, a sulfonate, two sulfonates, or a carboxylate, for example. In embodiments, the anionic surfactant can comprise be a mix of surfactants with different length hydrophobic chain lengths. In embodiments, the anionic surfactant can be, for example, a disulfonate, alkyldiphenyloxide disulfonate, mono alkyldiphenyloxide disulfonate, dialkyldiphenyloxide disulfonate, or a dialkyldiphenyloxide monosulfonate, where the alkyl chain can be C1-C30 near or branched. In embodiments, the anionic surfactant can be an alkylbenzene sulfonate or a dibenzene disulfonate. In specific embodiments, the anionic surfactant can be benzenesulfonic acid, decyl(Sulfophenoxy)-disodium salt; linear or branched C1-C36 Alkyl:PO (0-65):EO (0-100) sulfate; or linear or branched C1-C36 Alkyl:PO(0-65):EO (0-100) carboxylate. In embodiments, the anionic surfactant can be an isomerized olefin sulfonate (C6-C30), internal olefin sulfonate (C6-C30) or internal olefin disulfonate (C6-C30). In some embodiments, the anionic surfactant can be Guerbet PO(0-65) and EO (0-100) Sulfate (Guerbet portion can be C6-C36). In some embodiments, the anionic surfactant can be alkyl PO(0-65) and EO (0-100) Sulfonate: where the alkyl group is linear or branched C1-C36. In some embodiments, the anionic surfactant can be alpha olefin sulfonate (C6-C30), alkyl benzene sulfonate where the alkyl group is linear or branched C6-C36, Guerbet PO(0-65) and EO (0-100) carboxylate (Guerbet can be C6-C36). In some embodiments, the anionic surfactant can be a sulfosuccinate (e.g., a dialkyl sulfosuccinate, such as sodium dihexyl sulfosuccinate). In some embodiments, the surfactant package can comprise a mixture of one or more different types of anionic surfactants.

In some embodiments, the surfactant package can comprise one or more internal olefin sulfonates. As used herein, "internal olefin sulfonates" or "IOS" refers to an unsaturated hydrocarbon compound comprising at least one carbon-carbon double bond and at least one $SO_4^-$ group, or a salt thereof. In certain embodiments, the surfactant package can comprise a C20-C28 internal olefin sulfonate. As used herein, a "C20-C28 internal olefin sulfonate" or "C20-C28 IOS" refers to an IOS, or a mixture of IOSs with an average carbon number of 20 to 28, or of 23 to 25. The C20-C28 MS may comprise at least 80% of IOS with carbon numbers of 20 to 28, at least 90% of IOS with carbon numbers of 20 to 28, or at least 99% of IOS with carbon numbers of 20 to 28. In certain embodiments, the surfactant package can comprise a C15-C18 internal olefin sulfonate. As used herein, a "C15-C18 internal olefin sulfonate" or "C15-C18 IOS" refers to an IOS or a mixture of IOSs with an average carbon number of 15 to 18, or of 16 to 17. The C15-C18 IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates may be alpha olefin sulfonates, such as an isomerized alpha olefin sulfonate. The internal olefin sulfonates may also comprise branching. The IOS may comprise at least 20% branching, 30% branching, 40% branching, 50% branching, 60% branching, and 65% branching. In some embodiments, the branching is between 20-98%, 30-90%, 40-80%, or around 65%. Examples of internal olefin sulfonates and the methods to make them are found in U.S. Pat. No. 5,488,148, U.S. Patent Application Publication 2009/0112014, and SPE 129766, all incorporated herein by reference.

In some embodiments, the surfactant package can comprise one or more alcohol alkoxylated sulfates. Alcohol alkoxylated sulfates can have the general structure of alcohol-PO/EO-$SO_4^-$, or a salt thereof. The alcohol group can comprise 10-32 carbon atoms (e.g., from 16 to 32, from 13 to 17, or from 10 to 13 carbon atoms). The PO/EO group comprises 0-50 ethylene oxide groups, 0-50 propylene oxide groups, or any combination thereof. The alcohol alkoxylated sulfate may be the salt of the alcohol alkoxylated sulfate, such as a sodium alcohol alkoxylated sulfate. In some examples, the alcohol alkoxylated sulfate can be a tridecyl-8(propylene oxide)-sulfate (TDA-8(PO)—$SO_4^-$), a TDA-4 (PO)—$SO_4^-$, a TDA-12(PO)—$SO_4$, or any combination thereof.

In some embodiments, the surfactant package can comprise one or more alcohol alkoxylated carboxylates. Alcohol alkoxylated carboxylates can have the general structure of alcohol-PO/EO-COO$^-$, or a salt thereof. The alcohol group can comprise 10-32 carbon atoms (e.g., from 16 to 32, from 13 to 17, or from 10 to 13 carbon atoms). The PO/EO group can comprise 0-50 ethylene oxide groups, 0-50 propylene oxide groups, or any combination thereof. In some examples, the alcohol alkoxylated carboxylate can be a C28-35PO-10EO-COO$^-$ or a salt thereof.

In some embodiments, the surfactant package can comprise one or more sulfosuccinates. As used herein, "sulfosuccinate" refers to a chemical having the structure:

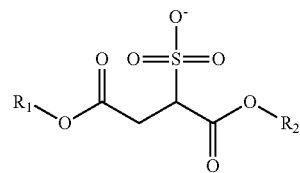

or a salt thereof, wherein $R_1$ is a branched or unbranched carbon chain comprising 5 to 7 carbon atoms and wherein $R_2$ is a branched or unbranched carbon chain comprising 5 to 7 carbon atoms. In some cases, the sulfosuccinate can be a sulfosuccinate salt, such as a sodium sulfosuccinate. In certain embodiments, the sulfosuccinate can be sodium dihexyl sulfosuccinate, which is considered a food grade, environmentally friendly compound. The dihexyl sulfosuccinate can have the chemical structure shown below.

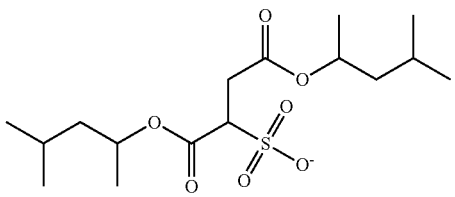 [SMILES: CC(C)CC(C)OC(=O)CC(C(=O)OC(C)CC(C)C)S(=O)(=O)[O-]]

In some cases, the surfactant package can comprise a non-ionic surfactant. Non-ionic surfactants can be included in the surfactant package to, for example, increase wettability. Examples of non-ionic surfactants include, for example, alkylaryl alkoxy alcohols, alkyl alkoxy, alcohols, and any combinations thereof. In embodiments, the HLB of the non-ionic surfactant can be greater than 10. Non-ionic surfactants satisfying the above guidelines generally have the following characteristics. The lipophilic moiety (tail) is an alkyl chain with typically between 6 and 30 carbons, with or without an aromatic ring (phenyl) attached to it. This chain may be linear or branched. In some embodiments, branched lipophilic tails are derived from Guerbet alcohols. In embodiments, the non-ionic surfactant may be a mix of surfactants with different length lipophilic tail chain lengths. For example, the non-ionic surfactant may be C9-C:11:9EO, which indicates a mixture of non-ionic surfactants that have a lipophilic tail length of 9 carbon to 11 carbon, which is followed by a chain of 9 EOs. The hydrophylic moiety is an ethoxy (EO) and/or propoxy (PO) chain with more than two repeating units of EO and/or PO. In some embodiments, 1-100 repeating units of EO are present. In some embodiments, 0-65 repeating units of PO are present. For example, the non-ionic surfactant could comprise 10EO:5PO or 5EO. In embodiments, the non-ionic surfactant may be a mix of surfactants with different length lipophilic tail chain lengths. For example, the non-ionic surfactant may be C9-C11:PO9:EO2, which indicates a mixture of non-ionic surfactants that have a lipophilic tail length of 9 carbon to 11 carbon, which is followed by a chain of 9 POs and 2 EOs. In specific embodiments, the non-ionic surfactant is linear C9-C11:9EO. In some embodiments, the non-ionic surfactant is a Guerbet PO(0-65) and EO (0-100) (Guerbet can be C6-C36); or alkyl PO(0-65) and EO (0-100): where the alkyl group is linear or branched C1-C36. In some embodiments it may be alkyl polyglucosides.

Suitable surfactants and combinations of surfactants are also described, for example, in U.S. Pat. No. 8,163,678 to Campbell et al.; U.S. Pat. No. 9,752,071 to Dwarakanath et al., and U.S. Pat. No. 7,770,641 to Dwarakanath et al., U.S. Pat. No. 8,283,491 to Campbell et al., U.S. Pat. No. 8,573,299 to Dwarakanath et al., U.S. Pat. No. 8,993,798 to Campbell et at, U.S. Pat. No. 10,011,757 to Dwarakanath et at, U.S. Pat. No. 9,976,072 to Shong et al., U.S. Pat. No. 8,211,837 to Weerasooriya et al., U.S. Pat. No. 9,896,617 to Dwarakanath et al, U.S. Pat. No. 9,909,053 to Dwarakanath et al., U.S. Pat. No. 9,902,894 to Dwarakanath et al., U.S. Pat. No. 9,902,895 to Dwarakanath et al., U.S. Pat. No. 9,422,469 to Dwarakanath et al., U.S. Pat. No. 9,605,198 to Dwarakanath et al., U.S. Pat. No. 9,617,464 to Dwarakanath et al., U.S. Patent Application Publication No. 2017/0198202 to Shong et al., and U.S. Ser. No. 16/259,247 to Shong et al., all of which are incorporated herein by reference in their entirety.

In some embodiments, the surfactant package can comprise a primary surfactant and one or more secondary co-surfactants. The primary surfactant can comprise an anionic surfactant. For example, the primary surfactant can comprise an anionic surfactant is chosen from an alkoxy carboxylate surfactant, an alkoxy sulfate surfactant, an alkoxy sulfonate surfactant, an alkyl sulfonate surfactant, an aryl sulfonate surfactant, an olefin sulfonate surfactant, a sulfosuccinate, or any combination thereof. In certain embodiments, the primary surfactant can comprise a C10-00 isomerized olefin sulfonate, a C8-C30 alkyl benzene sulfonate (ABS), or any combination thereof. In certain embodiments, the primary surfactant can comprise a sulfosuccinate (e.g., a dialkyl sulfosuccinate, such as sodium dihexyl sulfosuccinate). The one or more secondary co-surfactants comprise an anionic surfactant, a non-ionic surfactant, or any combination thereof. For example, in some embodiments, the one or more secondary co-surfactants are chosen from an alkoxy carboxylate surfactant, an alkoxy sulfate surfactant, an alkoxy sulfonate surfactant, an alkyl sulfonate surfactant, an aryl sulfonate surfactant, an olefin sulfonate surfactant, a sulfosuccinate, or any combination thereof.

In some of these embodiments, the primary surfactant can be present in an amount of from 1% to 40% by weight (e.g., from 5% to 25% by weight, from 8% to 20% by weight, or from 10% to 20% by weight), based on the total weight of the surfactant composition.

In some of these embodiments, the one or more secondary co-surfactants can be present in an amount of from 0.2% to 25% by weight (e.g., from 1% to 20% by weight, from 8% to 20% by weight, or from 10% to 20% by weight), based on the total weight of the surfactant composition.

Co-Solvents

As discussed above, the surfactant compositions described herein can include one or more co-solvents.

In some embodiments; the co-solvent can be present in the surfactant composition in an amount greater than 0% by weight (e.g., at least 0.05% by weight, at least 0.1% by weight, at least 0.2% by weight; at least 0.3% by weight, at least 0.4% by weight, at least 0.5% by weight; at least 0.6% by weight, at least 0.7% by weight, at least 0.8% by weight, at least 0.9% by weight, at least 1% by weight, at least 2% by weight, at least 3% by weight, at least 4% by weight, at least 5% by weight, at least 10% by weight, at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, at least 85% by weight, or at least 90% by weight), based on the total weight of the surfactant composition. In some embodiments, the co-solvent can be present in the surfactant composition in an amount of 95% by weight or less (e.g., 90% by weight or less, 85% by weight or less, 80% by weight or less. 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, 15% by weight or less, 10% by weight or less, 5% by weight or less, 4% by weight or less, 3% by weight or less, 2% by weight or less, 1% by weight or less, 0.9% by weight or less, 0.8% by weight or less, 0.7% by weight or less, 0.6% by weight or less, 0.5% by weight or less, 0.4% by weight or less, 0.3% by weight or less; 0.2% by weight or less, 0.1% by weight or less, or 0.05% by weight or less), based on the total weight of the surfactant composition.

The co-solvent can be present in the surfactant composition in an amount ranging from any of the minimum values described above to any of the maximum values described above. For example, in some embodiments, the co-solvent can be present in the surfactant composition in an amount of from greater than 0% to 95% by weight (e.g., from 0.2% to 95% by weight, from 0.5% to 95% by weight, from 5% to 95% by weight, from 10% to 95% by weight, from 10% to 75% by weight, from 10% to 60% by weight, from 10% to 50% by weight, from 20% to 50% by weight, or from 10% to 40% by weight), based on the total weight of the surfactant composition.

The co-solvent can comprise any co-solvent(s) suitable for use in oil and gas operations. Suitable co-solvents include, for example, alcohols, such as lower carbon chain alcohols such as isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycol ethers, ethoxylated phenol, or any other common organic co-solvent or combinations of any two or more co-solvents. In one embodiment, the co-solvent is alkyl ethoxylate (C1-C6)-XEO X=1-30-linear or branched.

In some embodiments, the co-solvent can be chosen from a C1-C6 alcohol, an alcohol ether, a polyalkylene alcohol ether, a polyalkylene glycol, a poly(oxyalkylene)glycol, a poly(oxyalkylene)glycol ether, an ethoxylated phenol, or any combination thereof.

LP Compositions

The surfactant compositions described herein can include any suitable LP composition. Herein, the term "liquid polymer (LP) composition" is used to broadly refer to polymer compositions that are pumpable and/or flowable, so as to be compatible with the single stage mixing processes described herein, Appropriate LP compositions can be selected for incorporation into the surfactant compositions in view of the desired end use for the diluted surfactant composition.

In some embodiments, the LP composition can be present in the surfactant composition in an amount of at least 0.1% by weight (e.g., at least 0.2% by weight, at least 0.3% by weight, at least 0.4% by weight, at least 0.5% by weight, at least 0.6% by weight, at least 0.7% by weight, at least 0.8% by weight, at least 0.9% by weight, at least 1% by weight, at least 2% by weight, at least 3% by weight, at least 4% by weight, at least 5% by weight, at least 10% by weight, at least 15% by weight, at least 20% by weight, at least 25% by weight, at least 30% by weight, at least 35% by weight, at least 40% by weight, at least 45% by weight, at least 50% by weight, or at least 55% by weight), based on the total weight of the surfactant composition. In some embodiments, the LP composition can be present in the surfactant composition in an amount of 60% by weight or less (e.g., 55% by weight or less, 50% by weight or less, 45% by weight or less, 40% by weight or less, 35% by weight or less, 30% by weight or less, 25% by weight or less, 20% by weight or less, 15% by weight or less, 10% by weight or less, 5% by weight or less, 4% by weight or less, 3% by weight or less, 2% by weight or less, 1% by weight or less, 0.9% by weight or less, 0.8% by weight or less, 0.7% by weight or less, 0.6% by weight or less, 0.5% by weight or less, 0.4% by weight or less, 0.3% by weight or less, or 0.2% by weight or less), based on the total weight of the surfactant composition.

The LP composition can be present in the surfactant composition in an amount ranging from any of the minimum values described above to any of the maximum values described above. For example, in some embodiments, the LP composition can be present in the surfactant composition in an amount of from 0.1% to 60% by weight (e.g., from 0.2% to 60% by weight, from 0.1% to 50% by weight, from 0.2% to 60% by weight, from 0.2% to 50% by weight, from 1% to 60% by weight, from 1% to 50% by weight, from 1% to 40% by weight, from 1% to 30% by weight, from 5% to 60% by weight, from 5% to 50% by weight, from 5% to 40% by weight, from 5% to 30% by weight, from 5% to 20% by weight, from 10% to 60% by weight, from 10% to 50% by weight, from 10% to 40% by weight, from 10% to 30% by weight, or from 10% to 20% by weight), based on the total weight of the surfactant composition.

In some examples, the LP composition can comprise a substantially anhydrous polymer suspension that comprises a powder polymer having an average molecular weight of 0.5 to 30 million Daltons suspended in a carrier having an HLB of greater than or equal to 8. In these polymer suspensions, the powder polymer and the carrier can be present in the substantially anhydrous polymer suspension at a weight ratio of from 20:80 to 80:20 (e.g., at a weight ratio of from 30:70 to 70:30, or at a weight ratio of from 40:60 to 60:40). The carrier can comprise at least one surfactant. In some cases, the carrier can be water soluble. In some cases, the carrier can be water soluble and oil soluble.

LP compositions of this type are known in the art, and are discussed in more detailed in the following cases having Chevron U.S.A. Inc. as an assignee: U.S. Patent Application Publication Nos, 2016/0122622, 2016/0122623, 2016/0122624, and 2016/0122626, each of which is incorporated herein by reference in its entirety. Other suitable LP compositions include compositions described, for example, in U.S. Patent Application Publication No. 2017/0158947 to Kim et al., U.S. Patent Application Publication No. 2017/0158948 to Kim et al., U.S. Patent Application Publication No. 2018/0155505 to Kim et al., U.S. Patent Application Publication No. 2019/0002754 to Yang et al., WO 2017/100327 to Jackson et al., WO 2017/100331 to Jackson et al., and WO 2017/100329 to Jackson et al., as well as SPE 179657 entitled "Permeability Reduction Due to use of Liquid Polymers and Development of Remediation Options" by Dwarakanath et al. (SPE IOR symposium at Tulsa 2016), each of which is incorporated herein by reference in its entirety.

In some of these embodiments, the powder polymer for use in the suspension is selected or tailored according to the characteristics of the reservoir for EOR treatment such as permeability, temperature and salinity. Examples of suitable powder polymers include biopolymers such as polysaccharides. For example, polysaccharides can be xanthan gum, scleroglucan, guar gum, a mixture thereof (e.g., any modifications thereof such as a modified chain), etc. Indeed, the terminology "mixtures thereof" or "combinations thereof" can include "modifications thereof" herein. Examples of suitable powder synthetic polymers include polyacrylamides. Examples of suitable powder polymers include synthetic polymers such as partially hydrolyzed polyacrylamides (HPAMs or PHPAs) and hydrophobically-modified associative polymers (APs). Also included are co-polymers of polyacrylamide (PAM) and one or both of 2-acrylamido 2-methylpropane sulfonic acid (and/or sodium salt) commonly referred to as AMPS (also more generally known as acrylamido tertiobutyl sulfonic acid or ATBS), N-vinyl pyrrolidone (NVP), and the NVP-based synthetic may be single-, co-, or ter-polymers. In one embodiment, the powder synthetic polymer is polyacrylic acid (PAA). In one embodiment, the powder synthetic polymer is polyvinyl alcohol (PVA). Copolymers may be made of any, combination or mixture above, for example, a combination of NVP and ATBS.

In some embodiments, the carrier can comprise a mixture of surfactants (e.g., a surfactant and one or more co-surfactants, such as a mixture of non-ionic and anionic surfactants). Examples suitable surfactants include ethoxylated surfactants, nonylphenol ethoxylates, alcohol ethoxylates, internal olefin sulfonates, isomerized olefin sulfonates, alkyl aryl sulfonates, medium alcohol (C10 to C17) alkoxy sulfates, alcohol ether [alkoxy]carboxylates, alcohol ether [alkoxy]sulfates, alkyl sulfonate, α-olefin sulfonates (AOS), dihexyl sulfosuccinates, alkylpolyalkoxy sulfates, sulfonated amphoteric surfactants, and mixtures thereof.

In some embodiments, the carrier can further comprise a co-solvent (e.g., an alcohol, a glycol ether, or a combination thereof). In some cases, the co-solvent can comprise an alcohol ethoxylate (-EO—); an alcohol alkoxylate (—PO-EO—); an alkyl polyglycol ether; an alkyl phenoxy ethoxylate; an ethylene glycol butyl ether (EGBE); a diethylene glycol butyl ether (DGBE); a triethylene glycol butyl ether (TGBE); a polyoxyethylene nonylphenylether, or a mixture thereof. In some cases, the co-solvent can comprise an alcohol selected from the group of isopropyl alcohol (IPA), isobutyl alcohol (IBA) and secondary butyl alcohol (SBA).

In some embodiments, the carrier can comprise an ionic surfactant, non-ionic surfactant, anionic surfactant, cationic surfactant, amphoteric surfactant, ketones, esters, ethers, glycol ethers, glycol ether esters, lactams, cyclic ureas, alcohols, aromatic hydrocarbons, aliphatic hydrocarbons, alicyclic hydrocarbons, nitroalkanes, unsaturated hydrocarbons, halocarbons, alkyl aryl sulfonates (AAS), a-olefin sulfonates (AOS), internal olefin sulfonates (IOS), alcohol ether sulfates derived from propoxylated $C_{12}$-$C_{20}$ alcohols, ethoxylated alcohols, mixtures of an alcohol and an ethoxylated alcohol, mixtures of anionic and cationic surfactants, disulfonated surfactants, aromatic ether polysulfonates, isomerized olefin sulfonates, alkyl aryl sulfonates, medium alcohol (C10 to C17) alkoxy sulfates, alcohol ether [alkoxy] carboxylates, alcohol ether [alkoxy]sulfates, primary amines, secondary amines, tertiary amines, quaternary ammonium cations, cationic surfactants that are linked to a terminal sulfonate or carboxylate group, alkyl aryl alkoxy alcohols, alkyl alkoxy alcohols, alkyl alkoxylated esters, alkyl polyglycosides, alkoxy ethoxyethanol compounds, isobutoxy ethoxyethanol ("iBDGE"), n-pentoxy ethoxyethanol ("n-PDGE"), 2-methylbutoxy ethoxyethanol ("2-MBDGE"), methylbutoxy ethoxyethanol ("3-MBDGE"), (3,3-dimethylbutoxy ethoxyethanol ("3,3-DMBDGE"), cyclohexylmethyleneoxy ethoxyethanol (hereafter "CHMDGE"), 4-Methylpent-2-oxy ethoxyethanol ("MIBCDGE"), n-hexoxy ethoxyethanol (hereafter "n-RIDGE"), 4-methylpentoxy ethoxyethanol ("4-MPDGE"), hutoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, and mixtures thereof.

"Substantially anhydrous" as used herein refers to a polymer suspension which contains only a trace amount of water. Trace amount means no detectable amount of water in one embodiment; less than or equal to 3 wt. % water in another embodiment; and containing less than or equal to any of 2.5%, 2%, 1%, 0.9%, 0.8%, 0.7%, 0.6%, 0.5%, 0.4%, 0.3%, 0.2%, 0.1%, 0.05% or 0.01% water in various embodiments. A reference to "polymer suspension" refers to a substantially anhydrous polymer suspension.

In other examples, LP compositions can comprise one or more synthetic (co)polymers (e.g., one or more acrylamide (co)polymers) dispersed or emulsified in one or more hydrophobic liquids. In some embodiments, the LP compositions can further comprise one or more emulsifying surfactants and one or more inverting surfactants. In some embodiments, the LP compositions can further comprise a small amount of water. For example, the LP compositions can further comprise less than 10% by weight (e.g., less than 5% by weight, less than 4% by weight, less than 3% by weight, less than 2.5% by weight, less than 2% by weight, or less than 1% by weight) water, based on the total weight of all the components of the LP composition. In certain embodiments, the LP compositions can be water-free or substantially water-free (i.e., the composition can include less than 0.5% by weight water, based on the total weight of the composition). The LP compositions can optionally include one or more additional components which do not substantially diminish the desired performance or activity of the composition. It will be understood by a person having ordinary skill in the art how to appropriately formulate the LP composition to provide necessary or desired features or properties.

In some embodiments, the LP composition can comprise one or more hydrophobic liquids having a boiling point at least 100° C.; at least 39% by weight of one or more synthetic co-polymers (e.g., acrylamide-(co)polymers); one or more emulsifier surfactants; and one or more inverting surfactants.

In some embodiments, the LP composition can comprise one or more hydrophobic liquids having a boiling point at least 100° C.; at least 39% by weight of particles of one or more acrylamide-(co)polymers; one or more emulsifier surfactants; and one or more inverting surfactants. In certain embodiments, when the composition is fully inverted in an aqueous fluid, the composition affords an aqueous polymer solution having a filter ratio (FR) (1.2 micron filter) of 1.5 or less. In certain embodiments, the aqueous polymer solution can comprise from 500 to 5000 ppm (e.g., from 500 to 3000 ppm) active polymer, and have a viscosity of at least 20 cP at 30° C.

In some embodiments, the LP compositions can comprise less than 10% by weight (e.g., less than 7% by weight, less than 5% by weight, less than 4% by weight, less than 3% by weight, less than 2.5% by weight, less than 2% by weight, or less than 1% by weight) water prior to combination with the aqueous fluid, based on the total weight of all the components of the LP composition. In certain embodiments, the LP composition, prior to combination with the aqueous fluid, comprises from 1% to 10% water by weight, or from 1% to 5% water by weight, based on the total amount of all components of the composition.

In some embodiments, the solution viscosity (SV) of a 0.1% solution of the LP composition can be greater than 3.0 cP, or greater than 5 cP, or greater than 7 cP. The SV of the LP composition can be selected based, at least in part, on the intended actives concentration of the aqueous polymer solution, to provide desired performance characteristics in the aqueous polymer solution. For example, in certain embodiments, where the aqueous polymer solution is intended to have an wives concentration of about 2000 ppm, it is desirable that the SV of a 0.1% solution of the LP composition is in the range of from 7.0 to 8.6, because at this level, the aqueous polymer solution has desired FR1.2 and viscosity properties. A liquid polymer composition with a lower or higher SV range may still provide desirable results, but may require changing the actives concentration of the aqueous polymer solution to achieve desired FR1.2 and viscosity properties. For example, if the liquid polymer composition has a lower SV range, it may be desirable to increase the actives concentration of the aqueous polymer solution.

In some embodiments, the LP composition can comprise one or more synthetic (co)polymers (e.g., one or more acrylamide (co)polymers) dispersed in one or more hydrophobic liquids. In these embodiments, the LP composition can comprise at least 39% polymer by weight (e.g., at least 40% by weight, at least 45% by weight, at least 50% by weight, at least 55% by weight, at least 60% by weight, at least 65% by weight, at least 70% by weight, or at least 75% by weight), based on the total amount of all components of the composition. In some embodiments, the LP composition can comprise 80% by weight or less polymer (e.g., 75% by weight or less, 70% by weight or less, 65% by weight or less, 60% by weight or less, 55% by weight or less, 50% by weight or less, 45% by weight or less, or 40% by weight or less), based on the total amount of all components of the composition.

The these embodiments, the LP composition can comprise an amount of polymer ranging from any of the minimum values described above to any of the maximum values described above. For example, in some embodiments, the LP composition can comprise from 39% to 80% by weight polymer (e.g., from 39% to 60% by weight polymer, or from 39% to 50% by weight polymer), based on the total weight of the composition.

In some embodiments, the LP composition can comprise one or more synthetic (co)polymers (e.g., one or more acrylamide (co)polymers) emulsified in one or more hydrophobic liquids. In these embodiments, the LP composition can comprise at least 10% polymer by weight (e.g., at least 15% by weight, at least 20% by weight, at least 25% by weight, or at least 30% by weight), based on the total amount of all components of the composition. In some embodiments, the LP composition can comprise less than 38% by weight polymer (e.g., less than 35% by weight, less than 30% by weight, less than 25% by weight, less than 20% by weight, or less than 15% by weight), based on the total amount of all components of the composition.

The these embodiments, the LP composition can comprise an amount of polymer ranging from any of the minimum values described above to any of the maximum values described above. For example, in some embodiments, the LP composition can comprise from 10% to 38% by weight polymer (e.g., from 10% to 35% by weight polymer, from 15% to 30% by weight polymer, from 15% to 35% by weight polymer, from 15% to 38% by weight polymer, from 20% to 30% by weight polymer, from 20% to 35% by weight polymer, or from 20% to 38% by weight polymer), based on the total weight of the composition.

Hydrophobic Liquid

In some embodiments, the LP composition can include one or more hydrophobic liquids. In some cases, the one or more hydrophobic liquids can be organic hydrophobic liquids. In some embodiments, the one or more hydrophobic liquids each have a boiling point at least 100° C. (e.g., at least 135° C., or at least 180° C.). If the organic liquid has a boiling range, the term "boiling point" refers to the lower limit of the boiling range.

In some embodiments, the one or more hydrophobic liquids can be aliphatic hydrocarbons, aromatic hydrocarbons, or mixtures thereof. Examples of hydrophobic liquids include but are not limited to water-immiscible solvents, such as paraffin hydrocarbons, naphthene hydrocarbons, aromatic hydrocarbons, olefins, oils, stabilizing surfactants, and mixtures thereof. The paraffin hydrocarbons can be saturated, linear, or branched paraffin hydrocarbons. Examples of suitable aromatic hydrocarbons include, but are not limited to, toluene and xylene. In certain embodiments; the hydrophobic liquid can comprise an oil, for example, a vegetable oil, such as soybean oil, rapeseed oil, canola oil, or a combination thereof, and any other oil produced from the seed of any of several varieties of the rape plant.

In some embodiments, the amount of the one or more hydrophobic liquids in the inverse emulsion or LP composition is from 20% to 60%, from 25% to 54%, or from 35% to 54% by weight, based on the total amount of all components of the LP composition.

Synthetic (Co)Polymers

In some embodiments, the LP composition includes one or more synthetic (co)polymers, such as one or more acrylamide containing (co)polymers. As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer, A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. The term "polymer" as used herein is intended to include both the acid form of the polymer as well as its various salts.

In some embodiments, the one or more synthetic (co)polymers can be a polymer useful for enhanced oil recovery applications. The term "enhanced oil recovery" or "EOR" (also known as tertiary oil recovery), refers to a process for hydrocarbon production in which an aqueous injection fluid comprising at least a water soluble polymer is injected into a hydrocarbon bearing formation.

In some embodiments, the one or more synthetic (co)polymers comprise water-soluble synthetic (co)polymers. Examples of suitable synthetic (co)polymers include acrylic polymers, such as polyacrylic acids, polyacrylic acid esters, partly hydrolyzed acrylic esters, substituted polyacrylic acids such as polymethacrylic acid and polymethacrylic acid esters, polyacrylamides, partly hydrolyzed polyacrylamides, and polyacrylamide derivatives such as acrylamide tertiary butyl sulfonic acid (ATBS); copolymers of unsaturated carboxylic acids, such as acrylic acid or methacrylic acid, with olefins such as ethylene; propylene and butylene and their oxides; polymers of unsaturated dibasic acids and anhydrides such as maleic anhydride; vinyl polymers, such as polyvinyl alcohol (PVA), N-vinylpyrrolidone, and polystyrene sulfonate; and copolymers thereof, such as copolymers of these polymers with monomers such as ethylene, propylene, styrene, methylstyrene, and alkylene oxides. In some embodiments, the one or more synthetic (co)polymer can comprise polyacrylic acid (PAA), polyacrylamide (PAM), acrylamide tertiary butyl sulfonic acid (ATBS) (or AMPS, 2-acrylamido-2-methylpropane sulfonic acid), N-vinylpyrrolidone (NVP), polyvinyl alcohol (PVA), or a blend or copolymer of any of these polymers. Copolymers may be made of any combination above, for example, a combination of NVP and ATBS. In certain examples, the one or more synthetic (co)polymers can comprise acrylamide tertiary butyl sulfonic acid (ATBS) (or AMPS, 2-acrylamido-2-methylpropane sulfonic acid) or a copolymer thereof.

In some embodiments, the one or more synthetic (co) polymers can comprise acrylamide (co)polymers. In some embodiments, the one or more acrylamide (co)polymers comprise water-soluble acrylamide (co)polymers. In various embodiments, the acrylamide (co)polymers comprise at least 30% by weight, or at least 50% by weight actylamide units with respect to the total amount of all monomeric units in the (co)polymer.

Optionally, the acrylamide-(co)polymers can comprise, besides acrylamide, at least one additional co-monomer. In example embodiments, the acrylamide-(co)polymer may comprise less than about 50%, or less than about 40%, or less than about 30%, or less than about 20% by weight of the at least one additional co-monomer. In some embodiments, the additional comonomer can be a water-soluble, ethylenically unsaturated, in particular monoethylenically unsaturated, comonomer. Suitable additional water-soluble comonomers include comonomers that are miscible with water in any ratio, but it is sufficient that the monomers dissolve sufficiently in an aqueous phase to copolymerize with acrylamide. In some cases, the solubility of such additional monomers in water at room temperature can be at least 50 g/L (e.g., at least 150 g/L, or at least 250 g/L).

Other suitable water-soluble comonomers can comprise one or more hydrophilic groups. The hydrophilic groups can be, for example, functional groups that comprise one or more atoms selected from the group of O-, N-, S-, and P-atoms. Examples of such functional groups include carbonyl groups >C—O, ether groups —O—, in particular polyethylene oxide groups —(CH$_2$—CH$_2$—O—)$_n$—, where n is optionally a number from 1 to 200, hydroxy groups —OH, ester groups —C(O)O—, primary, secondary or tertiary amino groups, ammonium groups, amide groups —C(O)—NH— or acid groups such as carboxyl groups —COOH, sulfonic acid groups —SO$_3$H, phosphonic acid groups —PO$_3$H$_2$ or phosphoric acid groups —OP(OH)$_3$.

Examples of monoethylenically unsaturated comonomers comprising acid groups include monomers comprising —COOH groups, such as acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acrylamidoalkylphosphonic acids or (meth)acryloyloxyalkyl-phosphonic acids. Of course the monomers may be used as salts.

The —COOH groups in polyacrylamide-copolymers may not only be obtained by copolymerizing acrylic amide and monomers comprising —COOH groups but also by hydrolyzing derivatives of —COOH groups after polymerization. For example, the amide groups —CO—NH$_2$ of acrylamide may hydrolyze thus yielding —COOH groups.

Also to be mentioned are derivatives of acrylamide thereof, such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate. N-vinyl derivatives can be hydrolyzed after polymerization to vinylamine units, vinyl esters to vinyl alcohol units.

Other example comonomers include monomers comprising hydroxy and/or ether groups, such as, for example, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or polyethyleneoxide (meth)acrylates.

Other example comonomers are monomers having ammonium groups, i.e monomers having cationic groups. Examples comprise salts of 3-trimethylammonium propylacrylamides or 2-trimethylammonium ethyl(meth)acrylates, for example the corresponding chlorides, such as 3-trimethylammonium propylacrylamide chloride (DIMAPAQUAT) and 2-trimethylammonium ethyl methacrylate chloride (MADAME-QUAT).

Other example monoethylenically unsaturated monomers include monomers which may cause hydrophobic association of the (co)polymers. Such monomers comprise besides the ethylenic group and a hydrophilic part also a hydrophobic part. Such monomers are disclosed for instance in WO 2012/069477, which is incorporated herein by reference in its entirety.

Other example comonomers include N-alkyl acrylamides and N-alkyl quarternary acrylamides, where the alkyl group comprises, for example, a C2-C28 alkyl group.

In certain embodiments, each of the one or more acrylamide-(co)polymers can optionally comprise crosslinking monomers, i.e. monomers comprising more than one polymerizable group. In certain embodiments, the one or more acrylamide-(co)polymers may optionally comprise crosslinking monomers in an amount of less than 0.5%, or 0.1%, by weight, based on the amount of all monomers.

In an embodiment, each of the one or more acrylamide-(co)polymers comprises at least one monoethylenically unsaturated comonomer comprising acid groups, for example monomers which comprise at least one group selected from —COOH, —SO$_3$H or —PO$_3$H$_2$. Examples of such monomers include but are not limited to acrylic acid, methacrylic acid, vinylsulfonic acid, allylsulfonic acid or 2-arcylamido-2-methylpropanesulfonic acid, particularly acrylic acid and/or 2-acrylamido-2-methylpropanesulfonic acid such as acrylic acid or the salts thereof. The amount of such comonomers comprising acid groups can be from 0.1% to 70%, from 1% to 50%, or from 10% to 50% by weight based on the amount of all monomers.

In an embodiment, each of the one or more acrylamide-(co)polymers comprise from 50% to 90% by weight of acrylamide units and from 10% to 50% by weight of acrylic acid units and/or their respective salts, based on the total weight of all the monomers making up the copolymer. In an embodiment, each of the one or more acrylamide-(co) polymers comprises from 60% to 80% by weight of acrylamide units and from 20% to 40% by weight of acrylic acid units, based on the total weight of all the monomers making up the copolymer.

In some embodiments, the one or more synthetic (co) polymers (e.g., the one or more acrylamide (co)polymers) are in the form of particles, which are dispersed in the emulsion or LP. In some embodiments, the particles of the one or more synthetic (co)polymers can have an average particle size of from 0.4 µm to 5 µm, or from 0.5 µm to 2 µm. Average particle size refers to the $d_{50}$ value of the particle size distribution (number average) as measured by laser diffraction analysis.

In some embodiments, the one or more synthetic (co) polymers the one or more acrylamide (co)polymers) can have a weight average molecular weight ($M_w$) of from 5,000,000 g/mol to 30,000,000 g/mol; from 10,000,000 g/mol to 25,000,000 g/mol; or from 15,000,000 g/mol to 25,000,000 g/mol.

In some embodiments, the LP composition can comprise one or more synthetic (co)polymers (e.g., one or more acrylamide (co)polymers) dispersed in one or more hydrophobic liquids. In these embodiments, the amount of the one or more synthetic (co)polymers (e.g., one or more acrylamide (co)polymers) in the LP composition can be at least 39% by weight, based on the total weight of the composition. In some of these embodiments, the amount of the one or more synthetic (co)polymers (e.g., one or more arcylamide-(co) polymers) in the LP composition can be from 39% to 80% by weight, or from 40% to 60% by weight, or from 45% to 55% by weight, based on the total amount of all components of the composition (before dilution), In some embodiments, the amount of the one or more synthetic (co)polymers (e.g., one or more acrylamide-(co)polymers) in the LP composition is 39%, 40%, 41%, 42%, 43%, 44%. 45%, 46%, 47%, 48%, 49%, 50?, 51%. 57%, 53%, 54%, 55%, 56%, 57%, 58%, 59%, 60%, or higher, by weight, based on the total amount of all components of the composition (before dilution).

In some embodiments, the LP composition can comprise one or more synthetic (co)polymers (e.g., one or more acrylamide (co)polymers) emulsified in one or more hydrophobic liquids. In these embodiments, the amount of the one or more synthetic (co)polymers (e.g., one or more acrylamide (co)polymers) in the LP composition can be less than 38% by weight, less than 35% by weight, or less than 30% by weight based on the total weight of the composition. In some of these embodiments, the amount of the one or more synthetic (co)polymers (e.g., one or more acrylamide-(co) polymers) in the LP composition can be from 10% to 35% by weight, from 10% to 38% by weight, from 15% to 30% by weight, from 15% to 38% by weight, from 20% to 38% by weight, or from 20% to 30% by weight, based on the total amount of all components of the composition (before dilution), In some embodiments, the amount of the one or more synthetic (co)polymers (e.g., one or more acrylamide-(co) polymers) in the LP composition is 38%, 37%, 36%, 35%, 34%. 33%, 32%, 31%, 30%, 29%, 78%, 27%, 26%, 25%, 24%, 23%, 22%, 71%, 20%, 19%, 18%, 17%, 16%, 15%, 14%, 13%, 12%, 11%, or less, by weight, based on the total amount of all components of the composition (before dilution).

Emulsifying Surfactants

In some embodiments, the LP composition can include one or more emulsifying surfactants. In some embodiments, the one or more emulsifying surfactants are surfactants capable of stabilizing water-in-oil-emulsions. Emulsifying surfactants, among other things, in the emulsion, lower the interfacial tension between the water and the water-immiscible liquid so as to facilitate the formation of a water-in-oil polymer emulsion. It is known in the art to describe the capability of surfactants to stabilize water-in-oil-emulsions or oil-in-water emulsions by using the so called "HLB-value" (hydrophilic-lipophilic balance), The HLB-value usually is a number from 0 to 20. In surfactants having a low HLB-value the lipophilic parts of the molecule predominate and consequently they are usually good water-in-oil emulsifiers. In surfactants having a high HLB-value the hydrophilic parts of the molecule predominate and consequently they are usually good oil-in-water emulsifiers. In some embodiments, the one or more emulsifying surfactants are surfactants having an HLB-value of from 2 to 10, or a mixture of surfactant having air HLB-value of from 2 to 10.

Examples of suitable emulsifying surfactants include, but are not limited to, sorbitan esters, in particular sorbitan monoesters with C12-C18-groups such as sorbitan monolaurate (HLB approx. 8.5), sorbitan monopalmitate (HLB approx. 7.5), sorbitan monostearate (HLB approx. 4.5), sorbitan monooleate (HLB approx. 4); sorbitan esters with more than one ester group such as sorbitan tristearate (HLB approx. 2), sorbitan trioleate (HLB approx. 2); ethoxylated fatty alcohols with 1 to 4 ethyleneoxy groups, e.g. polyoxyethylene (4) dodecylether ether (HLB value approx. 9), polyoxyethylene (2) hexadecyl ether (HLB value approx. 5), and polyoxyethylene (2) oleyl ether (HLB value approx. 4).

Exemplary emulsifying surfactants include, but are not limited to, emulsifiers having HLB values of from 2 to 10 (e.g., less than 7). Suitable such emulsifiers include the sorbitan esters, phthalic esters, fatty acid glycerides, glycerine esters, as well as the ethoxylated versions of the above and any other well known relatively low HLB emulsifier, Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus, any emulsifier can be utilized which will permit the formation of the initial emulsion and stabilize the emulsion during the polymerization reaction. Examples of emulsifying surfactants also include modified polyester surfactants, anhydride substituted ethylene copolymers, N,N-dialkanol substituted fatty amides, and tallow amine ethoxylates.

In an embodiment, the inverse emulsion or LP composition comprises from 0% to 5% by weight (e.g., from 0.05% to 5%, from 0.1% to 5%, or from 0.5% to 3% by weight) of the one or more emulsifying surfactants, based on the total weight of the composition. These emulsifying surfactants can be used alone or in mixtures. In some embodiments, the inverse emulsion or LP composition can comprise less than 5% by weight (e.g., less than 4% by weight, or less than 3% by weight) of the one or more emulsifying surfactants, based on the total weight of the composition.

Process Stabilizing Agents

In some embodiments, the LP composition can optionally include one or more process stabilizing agents. The process stabilizing agents aim at stabilizing the dispersion of the particles of polyacrylamide-(co)polymers in the organic, hydrophobic phase and optionally also at stabilizing the droplets of the aqueous monomer phase in the organic hydrophobic liquid before and in course of the polymerization or processing of the LP composition. The term "stabilizing" means in the usual manner that the agents prevent the dispersion from aggregation and flocculation.

The process stabilizing agents can be any stabilizing; agents, including surfactants, which aim at such stabilization. In certain embodiments, the process stabilizing agents can be oligomeric or polymeric surfactants. Due to the fact that oligomeric and polymeric surfactants can have many anchor groups they absorb very strongly on the surface of the particles and furthermore oligomers/polymers are capable of forming a dense steric barrier on the surface of the particles which prevents aggregation. The number average molecular weight Mn of such oligomeric or polymeric surfactants may for example range from 500 to 60,000 g/mol (e.g., from 500 to 10,000 g/mol, or from 1,000 to 5,000 g/mol). Suitable oligomeric and/or polymeric surfactants for stabilizing polymer dispersions are known to the skilled artisan. Examples of such stabilizing polymers comprise amphiphilic block copolymers, comprising hydrophilic and hydrophobic blocks, amphiphilic copolymers comprising hydrophobic and hydrophilic monomers and amphiphilic comb polymers comprising a hydrophobic main chain and hydrophilic side chains or alternatively a hydrophilic main chain and hydrophobic side chains.

Examples of amphiphilic block copolymers comprise block copolymers comprising a hydrophobic block comprising alkylarcylates having longer alkyl chains, e.g., C6 to C22-alkyl chains, such as for instance hexyl(meth)acrylate, 2-ethylhexyl(meth)actylate, octyl(meth)acrylate, do-decyl (meth)acrylate, hexadecyhmeth)acrylate or octadecyl(meth) acrylate. The hydrophilic block may comprise hydrophilic monomers such as acrylic acid, methacrylic acid or vinyl pyrrolidone.

Inverting Surfactants

In some embodiments, the LP composition optionally can include one or more inverting surfactants. In some embodiments, the one or more emulsifying surfactants are surfactants which can be used to accelerate the formation of an aqueous polymer solution (e.g., an inverted (co)polymer solution) after mixing the inverse emulsion or LP composition with an aqueous fluid.

Suitable inverting surfactants are known in the art, and include, for example, nonionic surfactants comprising a hydrocarbon group and a polyalkylenoxy group of sufficient hydrophilic nature. In some cases, nonionic surfactants defined by the general formula $R^1-O-(CH(R^2)CH_2-O)_nH$ (I) can be used, wherein $R^1$ is a $C_8$-$C_{22}$-hydrocarbon group, such as an aliphatic $C_{10}$-$C_{18}$-hydrocarbon group, n is a number of $\geq 4$, optionally $\geq 6$, and $R^2$ is methyl or ethyl, with the proviso that at least 50% of the groups $R^2$ are H. Examples of such surfactants include polyethoxylates based on $C_{10}$-$C_{18}$-alcohols such as $C_{12/14}$-, $C_{14/18}$- or $C_{16/18}$-fatty alcohols, $C_{13}$- or $C_{13/15}$-oxoalcohols. The HLB-value can be adjusted by selecting the number of ethoxy groups. Specific examples include tridecylalcohol ethoxylates comprising from 4 to 14 ethylenoxy groups (e.g., tridecylalcohol-8 EO (HLB-value approx. 13-14)) or $C_{12/14}$ fatty alcohol ethoxylates (e.g., $C_{12/14}$.8 EO (HLB-value approx. 13)). Examples of emulsifying surfactants also include modified polyester surfactants, anhydride substituted ethylene copolymers, N,N-dialkanol substituted fatty amides, and tallow amine ethoxylates.

Other suitable inverting surfactants include anionic surfactants, such as, for example, surfactants comprising phosphate or phosphoric acid groups.

In some embodiments, the one or more inverting surfactants can comprise polyoxyethylene sorbitol tetraoleate, $C_{12-14}$ branched ethoxylated alcohol, polyethylene glycol monoleate. In certain embodiments, the one or more inverting surfactants can comprise from 1 to 20 mole % polyoxyethylene sorbitol tetraoleate, from 60 to 80 mole % $C_{12-14}$ branched ethoxylated alcohol and about 15 to about 25 mole % polyethylene glycol monoleate.

In some embodiments, the amount of the one or more inverting surfactants in the inverse emulsion or LP composition is from 1% to 10% (e.g., from 1% to 5%) by weight. based on the total amount of all components of the inverse emulsion or LP composition.

In certain embodiments, the one or more inverting surfactants can be added to the inverse emulsion or LP composition directly after preparation of the composition comprising the one or more acrylamide (co)polymers dispersed in one or more hydrophobic liquids, and optionally the one or more emulsifying surfactants (i.e., the inverse emulsion or liquid dispersion polymer composition which is transported from the location of manufacture to the location of use already comprises the one or more inverting surfactants). In another embodiment the one or more inverting surfactants may be added to the inverse emulsion or LP composition at the location of use (e.g., at an off-shore production site).

Stabilizing Agents

Inverse emulsion and liquid polymer compositions can form gels and experience separation of their oil and water phases over time. In particular, the shelf-life stability of such compositions having high polymer actives may decrease as the solids content is raised. In some instances, such compositions may deteriorate to form an oil film and a hard cake in packaging within the amount of time it takes to manufacture and transport the compositions to the platform (e.g., about 30 days), The hard cake may not be readily redistributed in the composition, which results in lower overall polymer actives in the deteriorated composition. Thickening additives may be used to minimize settling of the inverse emulsion and liquid polymer compositions, however they may have a detrimental effect on the filter ratio of the compositions.

Accordingly, the LP compositions can optionally comprise one or more stabilizing agents (e.g., one or more siloxane polyether compounds, one or more poly(alkyl) acrylate compounds, or a combination thereof) which may prevent or minimize sedimentation and/or caking of solids in the liquid polymer or inverse emulsion compositions. In embodiments, the compositions according to the embodiments comprise an acrylamide (co)polymer and one or more stabilizing agents chosen from one or more siloxane polyether compounds, one or more poly(alkyl)acrylate compounds, or a combination thereof, Such additives are described, for example, in U.S. Patent Application Publication No. 2019/0002754 to Yang et al., which is incorporated herein by reference in its entirety.

The term "stabilizing" means, as in the usual manner, that the stabilizing agents prevent the dispersion from aggregation and flocculation, or prevent sedimentation and/or caking of the solids or particles in the composition and/or creation of separated oil phase. As used herein, "caking" refers to the formation of lumps or masses from the solids or particles in the composition. Generally, hard caking is characterized by strong, adhesive forces between the particles, and/or the formation of a cake which is difficult to redisperse. Soft caking may be characterized by weak, adhesive forces between the particles, and/or the formation of a cake which is more readily redispersed. Ideally, the solids and particles of the composition remain substantially evenly dispersed in the liquids of the composition. In certain embodiments, the stabilizing agent increases the stability of the LP composition such that the composition shows no caking, or only soft caking, after about 20, about 30, about 40, about 50, about 60, about 70, about 80, about 90 or about 100 days at a temperature in the range of about 30 to 50° C. In certain embodiments, compositions which undergo soft caking are re-dispersable with gentle agitation or stirring. In certain embodiments, the compositions show no caking, or only soft caking, after about 20, about 30, about 40, about 50, about 60, about 70, about 80, about 90 or about 100 days at a temperature in the range of about 30 to 50° C. In embodiments, less than about 10%, about 5%, or about 2% of the solids or particles in the composition have settled into a soft cake after about 20, about 30, about 40, about 50, about 60, about 70, about 80, about 90 or about 100 days at a temperature in the range of about 30 to 50° C.

The one or more stabilizing agents can be chosen from one or more siloxane polyether compounds, one or more poly(alkyl)acrylate compounds, or a combination thereof. In some embodiments, the LP composition can comprise one or more siloxane polyether compounds. In some embodiments, the LP composition can comprise one or more poly(alkyl) acrylate compounds. In some embodiments, the LP composition can comprise one or more siloxane polyether compounds and one or more poly(alkyl)acrylate compounds.

In an embodiment, the Lp composition comprises about 0.5% to about 8%, about 1% to about 5%, about 1.5% to about 5%, or about 1.5% to about 3.5% by weight of the one or more stabilizing agents (e.g., one or more siloxane polyether compounds, one or more poly(alkyl)acrylate compounds, or a combination thereof).

In embodiments, the one or more stabilizing agents can comprise one or more siloxane polyether compounds, and the one or more siloxane polyether compounds can be present in amounts of greater than about 0.5%, greater than about 1%, or greater than about 2% by weight of the total liquid polymer or inverse emulsion composition.

In embodiments, the composition comprises a siloxane polyether compound with terminal or pendent ethoxylation. In an embodiment, the composition comprises a siloxane polyether compound with terminal ethoxylation. In an embodiment, the composition comprises a siloxane polyether compound of Formula I:

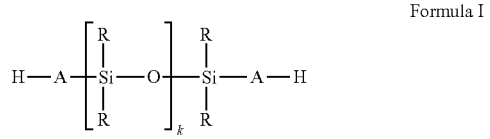

Formula I wherein each R is independently selected from methyl, ethyl and propyl;

each A independently represents a chain of ethylene oxide (EO) and, optionally, propylene oxide (PO) units, which may be present in block, alternating or random arrangement, wherein the quantity of EO units is in the range of 4 to 30 and the quantity of PO units is in the range of 0 to 30; and k is an integer from 5 to 30.

In embodiments, the A units are the same. In embodiments, the A units are different. In embodiments, the A units comprise only EO units. In embodiments, the A units comprises both EO and PO units, which are present in block arrangement, for example each A group consists of two or more, or three or more, blocks of EO or PO units. In embodiments, the A units comprises both EO and PO units, which are present in random arrangement. In embodiments, the A units comprises both EO and PO units, which are present in an alternating arrangement, e.g. an EO-PO-EO-PO chain.

In embodiments, R is methyl. In embodiments, R is ethyl. In embodiments, R is propyl, for example n-propyl or isopropyl.

In an embodiment, the composition comprises a siloxane polyether compound with pendant ethoxylation. In an embodiment, the composition comprises a siloxane polyether compound of Formula II:

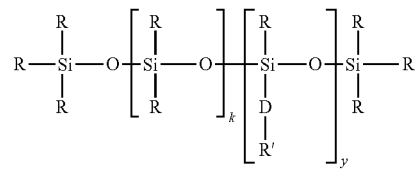

Formula II wherein each R is independently selected from methyl, ethyl and propyl;

each D independently represents a chain of ethylene oxide (EO) and, optionally, propylene oxide (PO) units, which may be present in block, alternating or random arrangement, wherein the quantity of EO units is in the range of 3 to 50 and the quantity of PO units is in the range of 0 to 40;

R' is hydroxyl or acetate;

y is an integer from 5 to 30; and k is an integer from 5 to 100.

In certain embodiments, each D independently represents a chain of ethylene oxide (EO) and propylene oxide (PO) units, which may be present in block, alternating or random arrangement, wherein the quantity of EO units is in the range of 3 to 50 and the quantity of PO units is in the range of 3 to 40.

In embodiments, the D units are the same. In embodiments, the D units are different. In embodiments, the units comprise only EO units. In embodiments, the D units comprises both EO and PO units, which are present in block arrangement, for example each D group consists of two or more, or three or more, blocks of EO or PO units. In embodiments, the D units comprises both EO and PO units, which are present in random arrangement. In embodiments, the D units comprises both EO and PO units, which are present in an alternating arrangement, e.g. an EO-PO-EO-PO chain.

In embodiments, R is methyl. In embodiments, R is ethyl. In embodiments, R is propyl, for example n-propyl or isopropyl.

In embodiments, R' is hydroxyl. In embodiments, R' is acetate.

In embodiments, the siloxane polyether compound is, for example, a siloxane polyether with pendent ethoxylation and EO/PO ratio in the range of about 15/85 to about 85/15; about 15/85 to about 50/50; or about 25/75 to about 40/60. In embodiments, the siloxane polyether compound generally includes more EO and/or PO units than siloxane units by weight of the compound. In embodiments, the siloxane polyether compound has pendent ethoxylation and the value of y is greater than the value of k. In embodiments, the siloxane polyether compound has pendent ethoxylation and the k:y ratio is in the range of about 1:3 to about 1:100.

In embodiments, the siloxane polyether compound is, for example, a siloxane polyether with pendent ethoxylation and an HLB value of about 10 to about 14.

In embodiments, the siloxane polyether compound is selected from the following commercially available products: SG3381 from Wacker, Tegopren 5825 from Evonik, Tegopren 5863 from Evonik, and KF-355A from ShinEtsu.

In embodiments, the one or more stabilizing agents can comprise one or more poly(alkyl)acrylate compounds, and the one or more poly(alkyl)acrylate compounds can be present in amounts of about 0.5% to about 1.5%, or about 0.5% to about 1.5%, by weight of the total LP composition.

In embodiments, the composition comprises a poly(alkyl) acrylate compound of Formula III:

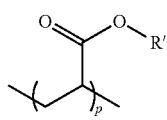

Formula III wherein
R' is a straight or branched C6-14 alkyl group; and
p is an integer from 2000 to 5000.

In an embodiments, the poly(alkyl)acrylate compound is, for example, poly(2-ethylhexyl)acrylate.

In embodiments, the poly(2-ethylhexyl)acrylate has a MW in the range about 90000 to 95000 Daltons.

In embodiments, the compositions may further comprise additional stabilizing agents, for example agents which aim at such stabilization of the dispersion or emulsion, such as oligomeric or polymeric surfactants. Due to the fact that oligomeric and polymeric surfactants have many anchor groups they absorb very strongly on the surface of the particles and furthermore oligomers/polymers are capable of forming a dense steric barrier on the surface of the particles which prevents aggregation. The number average molecular weight Mn of such oligomeric or polymeric surfactants may for example range from 500 to 60,000 Daltons, from 500 to 10,000 Daltons, or from 1,000 to 5,000 Daltons. Oligomeric and/or polymeric surfactants for stabilizing polymer dispersions are known to the skilled artisan. Examples of such stabilizing polymers comprise amphiphilic copolymers, comprising hydrophilic and hydrophobic moiety, amphiphilic copolymers comprising hydrophobic and hydrophilic monomers and amphiphilic comb polymers comprising a hydrophobic main chain and hydrophilic side chains or alternatively a hydrophilic main chain and hydrophobic side chains.

Examples of amphiphilic copolymers comprise copolymers comprising a hydrophobic moiety comprising alkylacrylates having longer alkyl chains, e.g. C6 to C22-alkyl chains, such as for instance hexyl(meth)acrylate, 2-ethylhexyl(meth)acrylate, octyl(meth)acrylate, do-decyl(meth) acrylate, hexadecyl(meth)acrylate or octadecyl(meth)acrylate. The hydrophilic moiety may comprise hydrophilic monomers such as acrylic acid, methacrylic acid or vinyl pyrrolidone.

In an embodiment, the LP composition comprises about 0% to about 8%, about 0.1% to about 5%, or about 1% to about 5% by weight of the one or more additional stabilizing agents described herein.

Other Components

Optional further components can be added to the inverse emulsion or LP composition. Examples of such components comprise radical scavengers, oxygen scavengers, chelating agents, biocides, stabilizers, or sacrificial agents.

Methods for Preparing Surfactant Compositions

Also provided are methods for preparing the concentrated liquid surfactant compositions described herein. Methods for preparing the concentrated liquid surfactant compositions can comprise combining an LP composition, a surfactant package, and a co-solvent to form the surfactant composition. The surfactant package can comprise from 0.2% to 98% by weight of the surfactant composition. The co-solvent can comprise from greater than 0% to 95% by weight of the surfactant composition. The LP composition can comprise from 0.1% to 60% by weight of the surfactant composition. The surfactant composition can have a total water content of from 0.5% to 20% by weight, based on the total weight of the surfactant composition.

In some embodiments, combining the LP composition, the surfactant package, and the co-solvent can comprise mixing from 0.1 parts to 60 parts of the LP composition with from 0.2 parts to 98 parts of the surfactant composition and from greater than 0 parts to 95 parts of the co-solvent. In some embodiments, combining the LP composition, the surfactant package, and the co-solvent can comprise adding the LP composition to a mixture comprising the surfactant package and the co-solvent.

Preparation Aqueous Surfactant-Polymer Solutions

Provided herein are aqueous surfactant-polymer solutions, as well as methods of preparing the aqueous surfactant-polymer solutions from surfactant compositions, such as those described above, using a single stage mixing process.

Methods for preparing an aqueous surfactant-polymer solution from the surfactant compositions described herein can comprise combining the surfactant composition with an aqueous fluid in a single stage mixing process to provide an aqueous surfactant-polymer solution having a concentration of one or more (co)polymers (e.g., one or more synthetic (co)polymers, such as one or more acrylamide (co)polymers) of from 50 to 15,000 ppm.

In some embodiments, the aqueous surfactant-polymer solution can have a concentration of one or more (co) polymers (e.g., one or more synthetic (co)polymers, such as one or more acrylamide (co)polymers) of at least 50 ppm (e.g., at least 100 ppm, at least 250 ppm, at least 500 ppm, at least 750 ppm, at least 1000 ppm, at least 1500 ppm, at least 2000 ppm, at least 2500 ppm, at least 3000 ppm, at least 3500 ppm, at least 4000 ppm, at least 4500 ppm, at least 5000 ppm, at least 5500 ppm, at least 6000 ppm, at least 6500 ppm, at least 7000 ppm, at least 7500 ppm, at least 8000 ppm, at least 8500 ppm, at least 9000 ppm, at least 9500 ppm, at least 10,000 ppm, at least 10,500 ppm, at least 11,000 ppm, at least 11,500 ppm, at least 12,000 ppm, at least 12,500 ppm, at least 13,000 ppm, at least 13,500 ppm, at least 14,000 ppm, or at least 14,500 ppm).

In some embodiments, the aqueous surfactant-polymer solution can have a concentration of one or more (co) polymers (e.g., one or more synthetic (co)polymers, such as one or more acrylamide (co)polymers) of 15,000 ppm or less (e.g., 14,500 ppm or less, 14,000 ppm or less, 13,500 ppm or less, 13,000 ppm or less, 12,500 ppm or less, 12,000 ppm or less, 11,500 ppm or less, 11,000 ppm or less, 10,500 ppm or less, 10,000 ppm or less, 9,500 ppm or less, 9,000 ppm or less, 8,500 ppm or less, 8,000 ppm or less, 7,500 ppm or less, 7,000 ppm or less, 6,500 ppm or less, 6,000 ppm or less, 5,500 ppm or less, 5,000 ppm or less, 4500 ppm or less, 4000 ppm or less, 3500 ppm or less, 3000 ppm or less, 2500 ppm or less, 2000 ppm or less, 1500 ppm or less, 1000 ppm or less, 750 ppm or less, 500 ppm or less, 250 ppm or less, or 100 ppm or less).

The aqueous surfactant-polymer solution can have a concentration of one or more (co)polymers (e.g., one or more synthetic (co)polymers, such as one or more acrylamide (co)polymers) ranging from any of the minimum values described above to any of the maximum values described above. For example, in some embodiments, the aqueous surfactant-polymer solution can have a concentration of one or more (co)polymers (e.g., one or more synthetic (co) polymers, such as one or more acrylamide (co)polymers) of from 500 to 5000 ppm (e.g., from 500 to 3000 ppm, or from 500 to 1500 ppm).

In some embodiments, the aqueous surfactant-polymer solution can be an aqueous unstable colloidal suspension. In other embodiments, the aqueous surfactant-polymer solution can be an aqueous stable solution.

In some embodiments, the aqueous surfactant-polymer solution can have a filter ratio of 1.5 or less (e.g., 1.45 or less, 1.4 or less, 1.35 or less, 1.3 or less, 1.25 or less, 1.2 or less. 1.15 or less, 1.1 or less, or less than 1.05) at 15 psi using a 1.2 μm filter. In some embodiments, the aqueous surfactant-polymer solution can have a filter ratio of greater than 1 (e.g., at least 1.05, at least 1.1, at least 1.15, at least 1.2, at least 1.25, at least 1.3, at least 1.35, at least 1.4, or at least 1.45) at 15 psi using a 1.2 μm filter.

The aqueous surfactant-polymer solution can a filter ratio at 15 psi using a 1.2 μm filter ranging from any, of the minimum values described above to any of the maximum values described above. For example, in some embodiments, the aqueous surfactant-polymer solution can have a filter ratio of from 1 to 1.5 (e.g., from 1.1 to 1.4, or from 1.1 to 1.3) at 15 psi using a 1.2 μm filter.

In certain embodiments, the aqueous surfactant-polymer solution can have a viscosity based on shear rate, temperature, salinity, polymer concentration, and polymer molecular weight. In some embodiments, the aqueous surfactant-polymer solution can have a viscosity of from 2 cP to 100 cP, where the 2 cP to 100 cP is an output using the ranges in the following table:

| | |
|---|---|
| Polymer viscosity (cP) | 2~100 |
| Shear rate (1/sec) | 0.1~1000 |
| Temperature (° C.) | 1~120 |
| Salinity (ppm) | 0~250,000 |
| Polymer concentration (ppm) | 50~15,000 |
| Polymer molecular weight (Dalton) | 2M~26M |

In some embodiments, the aqueous surfactant-polymer solution can have a viscosity of from 25 cP to 35 cP at 30° C. In some embodiments, the aqueous surfactant-polymer solution can have a viscosity of greater than 10 cP at 40° C. In certain embodiments, the aqueous surfactant-polymer solution can have a viscosity of from 20 cP to 30 cP at 40° C.

In some embodiments, when the surfactant composition is combined with an aqueous fluid, providing an aqueous surfactant-polymer solution having from 50 to 15,000 ppm, from 500 to 5,000 ppm, or from 500 to 3000 ppm, active polymer, the aqueous surfactant-polymer solution has a viscosity of at least 20 cP at 40° C., and a filter ratio (FR) (1.2 micron filter) of 1.5 or less. In certain embodiments, when the surfactant composition is combined with in an aqueous fluid, providing an aqueous surfactant-polymer solution having from 50 to 15,000 ppm, from 500 to 5000 ppm, or from 500 to 3000 ppm, active polymer, the aqueous surfactant-polymer solution has a viscosity of at least 20 cP at 30° C., and a filter ratio (FR) (1.2 micron filter) of 1.5 or less.

The ability of a surfactant-polymer solution to reduce the interfacial tension of a mixture of hydrocarbons and fluids may be evaluated using known techniques. For example, an interfacial tension value for a mixture of hydrocarbons and water may be determined using a spinning drop tensiometer. An amount of the surfactant-polymer solution may be added to the hydrocarbon/water mixture and an interfacial tension value for the resulting fluid may be determined. A high interfacial tension value (e.g., greater than about 10 dynes/cm) may indicate the inability of the hydrocarbons and water to form a fluid emulsion. As used herein, an "emulsion" refers to a dispersion of one immiscible fluid into a second fluid by addition of a composition that reduces the interfacial tension between the fluids to achieve stability. The inability of the fluids to mix may be due to high surface interaction energy between the two fluids. Low interfacial tension values may indicate less surface interaction between the two immiscible fluids. Less surface interaction energy between two immiscible fluids may result in the mixing of the two fluids to form an emulsion. Fluids with low interfacial tension values may be mobilized to a well bore due to reduced capillary forces and subsequently produced from a hydrocarbon containing formation.

In some embodiments, the surfactant-polymer solution can exhibit a low interfacial tension (e.g., a surface tension of 0.01 dynes/cm or less). For example, in some embodiments, the surfactant-polymer solution can exhibit an interfacial tension that ranges from 0.00001 dynes/cm to 0.01 dynes/cm (e.g., from 0.00005 dynes/cm to 0.01 dynes/cm, from 0.0001 dynes/cm to 0.01 dynes/cm, from 0.0005 dynes/cm to 0.01 dynes/cm, from 0.001 dynes/cm to 0.01 dynes/cm, or from 0.005 dynes/cm to 0.01 dynes/cm).

In some cases, combining a surfactant composition with an aqueous fluid can comprise inverting the surfactant composition in an aqueous fluid to provide the aqueous surfactant-polymer solution. In these embodiments, the aqueous surfactant-polymer solution can be said to be an "inverted surfactant-polymer solution." As used herein, "inverted" refers to the point at which the viscosity of the aqueous surfactant-polymer solution has substantially reached a consistent viscosity. In practice, this may be determined for example by measuring viscosity of the aqueous surfactant-polymer solution periodically over time and when three consecutive measurements are within the standard of error for the measurement, then the composition is considered inverted. In some embodiments, inversion of the surfactant composition forms an inverted surfactant-polymer solution in 30 minutes or less (e.g., 15 minutes or less, 10 minutes or less, 5 minutes or less, or less).

As described above, methods for preparing an aqueous surfactant-polymer solution from a surfactant composition comprising one or more synthetic (co)polymers (e.g., one or more acrylamide (co)polymers) can comprise combining the surfactant composition with an aqueous fluid in a single stage mixing process to provide an aqueous surfactant-polymer solution having a concentration of one or more synthetic (co)polymers (e.g., one or more acrylamide (co) polymers) of from 50 to 15,000 ppm. The single stage mixing process can comprise applying a specific mixing energy of at least 0.10 kJ/kg to the surfactant composition and the aqueous fluid.

In some embodiments, the single stage mixing process can comprise applying a specific mixing energy of at least 0.10 kJ/kg (e.g., at least 0.15 kJ/kg, at least 0.20 kJ/kg, at least 0.25 kJ/kg, at least 0.30 kJ/kg, at least 0.35 kJ/kg, at least 0.40 kJ/kg, at least 0.45 kJ/kg, at least 0.50 kJ/kg, at least 0.55 kJ/kg, at least 0.60 kJ/kg, at least 0.65 kJ/kg, at least 0.70 kJ/kg, at least 0.75 kJ/kg, at least 0.80 kJ/kg, at least 0.85 kJ/kg, at least 0.90 kJ/kg, at least 0.95 kJ/kg, at least 1.00 kJ/kg, at least 1.05 kJ/kg, at least 1.10 kJ/kg, at least 1.15 kJ/kg, at least 1.20 kJ/kg, at least 1.25 kJ/kg, at least 1.30 kJ/kg, at least 1.35 kJ/kg, at least 1.40 kJ/kg, or at least 1.45 kJ/kg) to the surfactant composition and the aqueous fluid. In some embodiments, the single stage mixing process can comprise applying a specific mixing energy of 1.50 kJ/kg or less (e.g., 1.45 kJ/kg or less, 1.40 kJ/kg or less, 1.35 kJ/kg or less, 1.30 kJ/kg or less, 1.25 kJ/kg or less, 1.20 kJ/kg or less, 1.15 kJ/kg or less, 1.10 kJ/kg or less, 1.05 kJ/kg or less, 1.00 kJ/kg or less, 0.95 kJ/kg or less, 0.90 kJ/kg or less, 0.85 kJ/kg or less, 0.80 kJ/kg or less, 0.75 kJ/kg or less, 0.70 kJ/kg or less, 0.65 kJ/kg, or less, 0.60 kJ/kg or less, 0.55 kJ/kg or less, 0.50 kJ/kg or less, 0.45 kJ/kg or less, 0.40 kJ/kg or less, 0.35 kJ/kg or less, 0.30 kJ/kg or less, 0.25 kJ/kg or less, 0.20 kJ/kg or less, or 0.15 kJ/kg or less) to the surfactant composition and the aqueous fluid.

The single stage mixing process can comprise applying a specific mixing energy to the surfactant composition and the aqueous fluid ranging from any of the minimum values described above to any of the maximum values described above. For example; in some embodiments, the single stage mixing process can comprise applying a specific mixing energy of from 0.10 kJ/kg to 1.50 kJ/kg (e.g., from 0.15 kJ/kg to 1.40 kJ/kg, from 0.15 kJ/kg, to 1.20 kJ/kg) to the surfactant composition and the aqueous fluid.

The surfactant composition can be combined with an aqueous fluid in a batch process or a continuous process. In certain embodiments, the surfactant composition is combined with an aqueous fluid in a continuous process. For example, the surfactant composition can be combined with an aqueous fluid as a continuous process to produce a fluid stream for injection into a hydrocarbon-beating formation. A continuous process is a process that can be effected without the need to be intermittently stopped or slowed. For example, continuous processes can meet one or more of the following criteria: (a) materials for forming the aqueous polymer solution (e.g., the surfactant composition and the aqueous fluid) are fed into the system in which the aqueous surfactant-polymer solution is produced at the same rate as the aqueous surfactant-polymer solution is removed from the system; (b) the nature of the composition(s) introduced to the system in which the aqueous surfactant-polymer solution is produced is a function of the composition(s) position with the process as it flows from the point at which the composition(s) are introduced to the system to the point at which the aqueous surfactant-polymer solution is removed from the system; and/or (c) the quantity of aqueous surfactant-polymer solution produced is a function of (i) the duration for which the process is operated and (ii) the throughput rate of the process.

As discussed above, methods for preparing an aqueous surfactant-polymer solution from a surfactant composition can comprise combining the surfactant composition with an aqueous fluid in a single stage mixing process. As used herein, the phase "single stage mixing process" refers to mixing processes where a surfactant composition and an aqueous fluid are combined in their final proportions either before mixing or within a first mixer, such that the fluid exiting the first mixer includes all components of the final aqueous surfactant-polymer solution at their final concentration. Optionally, the fluid exiting the first mixer can undergo additional mixing steps; however, additional volumes of the surfactant composition or the aqueous fluid are not added once the fluid exits the first mixer. In this context; single stage mixing processes can be distinguished from conventional dual-stage and multistage mixing processes. Dual-stage and multistage mixing processes generally would involve the combination of a surfactant composition and an aqueous fluid either before mixing or within a first mixer to produce a concentrated composition, which must then be diluted with additional aqueous fluid after leaving the first mixer to produce a fluid that includes all of the components of the final aqueous surfactant-polymer solution at their final concentrations.

The single stage mixing process can comprise a single mixing step; or a plurality of mixing steps (i.e., two or more steps). In single stage mixing processes that comprise a single mixing step, a surfactant composition and an aqueous fluid are combined in their final proportions (either before mixing or within a first mixer), mixed within a first mixer, and exit the first mixer as an aqueous surfactant-polymer solution. For example, a polymer feed stream comprising the surfactant composition can be combined (e.g., in a fixed ratio) with an aqueous fluid stream upstream of or within an in-line mixer. The combined fluid stream can then pass through the in-line mixer, emerging as the aqueous surfactant-polymer solution. In some embodiments, the in-line mixer can have a mixer inlet and a mixer outlet, and the difference in pressure between the mixer inlet and the mixer outlet can be from 15 psi to 400 psi (e.g., from 15 psi to 150 psi, from 15 psi to 100 psi, or from 15 psi to 75 psi).

Figure 18:
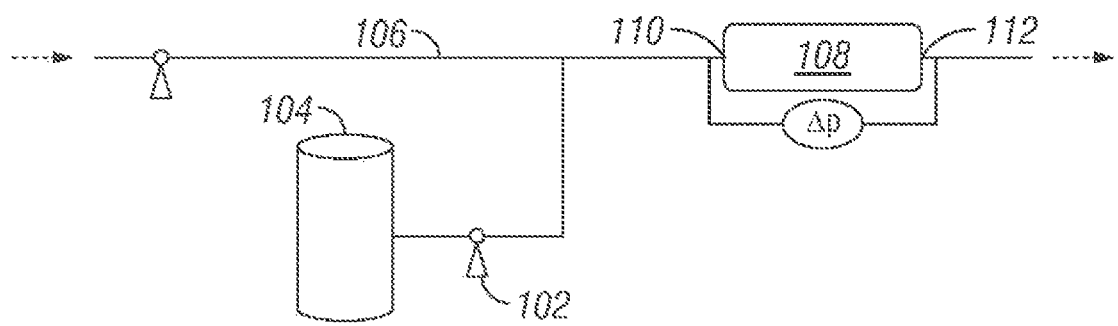
FIG. 18 is a process flow diagram schematically illustrating an example single stage mixing process for preparing an aqueous polymer solution. The example single stage mixing process comprises a single mixing step.

An example system for the preparation of an aqueous surfactant-polymer solution in a single mixing step is illustrated schematically in FIG. 18. As shown in FIG. 18, a pump 102 can be used to inject a stream of the surfactant composition 104 into a line 106 carrying the aqueous fluid stream. The combined fluid stream can then pass through an in-line mixer 108 having a mixer inlet 110 and a mixer outlet 112; emerging as the aqueous surfactant-polymer solution. The pressure drop through the in-line mixer 108 ($\Delta p$) can be from 15 psi to 400 psi (e.g., from 15 psi to 150 psi, from 15 psi to 100 psi, or from 15 psi to 75 psi).

In other embodiments, the single stage mixing process comprise two or more mixing steps (e.g., a first mixing step in which a surfactant composition and an aqueous fluid are combined in their final proportions (either before mixing or within a first mixer), mixed within a first mixer, and exit the first mixer as a partially mixed aqueous surfactant-polymer solution; and one or more additional mixing steps in which the partially mixed aqueous surfactant-polymer solution is mixed within one or more additional mixers to produce the final aqueous surfactant-polymer solution). For example, the single stage mixing process can comprise two, three, four, five, or more consecutive mixing steps. In certain cases, the single stage mixing process can comprise two mixing steps.

Figure 19:
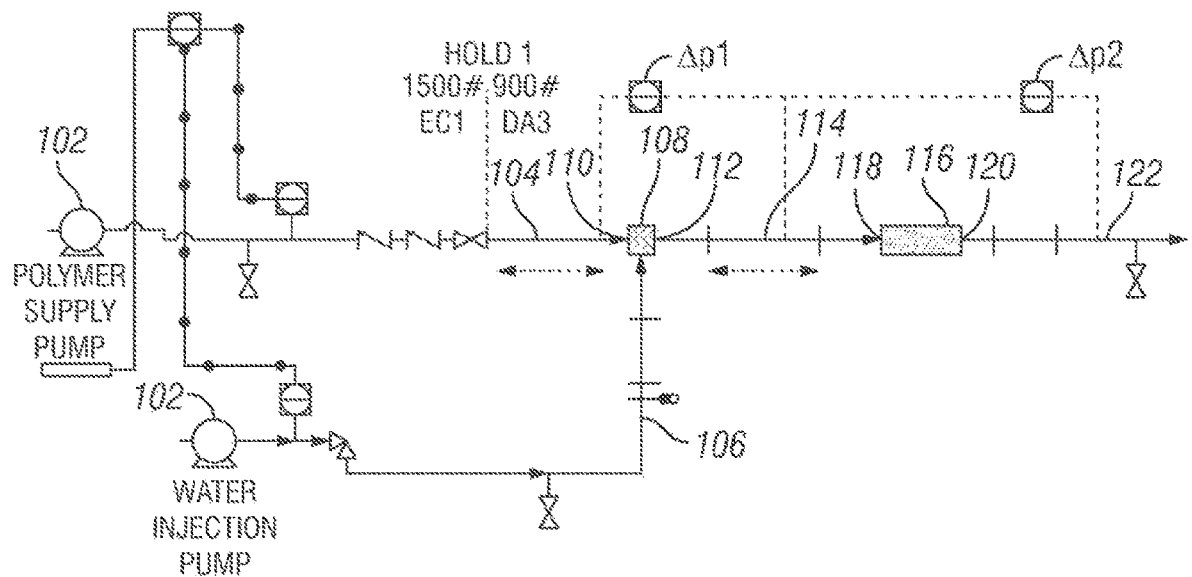
FIG. 19 is a process flow diagram schematically illustrating an example single stage mixing process for preparing an aqueous polymer solution. The example single stage mixing process comprises two mixing steps.

An example system for the preparation of an aqueous surfactant-polymer solution in two mixing steps is illustrated schematically in FIG. 19, As shown in FIG. 19, pumps 102 can be used to inject a stream of the surfactant composition 104 and a stream of aqueous fluid 106 through a first in-line mixer 108 having a first mixer inlet 110 and a first mixer outlet 112, emerging as a stream of partially mixed aqueous surfactant-polymer solution 114. The partially mixed aqueous surfactant-polymer solution can comprise a concentration of synthetic (co)copolymer of from 50 to 15,000 ppm (e.g., from 500 to 5000 ppm, or from 500 to 3000 ppm). The pressure drop through the first in-line mixer 108 ($\Delta p1$) can be from 15 psi to 400 psi (e.g., from 15 psi to 150 psi, from 15 psi to 100 psi, or from 15 psi to 75 psi). The stream of partially mixed aqueous surfactant-polymer solution 114 can then pass through a second in-line mixer 116 having a second mixer inlet 118 and a second mixer outlet 120, emerging as a stream of aqueous surfactant-polymer solution 122. The pressure drop through the second in-line mixer 116 ($\Delta p2$) can be from 15 psi to 400 psi (e.g., from 15 psi to 150 psi, from 15 psi to 100 psi, or from 15 psi to 75 psi). In some embodiments, the first in-line mixer can comprise a static mixer and the second in-line mixer can comprise a static mixer. In other examples, the first in-line mixer can comprise a static mixer and the second in-line mixer can comprise a dynamic mixer.

Figure 20:
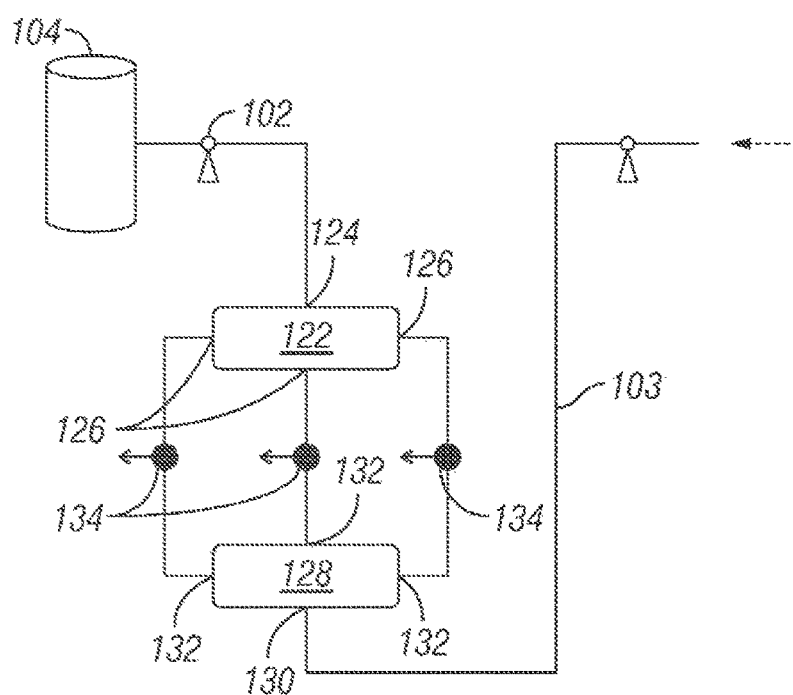
FIG. 20 is a process flow diagrams schematically illustrating an example single stage mixing process for preparing an aqueous polymer solution. The example single stage mixing process comprises a plurality of parallel mixing steps (e.g., parallel single mixing steps, parallel multiple mixing steps, or a combination thereof).

In some embodiments, the single stage mixing process for preparing an aqueous surfactant-polymer solution can comprise parallel single mixing steps, parallel multiple mixing steps, or a combination thereof. An example system for the preparation of an aqueous surfactant-polymer solutions using parallel mixing steps (e.g., parallel single mixing steps, parallel multiple mixing steps, or a combination thereof) is illustrated schematically in FIG. 20. As shown in FIG. 20, a pump 102 can be used to direct a stream of the surfactant composition 104 to a surfactant composition manifold (SC manifold, 122). SC manifold 122 can include an SC manifold inlet 124 through which the surfactant composition enters the SC manifold 122, and a plurality of SC manifold outlets 126 (in this example three manifold outlets) through which streams of the surfactant composition exit the SC manifold 122. The system can also include a main line 103 carrying an aqueous fluid stream to aqueous fluid manifold 128. The aqueous fluid manifold 128 can include an aqueous fluid manifold inlet 130 through which the aqueous fluid enters the aqueous fluid manifold 128, and a plurality of aqueous fluid manifold outlets 132 (in this example three manifold outlets) through which streams of the aqueous fluid exit the aqueous fluid manifold 128. Each stream of surfactant composition exiting SC manifold 122 can then be combined with a stream of aqueous fluid exiting the aqueous fluid manifold 128 in a different configuration of in-line mixers 134, thereby forming a plurality of streams of the aqueous surfactant-polymer solution in parallel. Each configuration of in-line mixers 134 can include, independently, a single in-line mixer or a plurality of in-line mixers fluidly connected in series (e.g., as shown in FIGS. 1 and 2). By selecting appropriate configurations of in-line mixers 134, system for the preparation of an aqueous polymer solutions that employ parallel single steps, parallel multiple steps, or any combination thereof can be readily fabricated.

Figure 21A:
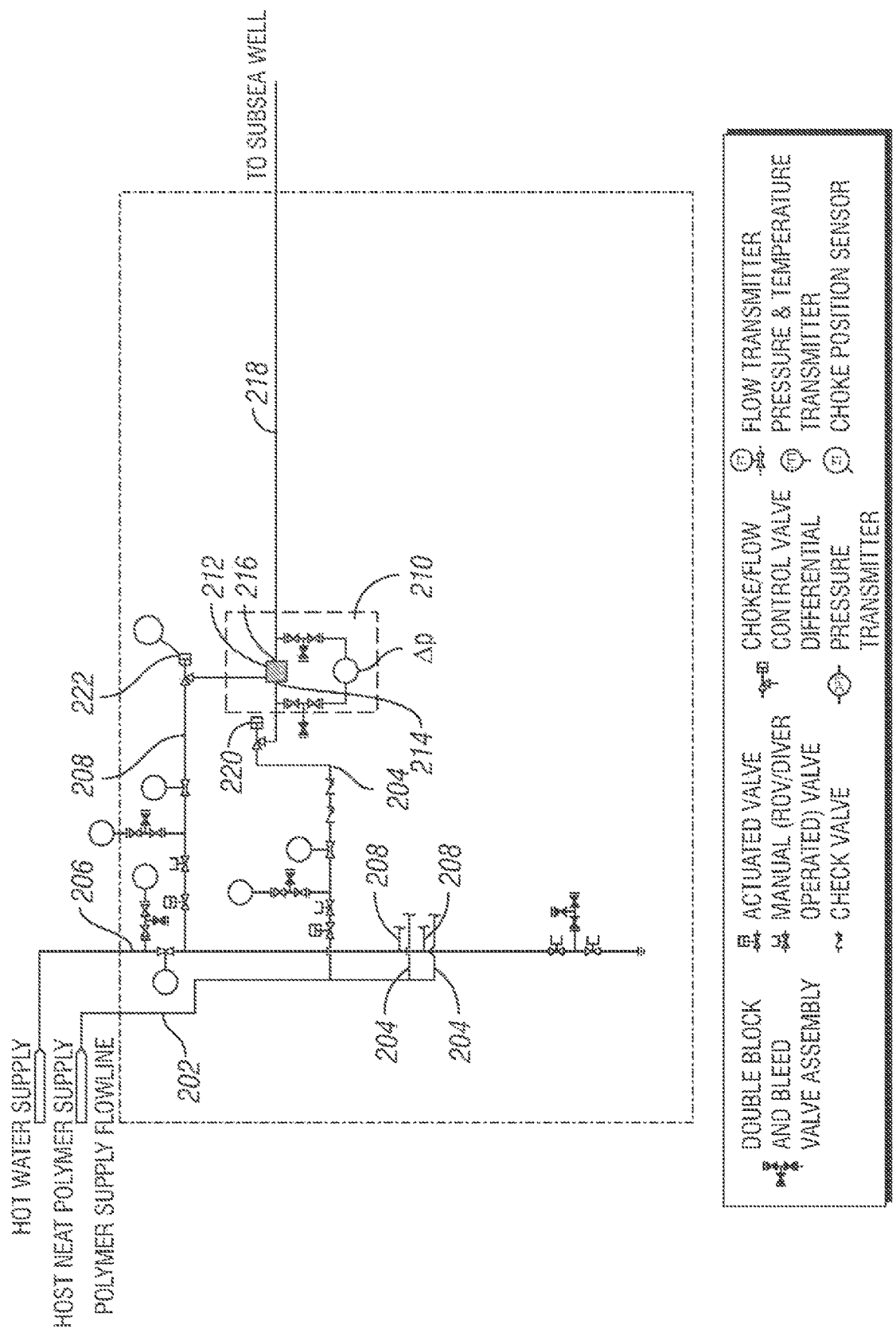
FIGS. 21A and 21B are process flow diagrams schematically illustrating example single stage mixing processes for preparing an aqueous polymer solution that comprise parallel single mixing steps carried out in a polymer mixing system (e.g., a subsea polymer mixing system).
Figure 21B:
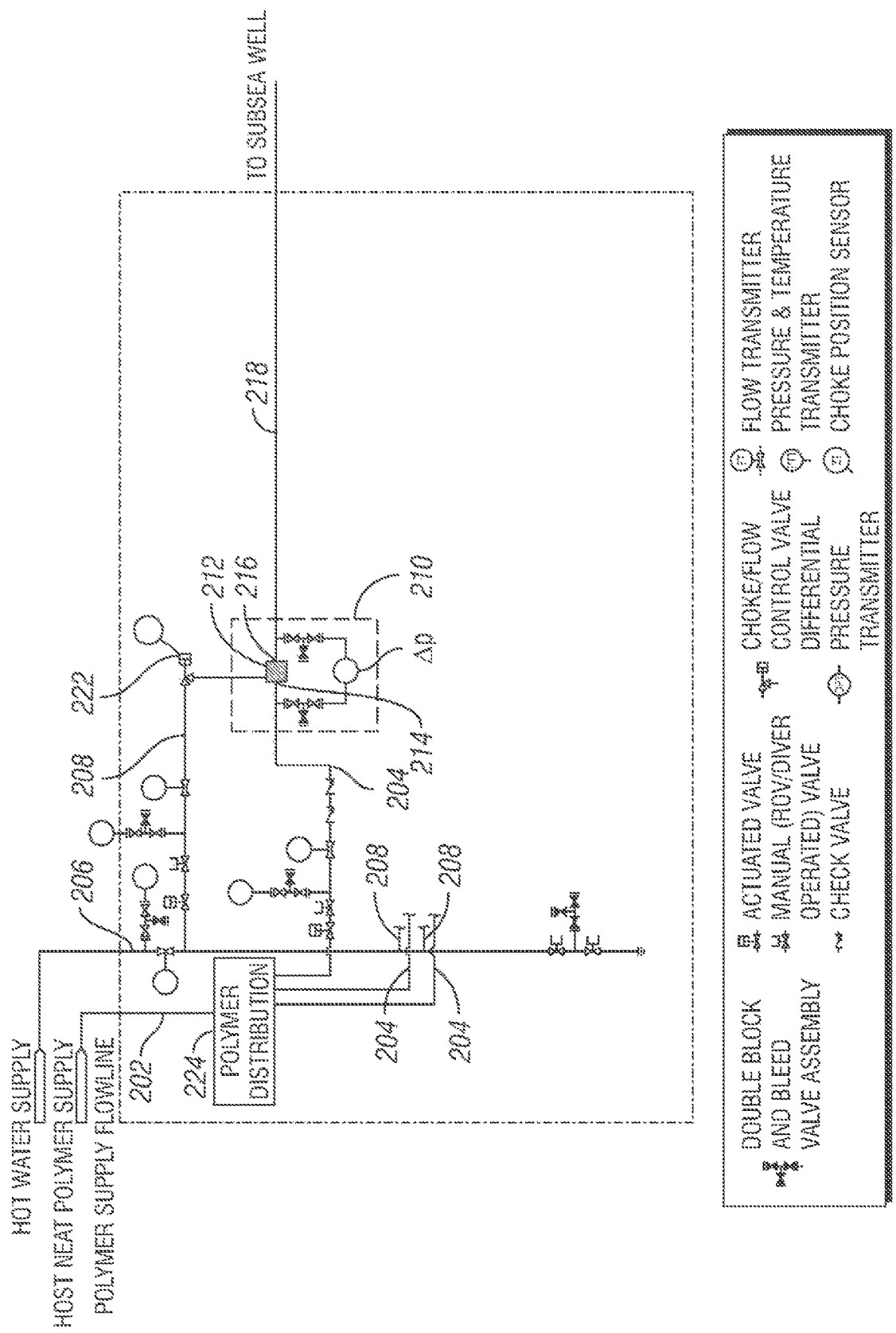

In some embodiments, the single stage mixing process can comprise parallel single mixing steps, parallel multiple mixing steps, or a combination thereof that are carried out in a polymer mixing system. In certain examples, the mixing system can be positioned subsea. Example polymer mixing systems that can be used to conduct a single stage mixing process comprising parallel single mixing steps are schematically illustrated in FIGS. 21A and 21B. As shown in FIG. 21A, the system can include a main polymer feed line 202 diverging to a plurality of polymer supply branches 204, a main aqueous feed line 206 diverging to a plurality of aqueous supply branches 208, and a plurality of mixer arrangements 210 (only one of which is illustrated in FIG. 21A for clarity). In other examples, as shown in FIG. 21B, the main polymer feed line 202 can be fluidly connected to the plurality of polymer supply branches 204 via a polymer distribution manifold 224. The polymer distribution manifold 224 can be configured to independently control the fluid flow rate through each of the plurality of polymer supply branches 204.

Referring again to FIG. 21A, each of the plurality of mixer arrangements 210 is supplied by one of the plurality of polymer supply branches 204 and one of the plurality of aqueous supply branches 208. Each of the plurality of mixer arrangements 210 can comprise an in-line mixer 212 having a mixer inlet 214 and a mixer outlet 216.

Optionally, the mixing system can further comprise a flow control valve 220 operably coupled to each the plurality of polymer supply branches 204 to control fluid flow rate through each of the plurality of polymer supply branches. Optionally, the mixing system can further comprise a flow control valve 222 operably coupled to each the plurality of aqueous supply branches 208 to control fluid flow rate through each of the plurality of aqueous supply branches. In certain embodiments, the mixing system can further comprise a flow control valve 220 operably coupled to each the plurality of polymer supply branches 204 to control fluid flow rate through each of the plurality of polymer supply branches, and a flow control valve 222 operably coupled to each the plurality of aqueous supply branches 208 to control fluid flow rate through each of the plurality of aqueous supply branches. Examples of suitable flow control valves include, for example, choke valves, chemical injection metering valves (CIMVs), and control valves.

Referring still to FIG. 21A, the surfactant composition and the aqueous fluid can be combined in the polymer mixing system by passing the surfactant polymer composition through the main polymer feed line 202 and the plurality of polymer supply branches 204 to reach each of the plurality of mixer arrangements 210. The surfactant composition and the aqueous fluid can then flow through the in-line mixer 212 of each of the plurality of mixer arrangements 210 to provide a stream of the aqueous surfactant-polymer solution 218. The pressure drop through the in-line mixer 212 (Sp) can be from 15 psi to 400 psi (e.g., from 15 psi to 150 psi, from 15 psi to 100 psi, or from 15 psi to 75 psi). In some embodiments, the surfactant composition and the aqueous fluid can flow through the in-line mixer 212 of each of the plurality of mixer arrangements 210 at a velocity of from 1 m/s to 4 m/s.

Figure 2A:
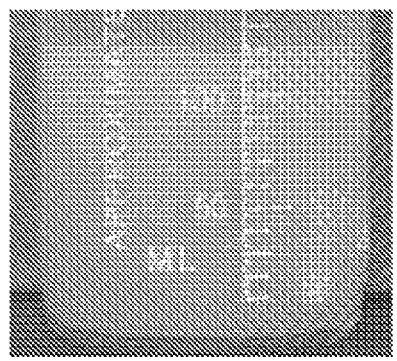
FIG. 2A is a photograph illustrating the appearance of concentrated surfactant composition 2 prior to dilution.
Figure 2B:
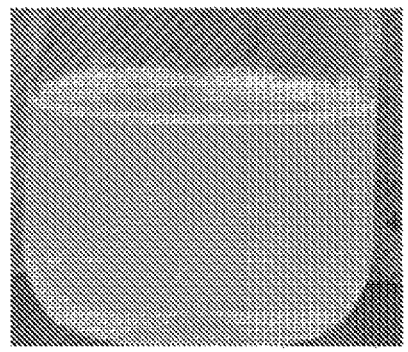
FIG. 2B is a photograph illustrating the appearance of an aqueous surfactant-polymer solution (3000 ppm polymer) at room temperature prepared by dilution of concentrated surfactant composition 2 with brine in a single stage mixing process.
Figure 22A:
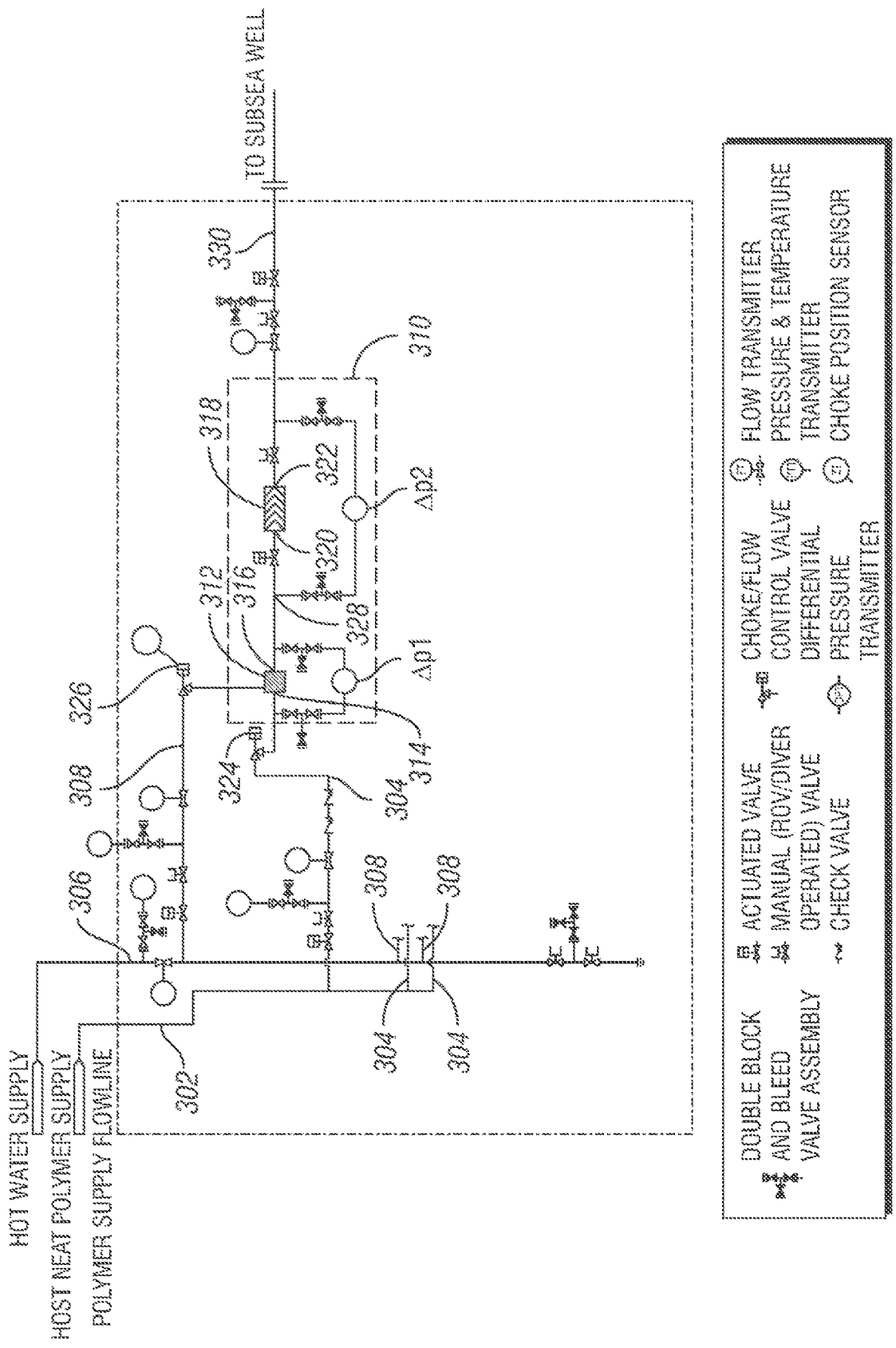
FIGS. 22A and 22B are process flow diagrams schematically illustrating example single stage mixing processes for preparing an aqueous polymer solution that comprise parallel multiple mixing steps carried out in a polymer mixing system (e.g., a subsea polymer mixing system).
Figure 22B:
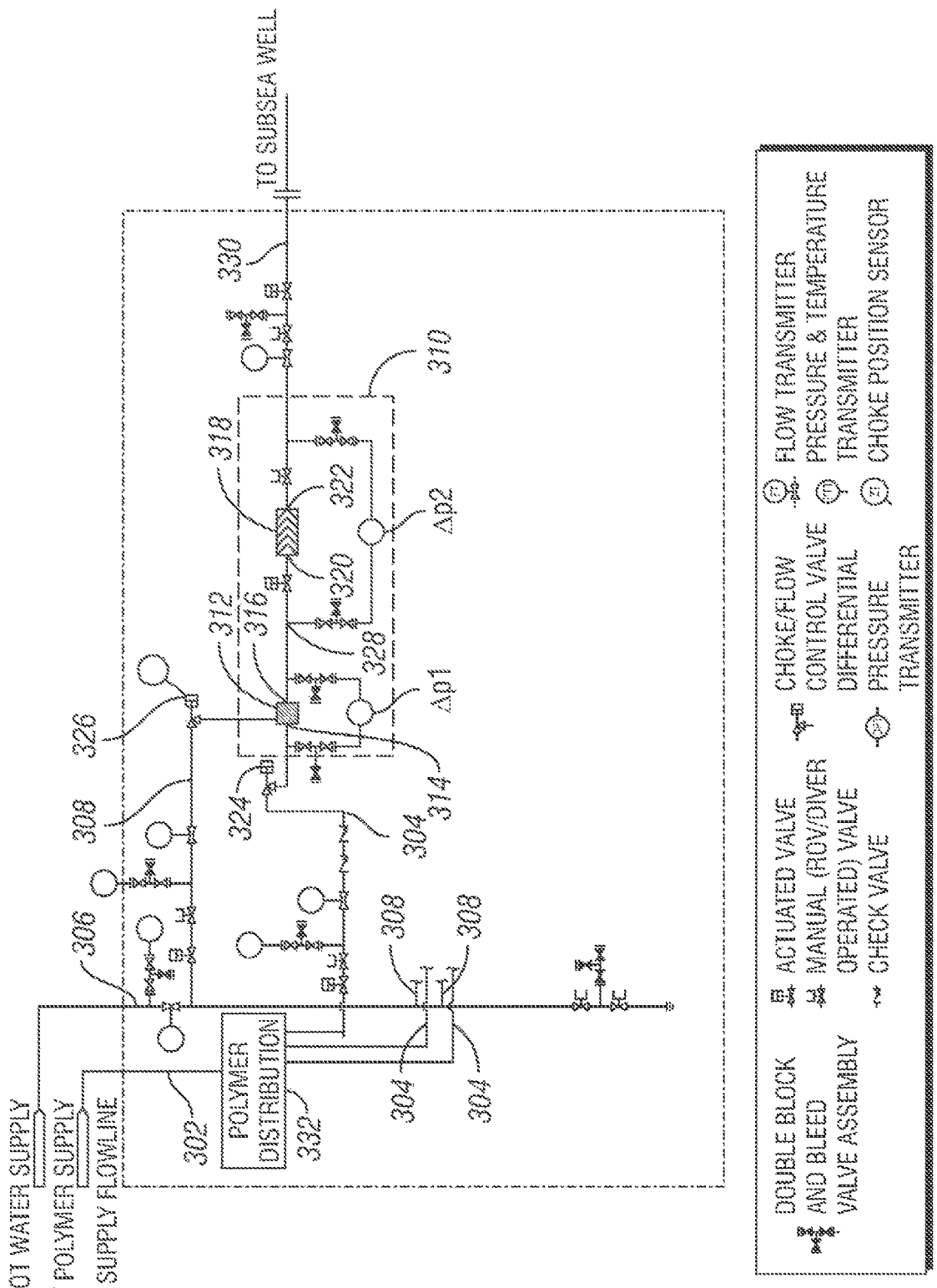

Example mixing systems that can be used to conduct a single stage mixing process comprising parallel multiple mixing steps are schematically illustrated in FIGS. 22A and 2B. As shown in FIG. 22A, the system can include a main polymer feed line 302 diverging to a plurality of polymer supply branches 304, a main aqueous feed line 306 diverging to a plurality of aqueous supply branches 308, and a plurality of mixer arrangements 310 (only one of which is illustrated in FIG. 2A for clarity). In other examples, as shown in FIG. 2B, the main polymer feed line 302 can be fluidly connected to the plurality of polymer supply branches 304 via a polymer distribution manifold 332. The polymer distribution manifold 332 can be configured to independently control the fluid flow rate through each of the plurality of polymer supply branches 304.

Referring again to FIG. 2A, each of the plurality of mixer arrangements 310 is supplied by one of the plurality of polymer supply branches 304 and one of the plurality of aqueous supply branches 308. Each of the plurality of mixer arrangements 310 can comprise a first in-line mixer 312 having a first mixer inlet 314 and a first mixer outlet 316 in series with a second in-line mixer 318 having a second mixer inlet 320 and a second mixer outlet 322.

Optionally, the mixing system can further comprise a flow control valve 324 operably coupled to each the plurality of polymer supply branches 304 to control fluid flow rate through each of the plurality of polymer supply branches. Optionally, the mixing system can further comprise a flow control valve 326 operably coupled to each the plurality of aqueous supply branches 308 to control fluid flow rate through each of the plurality of aqueous supply branches. In certain embodiments, the mixing system can further comprise a flow control valve 324 operably coupled to each the plurality of polymer supply branches 304 to control fluid flow rate through each of the plurality of polymer supply branches, and a flow control valve 326 operably coupled to each the plurality of aqueous supply branches 308 to control fluid flow rate through each of the plurality of aqueous supply branches. Examples of suitable flow control valves include, for example, choke valves, chemical injection metering valves (CIMVs), and control valves.

Referring still to FIG. 22A, the surfactant composition and the aqueous fluid can be combined in the mixing system by passing the surfactant composition through the main polymer feed line 302 and the plurality of polymer supply branches 304 to reach each of the plurality of mixer arrangements 310. The surfactant composition and the aqueous fluid can then flow through the through a first in-line mixer 312 having a first mixer inlet 314 and a first mixer outlet 316, emerging as a stream of partially mixed aqueous surfactant-polymer solution 328. The partially mixed aqueous surfactant-polymer solution can comprise a concentration of synthetic (co)copolymer of from 50 to 15,000 ppm (e.g., from 500 to 5000 ppm, or from 500 to 3000 ppm). The pressure drop through the first in-line mixer 312 ($\Delta p1$) can be from 15 psi to 400 psi (e.g., from 1:5 psi to 150 psi, from 15 psi to 100 psi, or from 15 psi to 75 psi), In some embodiments, the surfactant composition and the aqueous fluid can flow through the first in-line mixer 312 of each of the plurality of mixer arrangements 310 at a velocity of from 1 m/s to 4 m/s. The stream of partially mixed aqueous surfactant-polymer solution 328 can then pass through a second in-line mixer 318 having a second mixer inlet 320 and a second mixer outlet 322, emerging as a stream of aqueous polymer solution 330. The pressure drop through the second in-line mixer 318 ($\Delta p2$) can be from 15 psi to 400 psi (e.g., from 15 psi to 150 psi, from 15 psi to 100 psi, or from 15 psi to 75 psi). In some embodiments, the partially mixed aqueous surfactant-polymer solution 328 can flow through the second in-line mixer 318 of each of the plurality of mixer arrangements 310 at a velocity of from 1 m/s to 4 m/s. In some embodiments, the first in-line mixer can comprise a static mixer and the second in-line mixer can comprise a static mixer. In other examples, the first in-line mixer can comprise a static mixer and the second in-line mixer can comprise a dynamic mixer.

Any suitable in-line mixer(s) can be used in conjunction with the methods and systems described above. Each in-line mixer can be a dynamic mixer or a static mixer. Suitable dynamic mixers, which involve mechanical agitation of one type or another, are known in the art, and include impeller mixers, turbine mixers, rotor-stator mixers, colloid mills, pumps, and pressure homogenizers. In certain embodiment, the in-line mixer(s) can comprise a dynamic mixer such as an electrical submersible pump, hydraulic submersible pump, or a progressive cavity pump. In certain embodiments, the in-line mixer(s) can comprise static mixers. Static mixers are mixers that mix fluids in flow without the use of moving parts. Static mixers are generally constructed from a series of stationary, rigid elements that form intersecting channels to split, rearrange and combine component streams resulting in one homogeneous fluid stream. Static mixers provide simple and efficient solutions to mixing and contacting problems. More affordable than dynamic agitator systems, static mixing units have a long life with minimal maintenance and low pressure drop. Static mixers can be fabricated from metals and/or plastics to fit pipes and vessels of virtually any size and shape. In some cases, the static mixer can comprise a region of pipe, for example a serpentine region of pipe that facilitates mixing.

The aqueous fluid combined with the surfactant composition can comprise from 0 to 250,000 ppm; 15,000 to 160,000 ppm; from 15,000 to 100,000 ppm; from 10,000 to 50,000 ppm; from 15,000 to 50,000 ppm; from 30,000 to 40,000 ppm; from 10,000 to 25,000 ppm; from 10,000 to 20,000 ppm; or from 15,000 to 16,000 ppm total dissolved solids (tds). In an example embodiment, the aqueous fluid can comprise a brine having about 15.000 ppm tds. In one embodiment, the brine may be a synthetic seawater brine as illustrated in the table below.

| Composition of an Example Synthetic Seawater Brine | |
|---|---|
| Ions (ppm) | Synthetic Seawater Brine |
| Na+ | 10800 |
| K+ | 400 |
| Ca++ | 410 |
| Mg++ | 1280 |
| Cl- | 19400 |
| TDS | 32290 |

The aqueous fluid combined with the surfactant compositions can comprise produced reservoir brine, reservoir brine, sea water, fresh water, produced water, water, saltwater (e.g. water containing one or more salts dissolved therein), brine, synthetic brine, synthetic seawater brine, or any combination thereof. Generally, the aqueous fluid can comprise water from any, readily available source, provided that it does not contain an excess of compounds that may adversely affect other components in the aqueous surfactant-polymer solution or render the aqueous surfactant-polymer solution unsuitable for its intended use (e.g., unsuitable for use in an oil and gas operation such as an EOR operation). If desired, aqueous fluids obtained from naturally occurring sources can be treated prior to use. For example, aqueous fluids can be softened (e.g., to reduce the concentration of divalent and trivalent ions in the aqueous fluid) or otherwise treated to adjust their salinity. In certain embodiments, the aqueous fluid can comprise soft brine or hard brine. In certain embodiments, the aqueous fluid can comprise produced reservoir brine, reservoir brine, sea water, or a combination thereof.

In one embodiment, seawater is used as the aqueous fluid, since off-shore production facilities tend to have an abundance of seawater available, limited storage space, and transportation costs to and from an off-shore site are typically high. If seawater is used as the aqueous fluid, it can be softened prior to the addition of the suspended polymer, thereby removing multivalent ions in the water (e.g., specifically $Mg^{2+}$ and $Ca^{2+}$).

In some embodiments, the aqueous fluid can have a temperature of from 1° C. to 1.20° C. In other embodiments, the aqueous fluid can have a temperature of from 45° C. to 95° C.

The methods described herein can be specifically adapted for use in a particular oil and gas operation. For example, in some embodiments, the processes for preparing aqueous polymer solutions described herein can be performed as a continuous process to produce a fluid stream for injection into a hydrocarbon-bearing formation.

In some cases, the in-line mixer (or one or more in-line mixers in the case of methods that include multiple mixing steps, parallel single mixing steps, or parallel multiple mixing steps) can be arranged downstream from pumping equipment at the surface (e.g., on land, on a vessel, or on an offshore platform) that pumps the surfactant composition and the aqueous fluid. In certain embodiments, the in-line mixer (or one or more in-line mixers in the case of methods that include multiple mixing steps, parallel single mixing steps, or parallel multiple mixing steps) can be positioned at or near the wellhead of a well. In certain embodiments, the in-line mixer can be arranged downhole. In certain embodiments, the in-line mixer (or one or more in-line mixers in the case of methods that include multiple mixing steps, parallel single mixing steps, or parallel multiple mixing steps) can be positioned subsurface, subsea, or downhole.

In certain embodiments, the hydrocarbon-bearing formation can be a subsea reservoir. In these embodiments, the in-line mixer (or one or more in-line mixers in the case of methods that include multiple mixing steps, parallel single mixing steps, or parallel multiple mixing steps) can be arranged downstream from pumping equipment at the surface (e.g., on shore, on a vessel, or on an offshore platform) that pumps the surfactant composition and/or the aqueous fluid. In certain embodiments, the in-line mixer (or one or more in-line mixers in the case of methods that include multiple mixing steps, parallel single mixing steps, or parallel multiple mixing steps) can be positioned subsea. Thus, depending on the oil and gas operation, for example, an in-line mixer can be positioned on the surface, subsurface, subsea, or downhole.

As discussed above, the aqueous polymer solutions described herein can be used oil and gas operations, such as EOR operations. For example, the aqueous surfactant-polymer solutions described above can be used in flooding operations. In some cases, the aqueous polymer solution further includes one or more additional agents to facilitate hydrocarbon recovery. For example, the aqueous polymer solution can further include an alkalinity agent, a chelating agent, or any combination thereof. As such, the aqueous surfactant-polymer solutions can be used in polymer (P), alkaline-polymer (AP), surfactant-polymer (SP), and/or in alkaline-surfactant-polymer (ASP)-type EOR operations. When present, these additional components can be incorporated into the aqueous fluid prior to combination with the surfactant composition, such that the resulting aqueous surfactant-polymer solution formed by combination of the aqueous fluid and the surfactant composition includes one or more of these additional components. Likewise, these additional components can also be incorporated to the surfactant composition prior to combination with the aqueous fluid, such that the resulting aqueous surfactant-polymer solution formed by combination of the aqueous fluid and the surfactant composition includes one or more of these additional components. Alternatively, these additional components can be incorporated to the aqueous surfactant-polymer solutions following combination with the surfactant composition.

For chemical enhanced oil recovery (CEOR) operations, the surfactant composition can be combined with an effective amount of aqueous fluid to provide an aqueous surfactant-polymer solution (e.g., which can serve as an injection stream) with a target hydrated polymer concentration and particle size. The target concentration varies according to the type of polymer employed, as well as the characteristics of the reservoir, e.g., petrophysical rock properties, reservoir fluid properties, reservoir conditions such as temperature, permeability, water compositions, mineralogy and/or reservoir location, etc. In some cases, the aqueous surfactant-polymer solutions described herein are suitable for use in reservoirs with a permeability of from 10 millidarcy to 40,000 millidarcy.

The hydrated polymer molecules in the aqueous surfactant-polymer solution can have a particle size (radius of gyration) ranging from 0.01 to 10 μm in one embodiment. One reservoir characteristic is the median pore throats, which correspond to the permeability of the reservoirs. Depending on the reservoir, the median pore throats in reservoirs may range from 0.01 μm to several hundred micrometers. Since the size of hydrated polymers in water range from 0.01 micrometer to several micrometers depending on the species, molecules, and reservoir conditions, in one embodiment, appropriate polymers are selected for surfactant composition to afford an aqueous surfactant-polymer solution where the particle size of the hydrated polymer is <10% of the median pore throat parameters. This can allow the hydrated polymer particles to flow through the porous medium in an uninhibited manner. In another embodiment, the hydrated polymer particles have an average particle size ranging from 2 to 8% of the median pore throat size. Surfactants can be included to lower the interfacial tension between the oil and water phase to less than about 10-2 dyne/cm (for example) and thereby recover additional oil by mobilizing and solubilizing oil trapped by capillary forces.

Suitable alkalinity agents include basic, ionic salts of alkali metals or alkaline earth metals. Alkalinity agents can be capable of reacting with an unrefined petroleum acid (e.g. the acid or its precursor in crude oil (reactive oil)) to form soap (a surfactant which is a salt of a fatty acid) in situ. These in situ generated soaps can serve as a source of surfactants causing a reduction of the interfacial tension of the oil in water emulsion, thereby reducing the viscosity of the emulsion. Examples of alkali agents include alkali metal hydroxides, carbonates, or bicarbonates, including; but not limited to, sodium carbonate, sodium bicarbonate, sodium hydroxide, potassium hydroxide, sodium silicate, tetrasodium EDTA, sodium metaborate, sodium citrate, and sodium tetraborate. In some cases, the alkalinity agent can be present in the inverted polymer solution in an amount of from 0.3 to 5.0 weight percent of the solution, such as 0.5 to 3 weight percent.

The aqueous surfactant-polymer solution can optionally include a chelant or chelating agent. Chelants may be used to complex with the alkali metal and soften brines. If desired, the salinity of the aqueous polymer solution may be optimized for a particular subterranean reservoir by adjusting a number of chelating ligands in the chelating agent, such as alkoxylate groups if the chelant is EDTA ("ethylenediaminetetraacetic acid"). EDTA is just one example of a suitable chelant, another example of a chelant is MGDA ("methylglycinediacetic acid").

If desired, other additives can also be included in aqueous surfactant-polymer solutions described herein, such as biocides, oxygen scavengers, and corrosion inhibitors.

Variants of the methods described above can also be used to prepare aqueous p surfactant-polymer solutions that include biopolymers, such as polysaccharides (e.g., xanthan gum, scleroglucan, guar gum, derivatives thereof including one or more chemical modifications to the backbone of these polymers, and blends thereof). These methods can comprise providing a surfactant composition that comprises an LP composition comprising one or more biopolymers; and combining the surfactant composition with an aqueous fluid in a single stage mixing process described above to provide the aqueous surfactant-polymer solution, wherein the aqueous surfactant-polymer solution comprises a concentration of biopolymer of from 50 to 15,000 ppm; and wherein the aqueous surfactant-polymer solution has a filter ratio of 1.5 or less at 15 psi using a 1.2 µm filter.

In methods used to prepare aqueous surfactant-polymer solutions that include biopolymers, the single stage mixing process can comprise applying a specific mixing energy of at least 0.10 kJ/kg to the surfactant composition and the aqueous fluid.

In some of these embodiments, the single stage mixing process can comprise applying a specific mixing energy of at least 0.10 kJ/kg (e.g., at least 0.25 kJ/kg, at least 0.50 kJ/kg, at least 0.75 kJ/kg, at least 1.0 kJ/kg, at least 1.5 kJ/kg, at least 2.0 kJ/kg, at least 2.5 kJ/kg, at least 3.0 kJ/kg, at least 3.5 kJ/kg, at least 4.0 kJ/kg, at least 4.5 kJ/kg, at least 5.0 kJ/kg, at least 6.0 kJ/kg, at least 7.0 kJ/kg, at least 8.0 kJ/kg, at least 9.0 kJ/kg, at least 10 kJ/kg, at least 11 kJ/kg, at least 12 kJ/kg, at least 13 kJ/kg, at least 14 kJ/kg, at least 15 kJ/kg, at least 16 kJ/kg, at least 17 kJ/kg, at least 18 kJ/kg, or at least 19 kJ/kg) to the surfactant composition and the aqueous fluid. In some of these embodiments, the single stage mixing process can comprise applying a specific mixing energy of 20 kJ/kg or less (e.g., 19 kJ/kg or less, 18 kJ/kg or less, 17 kJ/kg or less, 16 kJ/kg or less, 15 kJ/kg or less, 14 kJ/kg or less, 13 kJ/kg or less, 12 kJ/kg or less, 11 kJ/kg or less, 10 kJ/kg or less, 9.0 kJ/kg or less, 8.0 kJ/kg or less, 7.0 kJ/kg or less, 6.0 kJ/kg or less, 5.0 kJ/kg or less, 4.5 kJ/kg, or less, 4.0 kJ/kg or less, 3.5 kJ/kg or less, 3.0 kJ/kg or less, 2.5 kJ/kg or less, 2.0 kJ/kg or less, 1.5 kJ/kg or less, 1.0 kJ/kg or less, 0.75 kJ/kg or less, 0.50 kJ/kg or less, or 0.25 kJ/kg or less) to the surfactant composition and the aqueous fluid.

In some of these embodiments, the single stage mixing process can comprise applying a specific mixing energy to the surfactant composition and the aqueous fluid ranging from any of the minimum values described above to any of the maximum values described above. For example, in some of these embodiments, the single stage mixing process can comprise applying a specific mixing energy of from 0.10 kJ/kg to 20 kJ/kg. (e.g., from 0.10 kJ/kg to 10 kJ/kg, from 1.0 kJ/kg to 20 kJ/kg, from 1.0 kJ/kg to 15 kJ/kg, from 1.0 kJ/kg to 10 kJ/kg, or from 5.0 kJ/kg to 15 kJ/kg) to the surfactant composition and the aqueous fluid.

Methods of Use

The aqueous surfactant-polymer solutions described herein can be used in a variety of oil and gas operations, including an EOR operation (e.g., an improved oil recovery (IOR) operation, a polymer flooding operation, an AP flooding operation, a SP flooding operation, an ASP flooding operation, a conformance control operation, or any combination thereof). Moreover, the aqueous surfactant polymer solutions described herein can be used in a variety of oil and gas operations, including a hydraulic fracturing operation, as a drag reducer that reduces friction during transportation of a fluid in a pipeline, or any combination thereof. Transportation of a fluid in a pipeline can refer to any movement of a fluid through a conduit or pipe. As such, transportation of a fluid in a pipeline includes, for example, the pipeline transport of fluids as well as passage of fluids through pipes such as wellbores during the course of an oil recovery operation. The aqueous surfactant polymer solutions can even be used in water treatment operations associated with oil and gas operations.

In one embodiment, the aqueous surfactant-polymer solution can be used as an injection fluid. In another embodiment, the aqueous surfactant-polymer solution can be included in an injection fluid. In another embodiment, aqueous surfactant-polymer solution can be used as a hydraulic fracturing fluid. In another embodiment, the aqueous surfactant-polymer solution can be included in a hydraulic fracturing fluid. In another embodiment, the aqueous surfactant-polymer solution can be used as a drag reducer that reduces friction during transportation of a fluid in a pipeline. In another embodiment, the aqueous surfactant-polymer solution can be included in a drag reducer that reduces friction during transportation of a fluid in a pipeline. In short, in certain embodiments, the aqueous surfactant-polymer solutions described herein can be used in hydrocarbon recovery.

Methods of hydrocarbon recovery can comprise providing a subsurface reservoir containing hydrocarbons therewithin; providing a wellbore in fluid communication with the subsurface reservoir; preparing an aqueous surfactant-polymer solution using the methods described above; and injecting the aqueous surfactant-polymer solution through the wellbore into the subsurface reservoir. For example, the subsurface reservoir can be a subsea reservoir and/or the subsurface reservoir can have a permeability of from 10 millidarcy to 40,000 millidarcy.

The wellbore in the second step can be an injection wellbore associated with an injection well, and the method can further comprise providing a production well spaced-apart from the injection well a predetermined distance and having a production wellbore in fluid communication with the subsurface reservoir. In these embodiments, injection of the aqueous surfactant-polymer solution can increase the flow of hydrocarbons to the production wellbore.

In some embodiments, methods of hydrocarbon recovery can further include a recycling step. For example, in some embodiments, methods of hydrocarbon recovery can further comprise producing production fluid from the production well, the production fluid including at least a portion of the injected aqueous surfactant-polymer solution; and combining the production fluid to with additional surfactant composition, for example, to form a second aqueous surfactant-poly trier solution. The second aqueous surfactant-polymer solution can then be injected into at least one wellbore (e.g., an injection well, the same wellbore discussed in the second step or a different wellbore, etc.). Thus, in some embodiments, the aqueous surfactant-polymer solution is included in an injection fluid.

The wellbore in the second step can be a wellbore for hydraulic fracturing that is in fluid communication with the subsurface reservoir. Thus, in one embodiment, the aqueous surfactant-polymer solution injected in the fourth step functions as a drag reducer that reduces friction during injection in the fourth step. By doing so, the aqueous surfactant-polymer solution is used as a drag reducer that reduces friction during transportation of a fluid (e.g., the hydraulic fracturing fluid) in a pipeline (e.g., the wellbore or components thereof). In another embodiment, the aqueous surfactant-polymer solution is included in a hydraulic fracturing fluid.

In other embodiments, the aqueous surfactant-polymer solution can be used in methods for wellbore remediation, such as those described in U.S. Pat. No. 9,752,071 to Dwarakanath et al., which is incorporated herein by reference in its entirety. Accordingly, also provided are methods for the remediation of existing damage in a region near an injection wellbore in communication with a subterranean reservoir wherein the injection wellbore is not intended for receiving hydrocarbons and wherein the existing damage is caused by previous injection of a composition containing a polymer emulsion into the injection wellbore, which comprise preparing an aqueous surfactant-polymer solution according to the methods described herein, and injecting the aqueous surfactant-polymer solution through the injection wellbore into the subsurface reservoir, thereby dissolving, cleaning and/or flushing the polymer emulsion away from the injection wellbore. The injection of the composition can stimulate the region near the injection wellbore in communication with the subterranean reservoir. The injection can improve the relative permeability of the region near the injection wellbore in communication with the subterranean reservoir. For example, the relative permeability of the region near the injection wellbore in communication with the subterranean reservoir can be increased by at least 250 percent.

Also provided are methods for increasing the relative permeability of a region near an injection wellbore in communication with a subterranean reservoir, wherein the injection wellbore is not intended for receiving hydrocarbons, which comprise preparing an aqueous surfactant-polymer solution according to the methods described herein, and injecting the aqueous surfactant-poly trier solution through the injection wellbore into the subsurface reservoir. The region near the injection wellbore can comprise a substance chosen from a heavy oil, a polymer, a drilling fluid, a drilling mud, or any combination thereof, and wherein injecting the aqueous surfactant-polymer solution through the injection wellbore into the subsurface reservoir can comprise dissolving, cleaning and/or flushing the substance away from the injection wellbore. The injection can improve the relative permeability of the region near the injection wellbore in communication with the subterranean reservoir. For example, the relative permeability of the region near the injection wellbore in communication with the subterranean reservoir can be increased by at least 250 percent.

In some embodiments, the aqueous surfactant-polymer solution can be used as part of a completion and/or fracturing operation. For example, the aqueous surfactant-polymer solution can be injected into an unconventional subterranean formation to form and/or extend fractures within the formation. In certain embodiments, the fracturing operation can comprise injecting the aqueous surfactant-polymer solution through a wellbore and into the unconventional subterranean formation at a sufficient pressure and at a sufficient rate to fracture the unconventional subterranean formation. In some embodiments, the wellbore is a hydraulic fracturing wellbore associated with a hydraulic fracturing well, for example, that may have a substantially vertical portion only, or a substantially vertical portion and a substantially horizontal portion below the substantially vertical portion. In some embodiments, the fracturing operation can be performed in a new well (e.g., a well that has not been previously fractured). In other embodiments, the aqueous surfactant-polymer solution can be used in a fracturing operation in an existing well (e.g., in a refracturing operation).

In some embodiments, the method can comprise performing a fracturing operation on a region of the unconventional subterranean formation proximate to a new wellbore. In some embodiments, the method can comprise performing a fracturing operation on a region of the unconventional subterranean formation proximate to an existing wellbore. In some embodiments, the method can comprise performing a refracturing operation on a previously, fractured region of the unconventional subterranean formation proximate to a new wellbore. In some embodiments, the method can comprise performing a refracturing operation on a previously fractured region of the unconventional subterranean formation proximate to an existing wellbore. In some embodiments, the method can comprise performing a fracturing operation on a naturally fractured region of the unconventional subterranean formation proximate to a new wellbore (e.g., an infill well). In some embodiments, the method can comprise performing a fracturing operation on a naturally fractured region of the unconventional subterranean formation proximate to an existing wellbore.

In cases where the fracturing method comprises a refracturing methods, the previously fractured region of the unconventional reservoir can have been fractured by any suitable type of fracturing operation. For example, the fracturing operation may include hydraulic fracturing, fracturing using electrodes such as described in U.S. Pat. Nos. 9,890,627, 9,840,898, U.S. Patent Publication No. 2018/0202273, or fracturing with any other available equipment or methodology. In some embodiments, the fracturing operation can further comprise adding a tracer to the aqueous surfactant-polymer solution prior to introducing the aqueous surfactant-polymer solution through the wellbore into the unconventional subterranean formation; recovering the tracer from the fluids produced from the unconventional subterranean formation through the wellbore, fluids recovered from a different wellbore in fluid communication with the unconventional subterranean formation, or any combination thereof; and comparing the quantity of tracer recovered from the fluids produced to the quantity of tracer introduced to the aqueous surfactant-polymer solution. The tracer can comprise a proppant tracer, an oil tracer, a water tracer, or any combination thereof. Example tracers are known in the art, and described, for example, in U.S. Pat. No. 9,914,872 and Ashish Kumar et al., Diagnosing Fracture-Wellbore Connectivity Using Chemical Tracer Flowback Data, URTeC 2902023, Jul. 23-25, 2018, page 1-10, Texas, USA.

The aqueous surfactant-polymer solution can be used at varying points throughout a fracturing operation. For example, the aqueous surfactant-polymer solution can be used as an injection fluid during the first, middle or last part of the fracturing process, or throughout the entire fracturing process. In some embodiments, the fracturing process can include a plurality of stages and/or sub-stages. For example, the fracturing process can involve sequential injection of fluids in different stages, with each of the stages employing a different aqueous-based injection fluid system (e.g., with varying properties such as viscosity, chemical composition, etc.). Example fracturing processes of this type are described, for example, in U.S. Patent Application Publication Nos. 2009/0044945 and 2015/0083420, each of which is hereby incorporated herein by reference in its entirely.

In these embodiments, the aqueous surfactant-polymer solution can be used as an injection fluid (optionally with additional components) during any or all of the stages and/or sub-stages. Stages and/or sub-stages can employ a wide variety of aqueous-based injection fluid systems, including linear gels, crosslinked gels, and friction-reduced water. Linear gel fracturing fluids are formulated with a wide array of different polymers in an aqueous base. Polymers that are commonly used to formulate these linear gels include guar, hydroxypropyl guar (HPG), carboxymethyl HPG (CMHPG), and hydroxyethyl cellulose (HEC). Crosslinked gel fracturing fluids utilize, for example, borate ions to crosslink the hydrated polymers and provide increased viscosity. The polymers most often used in these fluids are guar and HPG. The crosslink obtained by using borate is reversible and is triggered by altering the pH of the fluid system. The reversible characteristic of the crosslink in borate fluids helps them clean up more effectively, resulting in good regained permeability and conductivity. The aqueous surfactant-polymer solutions described herein can be added to any of these aqueous-based injection fluid systems.

In some embodiments, the aqueous surfactant-polymer solution can be formed in a continuous process (and then subsequently injected). In other embodiments, the aqueous surfactant-polymer solution can be provided only during desired portions of the treatment operation (e.g., during one or more phases or stages of a fracturing operation). For example, the aqueous surfactant-polymer solution could be added when injecting slickwater, when injecting fracturing fluid with proppant, during an acid wash, or during any combination thereof. In a specific embodiment, the aqueous surfactant-polymer solution is continuously added to an aqueous injection fluid after acid injection until completion of hydraulic fracturing and completion fluid flow-back. When intermittently dosed, the aqueous surfactant-polymer solution can be added to the aqueous-based injection fluid once an hour, once every 2 hours, once every 4 hours, once every 5 hours, once every 6 hours, twice a day, once a day, or once every other day, for example.

In some embodiments, the aqueous surfactant-polymer solution can be used as part of a reservoir stimulation operation. In such operations, the aqueous surfactant-polymer solution can be injected to alter the wettability of existing fractures within the formation (without further fracturing the formation significantly by either forming new fractures within the formation and/or extending the existing fractures within the formation). In such stimulation operations, no proppant is used, and fluid injection generally occurs at a lower pressure.

In some cases, the existing fractures can be naturally occurring fractures present within a formation. For example, in some embodiments, the formation can comprise naturally fractured carbonate or naturally fractured sandstone. The presence or absence of naturally occurring fractures within a subterranean formation can be assessed using standard methods known in the art, including seismic surveys, geology, outcrops, cores, logging, reservoir characterization including preparing grids, etc.

In some embodiments, methods for stimulating an unconventional subterranean formation with a fluid can comprise introducing an aqueous surfactant-polymer solution through a wellbore into the unconventional subterranean formation; allowing the aqueous surfactant-polymer solution to imbibe into a rock matrix of the unconventional subterranean formation for a period of time; and producing fluids from the unconventional subterranean formation through the wellbore. In these methods, the same wellbore can be used for both introducing the aqueous surfactant-polymer solution and producing fluids from the unconventional subterranean formation. In these methods, the same wellbore can be used for both introducing the aqueous surfactant-polymer solution and producing fluids from the unconventional subterranean formation. In some embodiments, introduction of the aqueous surfactant-polymer solution can increase the production of hydrocarbons from the same wellbore, from a different wellbore in fluid communication with the unconventional subterranean formation, or any combination thereof.

By way of non-limiting illustration, examples of certain embodiments of the present disclosure are given below.

EXAMPLES

Trapped oil around the immediate vicinity of a wellbore has been removed by selecting suitable low-tension oil mobilizing surfactants mixed with liquid polymers at the desired dosing levels and subsequently injecting the solution downhole. To accomplish this, one or more concentrated surfactant streams meet the polymer/brine stream to mix and produce a homogeneous injection solution for removal of near wellbore trapped oil for injectivity enhancement or for mobilization of residual oil in the reservoir. Multiple injection streams of different fluids cause the final dosing amounts of polymer and surfactant to vary over a wide range during field deployment, resulting in solutions that can fall outside of the desired operating range in terms of concentration and injection flow rate. Furthermore, these problems are exacerbated when deploying offshore due to the need for separate supply vessels, making the effort cost prohibitive and operationally challenging.

To address meet these needs, concentrated surfactant compositions were developed that could be diluted in a single stage mixing process to form an aqueous surfactant-polymer solution for use as an injection fluid in an oil and gas operation. The surfactant compositions include a surfactant package comprising one or more surfactants, one or more co-solvents, and a liquid polymer (LP) composition. For example, the surfactant compositions can include from 0.5% to 60% by weight of a LP composition, from 0.2% to 98% by weight of a surfactant package, and from greater than 0% to 95% by weight of a co-solvent. In addition, the surfactant composition can also have a water content of from 0.01% to 20% by weight (coming from the LP composition and/or the surfactants that make up the surfactant package).

The concentrated surfactant composition can be directly diluted with an aqueous fluid (e.g., brine) to produce an aqueous surfactant-polymer solution having the desired concentration of components (e.g., the desired polymer concentration, the desired surfactant concentration, the desired co-solvent concentration, or any combination thereof for a particular oil and gas operation) in a single step. This can eliminate the need for multiple streams of individual components, thereby improving process robustness. If desired, the aqueous surfactant-polymer solution can be continuously injected to remove near wellbore trapped oil or injected as a slug to mobilize residual oil in a tertiary recovery process. Such a process allows for rapid deployment of surfactant polymer flooding processes, especially in offshore environments.

As discussed below, the surfactant compositions described herein can be quickly inverted, hydrated, and mixed in water under strong shear stress. Once diluted, the resulting aqueous surfactant-polymer solutions exhibit superior filterability after a short hydration time. The surfactant compositions exhibit a comparable viscosity yield with conventional liquid polymers. The resulting aqueous surfactant-polymer solutions also exhibit excellent performance in oil recovery applications. For example, in coreflood tests, the aqueous surfactant-polymer solutions can reduce oil saturation in the core to less than 2% after 2 pore volumes (PV) of continuous injection during a cleanup recovery coreflood in surrogate rocks and reservoir sand.

The following example surfactant compositions include different surfactant classes and types mixed with a liquid polymer (LP) composition at ratios tailored to perform at a temperature and salinity level dictated by a chosen end application. Four representative compositions are described here which can be used for applications in near wellbore cleanup by continuous surfactant polymer cleanup injection, for enhancing oil recovery by classical surfactant polymer slug injection, and for preparing slickwater used in hydraulic fracturing process.

Table 1 shows the composition of the brine used in these examples when diluting the concentrated surfactant compositions described herein.

TABLE 1

Synthetic formation brine in this study for dilutions based on formulation 1.

| ION | Concentration (ppm) |
| --- | --- |
| $Na^+$ | 5048 |
| $Ca^{2+}$ | 569 |
| $Mg^{2+}$ | 210 |
| $Cl^-$ | 9403 |
| TDS | 15230 |

Surfactant Composition 1

Figure 1B:
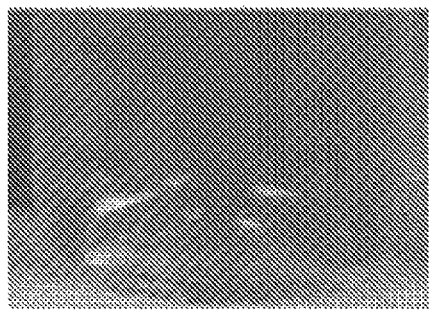
FIG. 1B is a photograph illustrating the appearance of an aqueous surfactant-polymer solution (3000 ppm polymer) prepared by dilution of concentrated surfactant composition 1 with brine in a single stage mixing process.

Surfactant Composition 1 was developed for wellbore cleanup as well as to improve oil recovery. The composition described here in Table 2 has a ratio of polymer to surfactants/cosolvents of 1:4, The approximate water content of the composition is about 6.5%, with the water coming in from the individual components used to prepare the composition. FIG. 1A shows the appearance of the concentrated surfactant composition, and FIG. 1B shows the aqueous stable 3000 ppm polymer solution made by diluting the concentrated surfactant composition in brine in a single stage mixing process.

TABLE 2

Surfactant Composition 1.

| Component | Wt. % in diluted aqueous surfactant-polymer-polymer solution | Wt. % in concentrated surfactant composition |
| --- | --- | --- |
| TDA-8PO-Sulfate | 0.15 | 5.5 |
| C20-28 Isomerized olefin sulfonate | 0.3 | 11 |
| Sodium Dihexyl Sulfosuccinate | 0.5 | 18.35 |
| Ethylene glycol monobutyl ether | 0.75 | 27.5 |
| Polymer | 0.3 | 11 |
| Other (Water or brine, oil from polymer and any other components that come with chemicals) | 98 | 26.65 |

Surfactant Composition 2

Figure 2C:
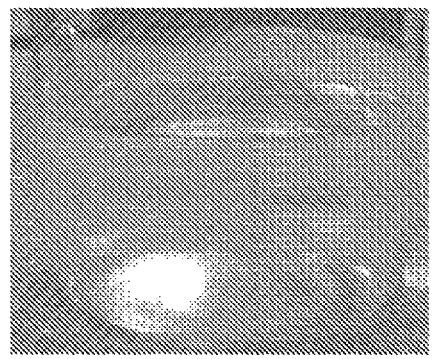
FIG. 2C is a photograph illustrating the appearance of an aqueous surfactant-polymer solution (3000 ppm polymer) at reservoir temperature prepared by dilution of concentrated surfactant composition 2 with brine in a single stage mixing process.

This composition (Table 3) was also developed for wellbore cleanup; however, it can also be used to improve oil recovery. The approximate water content is about 20% in the surfactant composition coming in from the individual components. FIG. 2A shows the surfactant composition with 20% water, and FIG. 2B shows the homogenous 3000 ppm polymer solution with surfactant in the brine after 3 minutes mixing at room temperature. This solution is clear at reservoir temperature (FIG. 2C).

TABLE 3

Surfactant Composition 2.

| Component | Wt % in diluted aqueous surfactant-polymer-polymer solution | Wt % in concentrated surfactant composition |
| --- | --- | --- |
| TDA-8PO-Sulfate | 0.15 | 4.8 |
| C20-28 Isomerized olefin sulfonate | 0.3 | 9.6 |
| C16-18 Isomerized olefin sulfonate | 0.15 | 4.8 |
| Sodium Dihexyl Sulfosuccinate | 0.5 | 16 |
| Ethylene glycol monobutyl ether | 0.75 | 24 |
| Polymer | 0.3 | 8 |
| Other (Water or brine, oil from polymer and any other components that conic with chemicals) | 97.85 | 32.8 |

Surfactant Composition 3

Figure 3A:
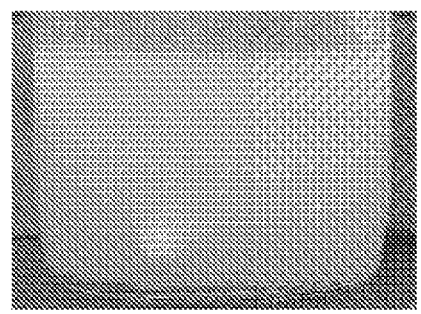
FIG. 3A is a photograph illustrating the appearance of concentrated surfactant composition 3 prior to dilution.
Figure 3B:
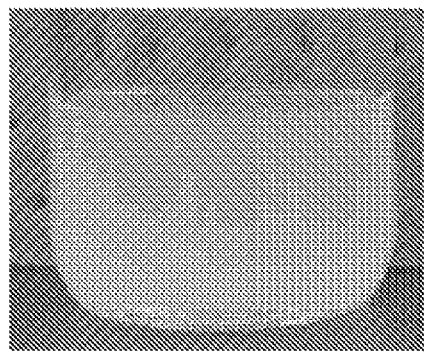
FIG. 3B is a photograph illustrating the appearance of an aqueous surfactant-polymer solution (2500 ppm polymer) at room temperature prepared by dilution of concentrated surfactant composition 3 with brine in a single stage mixing process (3 minutes of mixing).
Figure 3C:
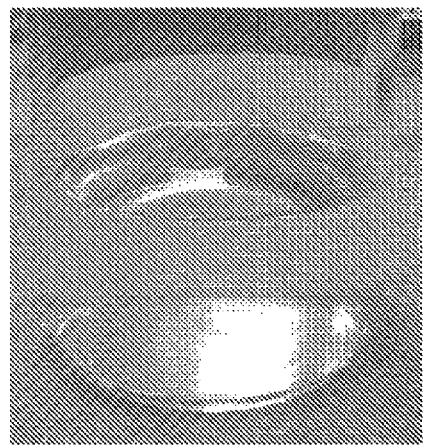
FIG. 3C is a photograph illustrating the appearance of an aqueous surfactant-polymer solution (2500 ppm polymer) at reservoir temperature prepared by dilution of concentrated surfactant composition 3 with brine in a single stage mixing process.

This formulation (Table 4) was mainly developed to improve oil recovery. The approximate water content is about 8% in the surfactant composition (shown in FIG. 3A) coming in from the individual components. A large hydrophobe surfactant is used in this formulation to increase the solubility. FIG. 3B shows that a homogenous 2500 ppm aqueous surfactant-polymer solution can be obtained after mixing with brine for 3 minutes at room temperature. This solution is clear at reservoir temperature FIG. 3C.

TABLE 4

Surfactant Composition 3.

| Component | Wt % in diluted aqueous surfactant-polymer-polymer solution | Wt % in concentrated surfactant composition |
| --- | --- | --- |
| C28-35PO-10EO-Carboxylate | 0.15 | 4 |
| C20-28 Isomerized olefin sulfonate | 0.05 | 1.35 |
| C20-24 Isomerized olefin sulfonate | 0.45 | 12.2 |
| Sodium Dihexyl Sulfosuccinate | 0.5 | 13.57 |
| Tri-ethylene glycol monobutyl ether | 0.75 | 20.36 |
| Polymer | 0.25 | 6.79 |
| Other (Water or brine, oil from polymer and any other components that comes with chemicals) | 97.85 | 41.73 |

Surfactant Composition 4

Figure 4A:
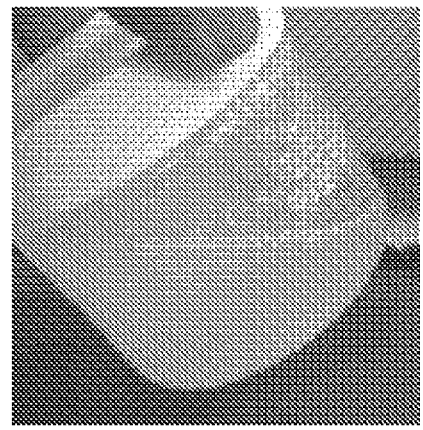
FIG. 4A is a photograph illustrating the appearance of concentrated surfactant composition 4 prior to dilution.
Figure 4B:
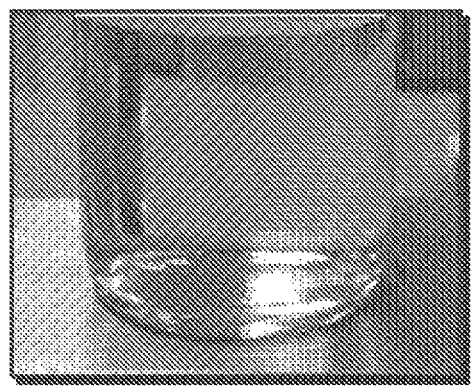
FIG. 4B is a photograph illustrating the appearance of an aqueous surfactant-polymer solution (300 ppm polymer) prepared by dilution of concentrated surfactant composition 4 with brine in a single stage mixing process.

This formulation (Table 5) was developed to be used along with conventional slick water in hydraulic fracturing applications. The concentrated surfactant composition was made and diluted in slick water. The resulting aqueous surfactant-polymer solution include 0.6% surfactants and 0.03% polymer. FIG. 4A shows the surfactant composition prior to dilution and FIG. 4B shows the slick water (the aqueous surfactant-polymer solution) prepared by dilution of surfactant composition 4.

TABLE 5

Surfactant Composition 4.

| Component | Wt % in diluted aqueous surfactant-polymer-polymer solution | Wt % in concentrated surfactant composition |
|---|---|---|
| C9-11 ethoxylated alcohol | 0.5 | 64 |
| benzenesulfonic acid, decyl(Sulfophenoxy)-disodium salt | 0.1 | 13 |
| Polymer | 0.03 | 4 |
| Other (Water or brine, oil from polymer and any other components that comes with chemicals) | 99.37 | 19 |

Evaluation of Surfactant Compositions

In general, there is a window for aqueous stability in terms of polymer concentration in the aqueous surfactant-polymer solutions obtained from the surfactant compositions described herein. This window is dependent on the ratios of the various components mixed to make the surfactant composition, and can be adjusted by modifying the ratio and type of the individual components that make up the surfactant compositions. For initial evaluation, dilutions were made in the laboratory with an overhead stirrer for a specific time period.

Figure 5:
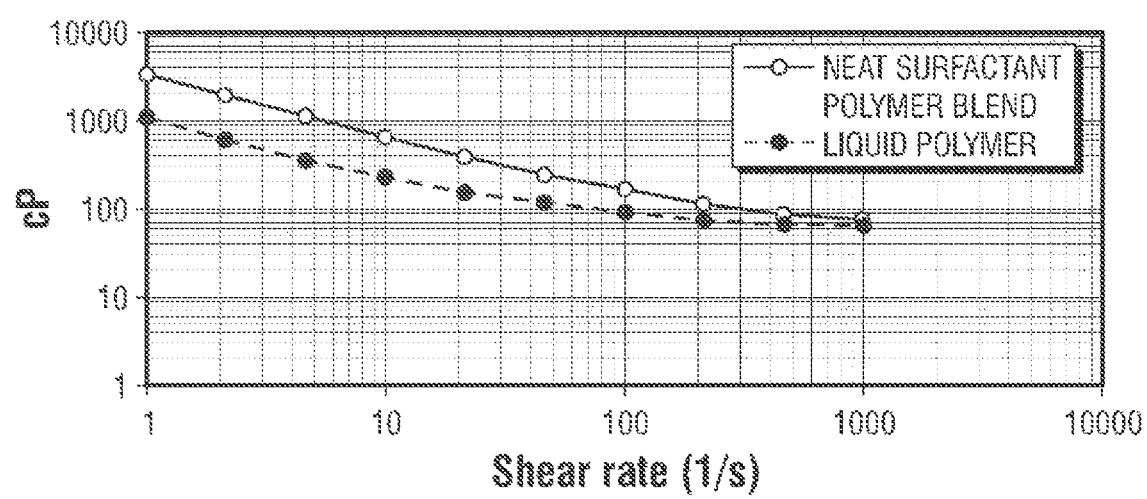
FIG. 5 is a plot comparing the viscosity of surfactant composition 1 and the liquid polymer (LP) composition present in the surfactant composition.

All the data described below are based on surfactant composition 1 and the resulting aqueous surfactant-polymer solution prepared by diluting surfactant composition 1 (as shown in Table 2. FIG. 5 shows a comparison of the viscosity of surfactant composition 1 and the liquid polymer (LP) composition present in the surfactant composition. As shown in FIG. 5, the viscosity of the surfactant composition is lower due to the dilution of the polymer activity. However, the composition exhibits a similar shear thinning viscosity profile to the liquid polymer.

Figure 6:
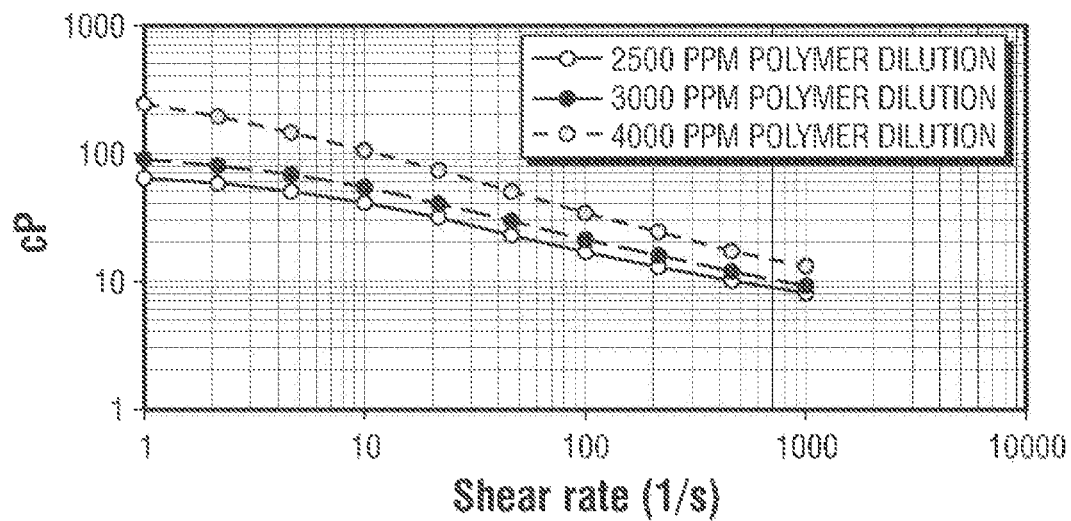
FIG. 6 shows the viscosity curves as a function of shear rate at reservoir temperature for three different aqueous surfactant-polymer solutions having different concentrations of polymer prepared by dilution of surfactant composition 1.

FIG. 6 shows the viscosity curves as a function of shear rate at reservoir temperature for three different aqueous surfactant-polymer solutions having different concentrations of polymer prepared by dilution of surfactant composition 1. As shown in FIG. 6, the presence of surfactants or co-solvents do not impact polymer hydration and the corresponding viscosity yields, as all the curves have traditional shear thinning behavior of diluted polymer solutions.

Table 6 shows the filterability and viscosity summary through a 1.2 micron filter.

TABLE 6

Filterability and viscosity summary of the different aqueous surfactant-polymer solutions (having varying polymer concentrations) prepared by dilution of surfactant composition 1 in brine.

| Polymer concentration in the aqueous surfactant-polymer solution (ppm) | 1.2 μm filter (15 psi, 25° C.) | | Viscosity (cP) @ reservoir temperature $10\ s^{-1}$ |
|---|---|---|---|
| | F.R | Time to 200 g (min) | |
| 3000 | 1.17 | 12 | 51 |
| 3000 | 1.24 | 21 | 56 |
| 3000 | 1.18 | 27 | 54 |
| 2000 | 1.3 | 26 | 24 |

As shown in Table 6, the aqueous surfactant-polymer solutions exhibit good filterability at different concentration of polymer, indicating that the presence of surfactants and co-solvents in the aqueous surfactant-polymer solutions does not negatively impact the filter ratio.

Figure 7:
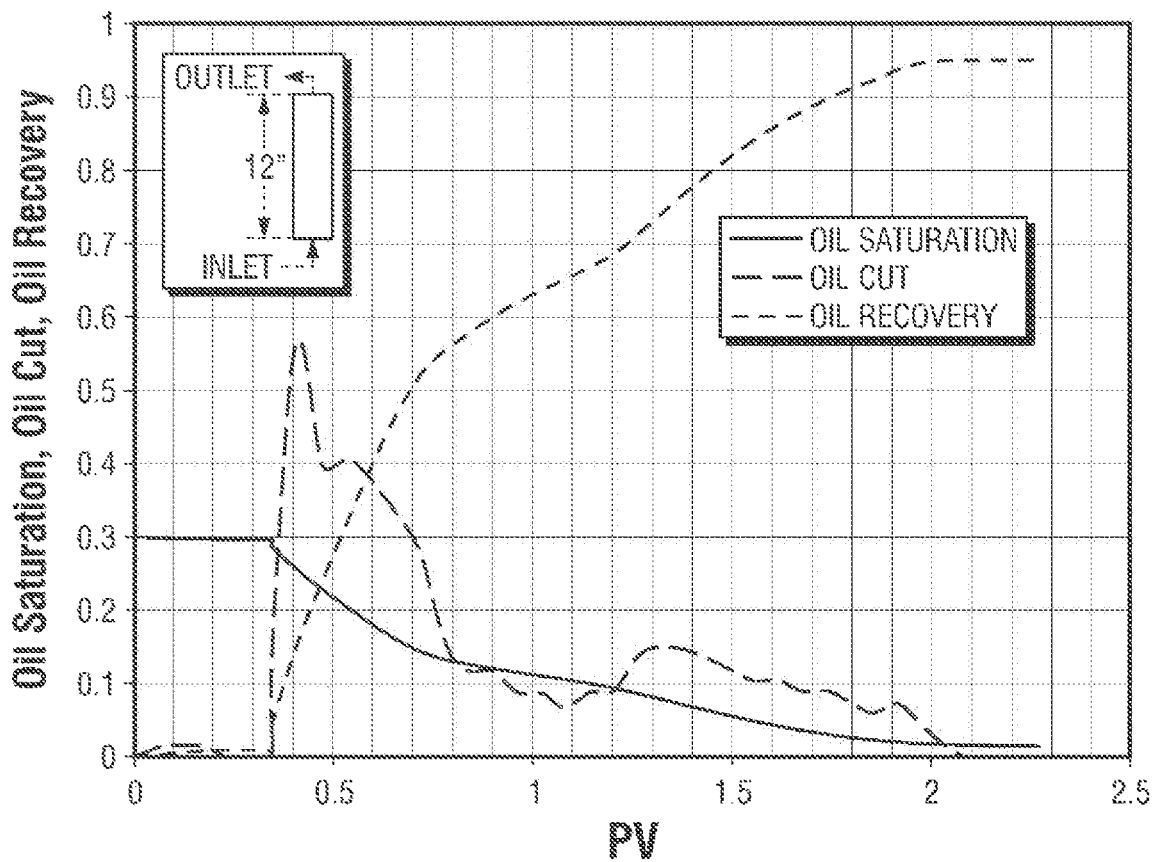
FIG. 7 is a residual oil recovery plot during injection of an aqueous surfactant-polymer solution (2500 ppm polymer) as a cleanup solution in surrogate rock.
Figure 8:
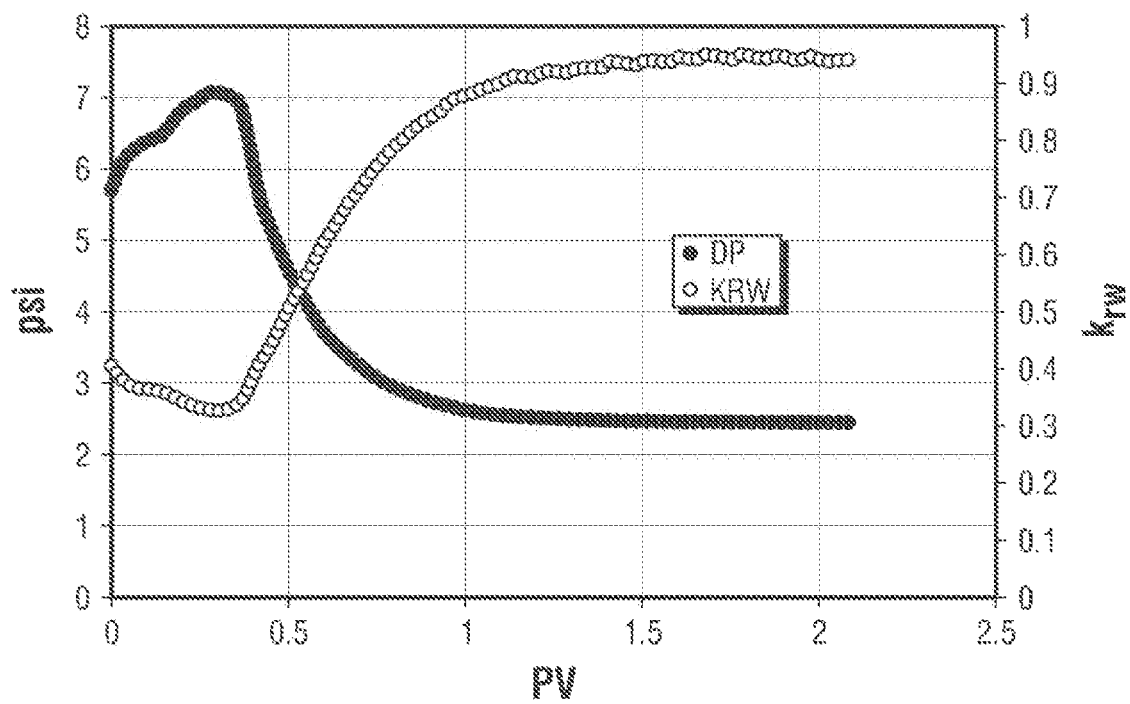
FIG. 8 is plot of krw and pressure drop (dp, in psi) during the displacement of residual oil during injection of an aqueous surfactant-polymer solution (2500 ppm polymer) as a cleanup solution in surrogate rock.

FIG. 7 shows the oil recovery plot when aqueous surfactant-polymer solutions prepared from surfactant composition 1 (2500 ppm dilution) with a viscosity of ~40 CP at $10\ s^{-1}$ and reservoir temperature was injected into surrogate rock (2" diameter×12" long Bentheimer with a permeability of 2.5 D) to displace ~90 cP viscous oil. The core was initially saturated with oil and then brought to residual oil conditions after a tertiary polymer flood. The residual oil saturation was approx. 30%. As shown in FIG. 7, the residual oil recovered is 95% with the remaining oil saturation at the end of the chemical flood <2% in 2PV of cleanup solution injection. This flood mimics a near wellbore cleanup situation where trapped residual oil is mobilized by a continuous surfactant-polymer solution injection. As a result of the displacement of the residual oil from the core, the relative permeability of the rock to the aqueous phase (krw) increases to 0.94, indicating the improvement in injectivity as seen in FIG. 8.

Figure 9:
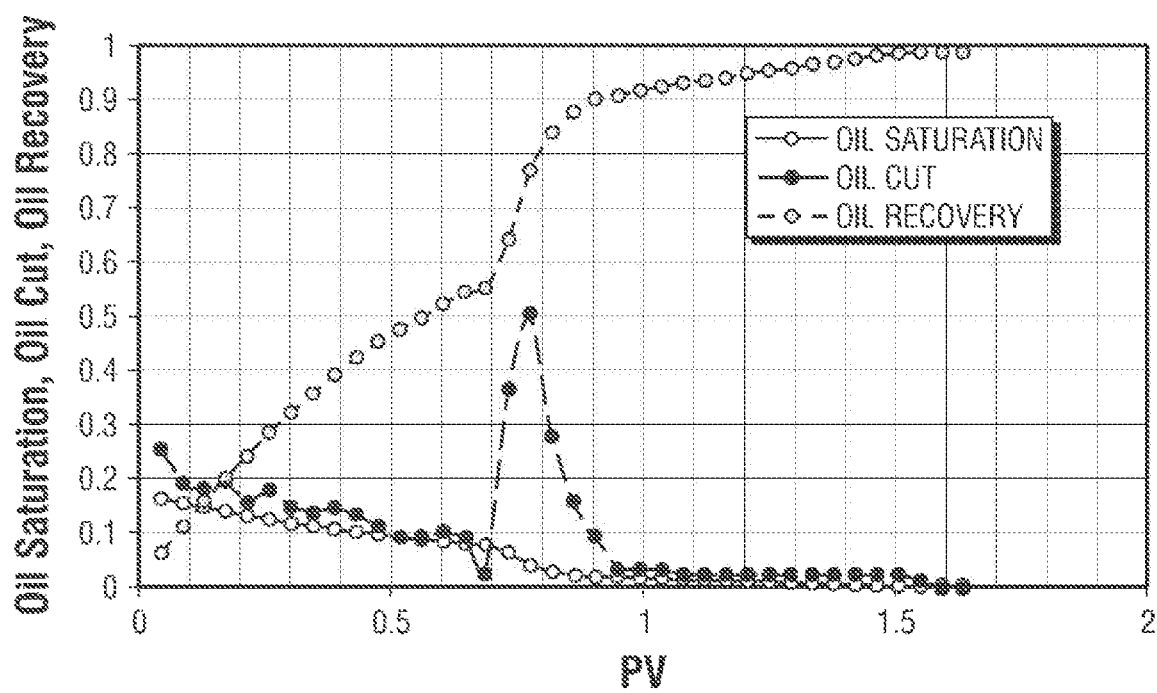
FIG. 9 is a residual oil recovery plot during injection of an aqueous surfactant-polymer solution (3000 ppm polymer) as a cleanup solution in reservoir sand.
Figure 10:
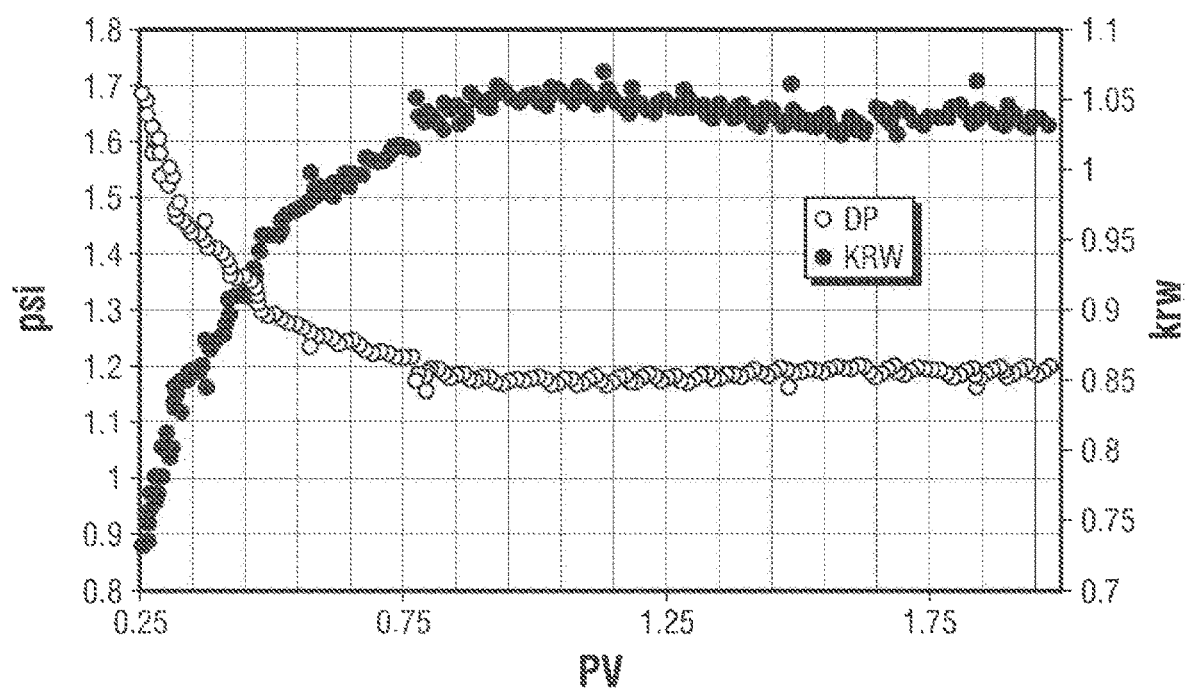
FIG. 10 is plot of krw and pressure drop (dp, in psi) during the displacement of residual oil during injection of an aqueous surfactant-polymer solution (3000 ppm polymer) as a cleanup solution in reservoir sand.
Figure 11:
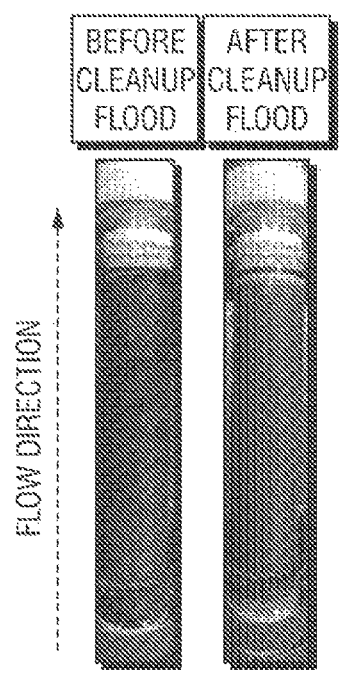
FIG. 11 is a photographic comparison of the reservoir sand before and after the chemical cleanup flood.

FIG. 9 shows the recovery plot when 3000 ppm cleanup solution was injected to displace residual oil in a reservoir sand pack. The viscosity of the injection solution was ~55 cP at $10\ s^{-1}$ and reservoir temperature. The residual oil saturation was approximately 17% before injection of the aqueous surfactant-polymer solution with the same 90 cP viscous oil. The oil saturation at the end of the cleanup was <1% with oil recovery of approx. 99%. As a result of the displacement of the residual oil from the sand, the relative permeability of the rock to the aqueous phase (krw) increases to almost 1, indicating the improvement in infectivity as seen in FIG. 10. FIG. 11 shows the visual appearance of the sandpack at the end of PF and at the end of the cleanup flood. As shown in FIG. 11, all of the residual oil has been displaced at the end of the flood, as indicated by the clean appearance of the sand.

Table 7 show the summary of the runs and the related observations after surfactant composition 1 was mixed inline using 2" and 3" size static mixers with synthetic brine at predefined velocities and flowrates that corresponds to expected operating ranges in the field. As shown in Table 7, three different polymer concentrations were mixed at the different flowrates shown. The results indicate that the sufficient viscosities are generated as seen from the viscosities for the different concentrations indicating the polymer in the surfactant composition is inverting, hydrating quickly to develop the viscosities in the presence of the surfactants. Based on the polymer to surfactant and co-solvent ratios, the 2500 ppm aqueous surfactant-polymer solutions should be cloudy or aqueously unstable which is what is observed. Also, there is one 3000 ppm solution which is cloudy possibly an outlier but the majority of the runs provide solutions with good viscosities and clarity.

TABLE 7

Summary of inline dilution using 2" and 3" static mixers for field mixing scaleup.

| Run# | Polymer concentration in the aqueous surfactant-polymer solution (ppm) | Viscosity @ 10 s$^{-1}$ (cP), reservoir temp | Mixer size | Pressure drop across mixer(psi) | Brine (GPM) | Velocity (m/s) | Clarity at reservoir temp |
|---|---|---|---|---|---|---|---|
| 2A2 | 3000 | 72 | 2" | 9.6 | 33.4 | 1 | Clear |
| 2B2 | 3000 | 61.3 | 2" | 75 | 99 | 2.9 | Clear |
| 3A2 | 3000 | 51 | 3" | 3.2 | 69.3 | 0.9 | Cloudy |
| 3A3 | 3500 | 70 | 3" | 3.2 | 69.3 | 0.9 | Clear |
| 2A3 | 3500 | 91 | 2" | 9.6 | 33.3 | 1 | Clear |
| 2B1 | 2500 | 41 | 2" | 72 | 99.3 | 2.9 | cloudy |
| 2A2 | 3000 | 85 | 2" | 9.5 | 33.4 | 1 | Clear |
| 2B1 | 2500 | 43.4 | 2" | 75 | 99.4 | 2.9 | cloudy |
| 2A1 | 2500 | 51 | 2" | 9.6 | 33.4 | 1 | Clear |

Table 8 shows the filterability summary of some of the runs described in Table 7. As shown in Table 8, all of the filter ratios (F.R) measured were less than 1.5. All the solutions were prefiltered through 5 μm filter to remove any particles and contaminants that were present in the synthetic brine.

TABLE 8

Filterability summary of some runs using the 2" and 3" static mixers

| Polymer concentration in the aqueous surfactant-polymer solution (ppm) | 1.2 μm filter (15 psi, 25° C.) | | |
|---|---|---|---|
| | F.R | Time to 200 g (min) | Run# |
| 3000 | 1.04 | 48 | 2b2 |
| 3000 | 1.0 | 50 | 3a3 |
| 3000 | 1.12 | 73 | 7a2 |
| 2500 | 1.14 | 43 | 2b1 |
| 3000 | 1.07 | 45 | 3a2 |
| 2500 | 1.03 | 29 | 2b1 |

Figure 12:
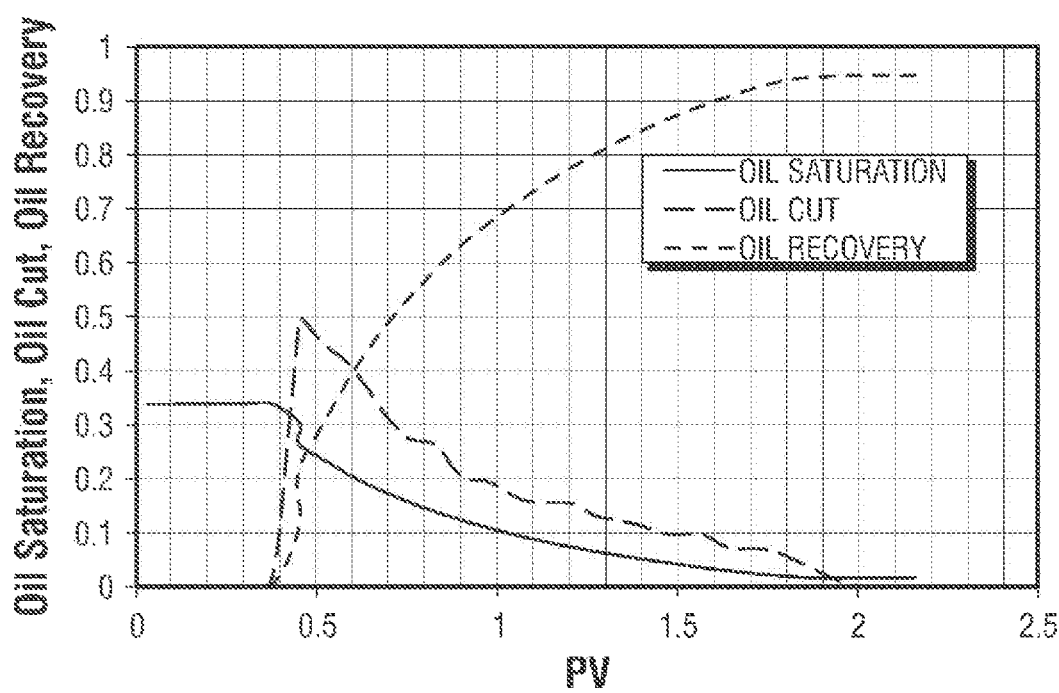
FIG. 12 is a residual oil recovery plot during injection of an aqueous surfactant-polymer solution (3000 ppm polymer, prepared in run #2b2) as a cleanup solution in surrogate rock.
Figure 13:
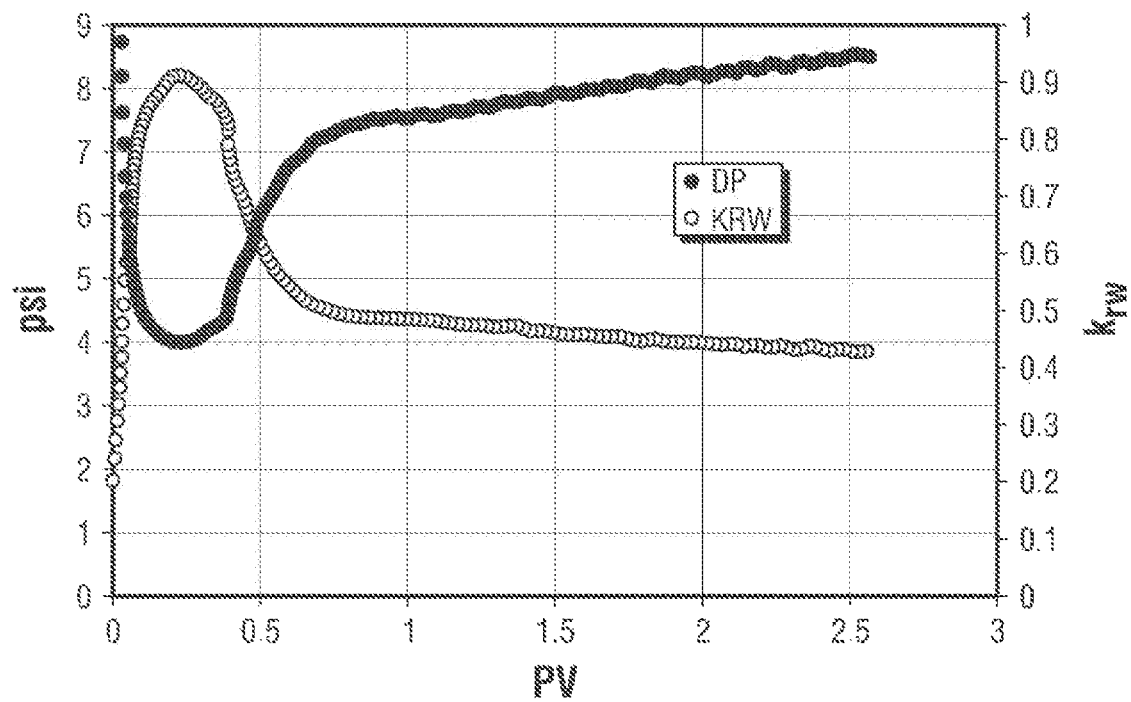
FIG. 13 is plot of krw and pressure drop (dp, in psi) during the displacement of residual oil during injection of an aqueous surfactant-polymer solution (3000 ppm polymer, prepared in run #2b2) as a cleanup solution in reservoir sand.

The first coreflood recovery plot of residual oil in surrogate rock is shown in FIG. 12 using an aqueous surfactant-polymer solution collected from the inline mixing test. The displacement was carried out using an aqueous surfactant-polymer solution obtained from run #2b2 (which had a polymer concentration of 3000 ppm and a viscosity of approx. 51 cP @ 10 s$^{-1}$ and reservoir temperature). As shown in FIG. 12, the final recovery of residual oil is approx. 95% with the remaining oil saturation <2%. FIG. 13 shows the pressure drop during this recovery flood and the corresponding improvement in the final krw which is >0.9, indicating the improvement in krw at the end of 2 PV's of continuous injection of the cleanup solution.

Figure 14:
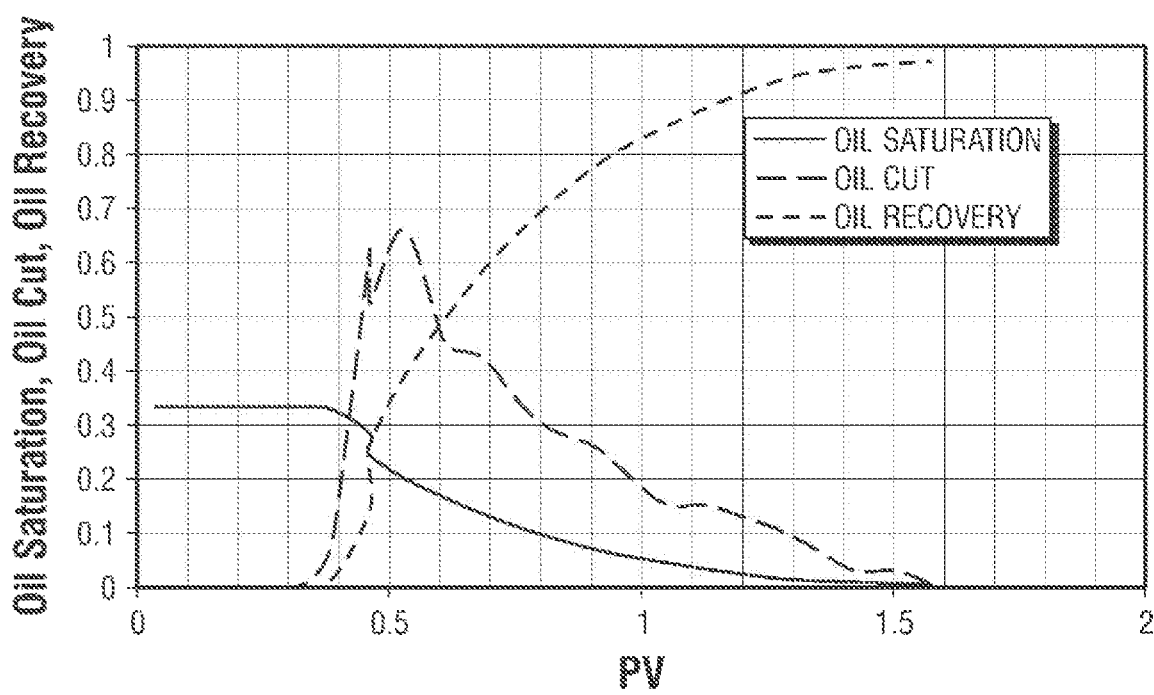
FIG. 14 is a residual oil recovery plot during injection of an aqueous surfactant-polymer solution (3000 ppm polymer, prepared in run #3a2) as a cleanup solution in surrogate rock.
Figure 15:
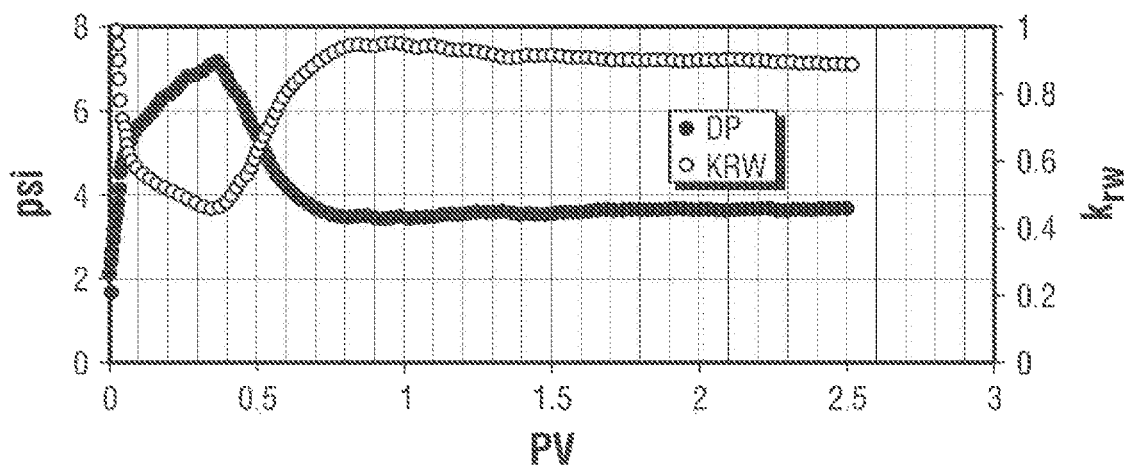
FIG. 15 is plot of krw and pressure drop (dp, in psi) during the displacement of residual oil during injection of an aqueous surfactant-polymer solution (3000 ppm polymer, prepared in run #3a2) as a cleanup solution in surrogate rock.
Figure 16:
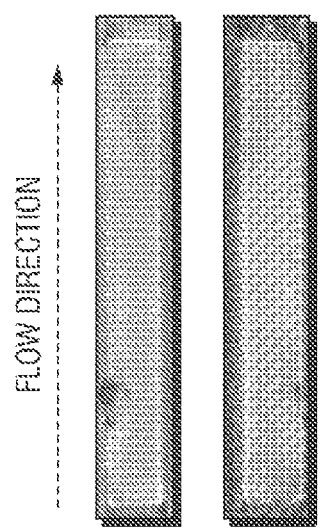
FIG. 16 is a photograph illustrating a cross section of the surrogate rock after the residual oil recovery aqueous surfactant-polymer solution (3000 ppm polymer, prepared in run #2b2) as a cleanup solution (corresponding to the recovery shown in FIG. 12). No significant oil is remaining following injection, as indicated by a clean core.
Figure 17:
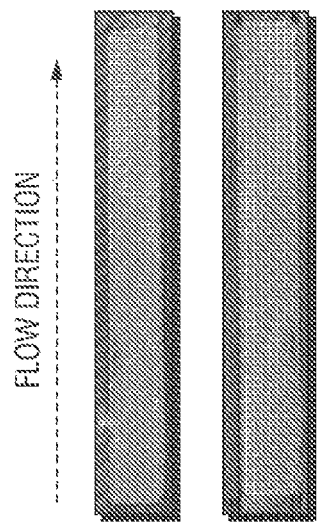
FIG. 17 is a photograph illustrating a cross section of the surrogate rock after the residual oil recovery aqueous surfactant-polymer solution (3000 ppm polymer, prepared in run #3a2) as a cleanup solution (corresponding to the recovery shown in FIG. 14). No significant oil is remaining following injection, as indicated by a clean core.

FIGS. 14 and 15 show the oil recovery plot and the dp and krw plot when 3000 ppm cleanup solution was injected to displace residual oil with the solution used from run #3a2. Although the aqueous stability was satisfactory due to the solution being cloudy, the total recovery is approx. 97.5%, with the remaining oil saturation <1% as shown in FIG. 14. The pressure drop during this flood and the corresponding improvement in krw (>0.9) is shown in FIG. 15. From the above two floods, one can see that with inline diluted and mixed cleanup solution, the recovery efficiency is still good.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2), In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Unless defined otherwise, all technical and scientific terms used herein have the same meanings as commonly understood by one of skill in the art to which the disclosed invention belongs. Publications cited herein and the materials for which they are cited are specifically, incorporated by reference.

What is claimed is:

1. A method for performing an enhanced oil recovery (EOR) operation, comprising:
    (a) providing a subsurface reservoir containing hydrocarbons therewithin;
    (b) providing a wellbore in fluid communication with the subsurface reservoir;
    (c) preparing an aqueous surfactant-polymer solution; and
    (d) injecting the aqueous surfactant-polymer solution through the wellbore into the subsurface reservoir;
    wherein preparing an aqueous surfactant-polymer solution, comprises:
    providing a concentrated liquid surfactant composition comprising:
    (a) a surfactant package in an amount of from 0.2% to 98% by weight, based on the total weight of the concentrated liquid surfactant composition;
    (b) a co-solvent in an amount of from greater than 0% to 95% by weight, based on the total weight of the concentrated liquid surfactant composition; and
    (c) a liquid polymer (LP) composition in an amount of from 0.1% to 60% by weight, based on the total weight of the concentrated liquid surfactant composition;
    wherein the concentrated liquid surfactant composition has a total water content of from 0.5% to 20% by weight, based on the total weight of the concentrated liquid surfactant composition; and combining the concentrated liquid surfactant composition with an aqueous fluid in a single stage mixing process to provide the aqueous surfactant-polymer solution,
    wherein the single stage mixing process comprises applying a specific mixing energy of at least 0.10 kJ/kg to the concentrated liquid surfactant composition and the aqueous fluid; and
    wherein the aqueous surfactant-polymer solution comprises a polymer concentration of from 50 to 15,000 ppm.

2. The method of claim 1, wherein the wellbore in step (b) is an injection wellbore associated with an injection well, and the method further comprises
    providing a production well spaced apart from the injection well a predetermined distance and having a production wellbore in fluid communication with the subsurface reservoir,
    wherein the injection of the aqueous surfactant-polymer solution in step (d) increases the flow of hydrocarbons to the production wellbore.

3. The method of claim 2, wherein the method further comprises
    producing production fluid from the production well, the production fluid including at least a portion of the injected aqueous surfactant-polymer solution; and
    combining the production fluid with additional surfactant composition in a single stage mixing process to provide a second aqueous surfactant-polymer solution.

4. The method of claim 3, further comprising injecting the second aqueous surfactant-polymer solution into at least one injection well.

5. The method of claim 1, wherein the subsurface reservoir is a subsea reservoir.

6. The method of claim 1, wherein the subsurface reservoir has a permeability of from 10 millidarcy to 40,000 millidarcy.

7. The method of claim 1, wherein the aqueous surfactant-polymer solution is used as an injection fluid.

8. The method of claim 1, wherein the aqueous surfactant-polymer solution is included in an injection fluid.

9. The method of claim 1, wherein the enhanced oil recovery operation includes a polymer flooding operation, an alkaline-polymer (AP) flooding operation, a surfactant-polymer (SP) flooding operation, an alkaline-surfactant-polymer flooding operation, a conformance control operation, or any combination thereof.

10. The method of claim 1, wherein the aqueous surfactant-polymer solution injected in step (d) functions as a drag reducer that reduces friction during injection in step (d).

11. The method of claim 1, wherein the surfactant composition has a total additive concentration equal to the sum of the weight percent concentration of all surfactants and all co-solvents present in the surfactant composition;
    wherein the surfactant composition has a total polymer concentration equal to the sum of the weight percent concentration of all polymers present in the surfactant composition; and wherein the weight ratio of the total additive concentration to the total polymer concentration is at least 1:1.

12. The method of claim 1, wherein the surfactant package comprises a primary surfactant and one or more secondary co-surfactants.

13. The method of claim 1, wherein the LP composition comprises:
- a hydrophobic liquid having a boiling point at least 100° C.;
- at least 39% by weight of the synthetic (co)polymer;
- an emulsifier surfactant; and
- an inverting surfactant.

14. The method of claim 1, wherein the LP composition comprises an inverse emulsion comprising:
- a hydrophobic liquid having a boiling point at least 100° C.;
- up to 38% by weight of the synthetic (co)polymer;
- an emulsifier surfactant; and
- an inverting surfactant.

15. The method of claim 1, wherein the LP composition has a filter ratio of 1.5 or less at 15 psi using a 1.2 μm filter.

16. The method of claim 1, wherein the surfactant composition comprises an alkyl aryl sulfonate surfactant.

* * * * *